United States Patent
Sato et al.

(10) Patent No.: US 6,881,925 B1
(45) Date of Patent: Apr. 19, 2005

(54) LASER EMISSION HEAD, LASER BEAM TRANSMISSION DEVICE, LASER BEAM TRANSMISSION DEVICE ADJUSTMENT METHOD AND PREVENTIVE MAINTENANCE/REPAIR DEVICE OF STRUCTURE IN NUCLEAR REACTOR

(75) Inventors: Katsuhiko Sato, Machida (JP); Motohiko Kimura, Yokohama (JP); Yuji Sano, Yokosuka (JP); Mitsuaki Shimamura, Yokohama (JP); Hiroaki Igakura, Yokohama (JP); Makoto Ochiai, Yokohama (JP); Naruhiko Mukai, Yokohama (JP); Masaki Yoda, Yokohama (JP); Yutaka Togasawa, Yokohama (JP); Yasumi Kitajima, Tokyo (JP); Tomoyuki Ito, Kawasaki (JP); Takuya Uehara, Ebina (JP); Makoto Kondo, Yokohama (JP); Yoshifumi Sato, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/367,060

(22) PCT Filed: Dec. 9, 1998

(86) PCT No.: PCT/JP98/05569

§ 371 (c)(1),
(2), (4) Date: Oct. 22, 1999

(87) PCT Pub. No.: WO99/29463

PCT Pub. Date: Jun. 17, 1999

(30) Foreign Application Priority Data

Dec. 9, 1997 (JP) .............................................. 9/338974
Nov. 16, 1998 (JP) ........................................... 10-325608
Nov. 24, 1998 (JP) ........................................... 10-332206

(51) Int. Cl.⁷ .............................................. B23K 26/06

(52) U.S. Cl. ................................................ 219/121.73
(58) Field of Search ...................... 219/121.63, 121.64, 219/121.78, 121.79, 121.73

(56) References Cited

U.S. PATENT DOCUMENTS 5,442,154 A * 8/1995 Philippe et al. ......... 219/121.62

(Continued)

FOREIGN PATENT DOCUMENTS

| JP | 63-210240 | 8/1988 |
| JP | 63-235089 | 9/1988 |

(Continued)

*Primary Examiner*—Kiley Stoner
*Assistant Examiner*—Jonathan Johnson
(74) *Attorney, Agent, or Firm*—Finnegan, Henderson, Farabow, Garrett & Dunner, L.L.P.

(57) ABSTRACT

A laser emitting head for irradiating a portion to be machined with laser beams outputted from a laser unit (624) incorporates an emitting head body having a light guide member (625) in the head for guiding the laser beams; a light converging lens (677) for converging the laser beams transmitted from the light guide member in the head; a reflecting mirror (678) for irradiating the portion to be machined with the converged laser beams; mirror rotating means (684) for holding the reflecting mirror to be rotative around the optical axis of the laser beam; distance-adjustment means (674) for adjusting the relative distance between the reflecting mirror and the converging lens; and moving means (665) for moving the reflecting mirror and the converging lens such that the relative distance is maintained so that the light guide member in the head. The converging lens and the reflecting mirror can be introduced/discharged with respect to a portion to be machined and formed in a narrow gap in an incore structure. As a result, a preventive-maintenance/repair operation using laser beams and arranged to be performed in a narrow gap in the incore structure can safely and efficiently be performed.

5 Claims, 39 Drawing Sheets

U.S. PATENT DOCUMENTS

| | | | |
|---|---|---|---|
| 5,790,620 A | * 8/1998 | Okazaki et al. | 376/305 |
| 5,897,800 A | * 4/1999 | Sawai et al. | 219/121.79 |
| 5,985,056 A | * 11/1999 | McCay et al. | 148/511 |
| 6,114,651 A | * 9/2000 | Schluter et al. | 219/121.69 |
| 6,163,012 A | * 12/2000 | Kimura et al. | 219/121.78 |
| 6,278,078 B1 | * 8/2001 | Walvoord et al. | 219/121.61 |
| 6,294,754 B1 | * 9/2001 | Nagura et al. | 219/121.63 |

FOREIGN PATENT DOCUMENTS

| | | |
|---|---|---|
| JP | 1-278987 | 11/1989 |
| JP | 2-255291 | 10/1990 |
| JP | 7-248397 | 9/1995 |
| JP | 8-206869 | 8/1996 |
| JP | 10-216983 | 8/1998 |

* cited by examiner

LASER EMISSION HEAD, LASER BEAM TRANSMISSION DEVICE, LASER BEAM TRANSMISSION DEVICE ADJUSTMENT METHOD AND PREVENTIVE MAINTENANCE/REPAIR DEVICE OF STRUCTURE IN NUCLEAR REACTOR

FIELD OF THE INVENTION

The present invention relates to a light transmission technique for transmitting light in a light transmission passage formed by combining mirrors with one another. More particularly, the present invention relates to a light transmission apparatus which is capable of automatically and stably adjusting the optical axis of an optical passage when light is accurately transmitted to the position of a target which must be irradiated with light and which is located in, for example, a nuclear power plant, to an adjusting method therefor and to an incore-structure preventive-maintenance/repair apparatus which is capable of stably and efficiently performing preventive-maintenance/repair of an incore structure.

BACKGROUND ART

Hitherto, incore structures of a light water reactor, for example, a boiling water reactor, have been made of materials having sufficient corrosion resistance in high temperature and high pressure environment in water and having satisfactory resistance against high temperatures. For example, austenitic stainless steel or a nickel-base alloy has been employed. There is apprehension that members among the incore structures, which cannot easily be changed, deteriorate because the members are subjected to a severe environment as a result of the operation of the nuclear power plant for a long time and influences of irradiation of neutrons. In particular, portions adjacent to welded portions in the incore structure have potential probability of stress corrosion cracking because of sensitization of the materials caused by heat inputs during the welding operations and influences of tensile residual stress.

In recent years, surface modifying techniques for a variety of materials have been developed for preventive maintenance in order to safely operate the nuclear power plant. Among the techniques, techniques for modifying the surface by irradiating the surface of the material with laser beams have been disclosed in, for example, Japanese Patent Laid-Open Publication No. HEI 7-246483 and Japanese Patent Laid-Open Publication No. HEI 8-20689.

That is, the former technique is a laser peening method with which a pulse laser beam oscillated from a pulse laser unit is, through a reflecting mirror, applied to the surface of a member which must be machined (a surface which must be machined). While the position, which is irradiated with the pulse laser beam, is being shifted on the surface which must be machined, the residual tensile stress of the surface which must be machined is converted into compressive stress.

On the other hand, the latter technique is an underwater laser machining method and apparatus using short-pulse laser beams each having a visible wavelength to irradiate the surface, which must be machined and which is immersed in cooling water. Thus, residual stress, cracks or crude is reduced or removed. The foregoing underwater laser machining apparatus and method incorporate an optical fiber to introduce the laser beam from an oscillator to the portion which must be machined. When the optical fiber is employed, the power or the energy for introducing the laser beam in the optical fiber has a limitation. Therefore, the laser beam emitted from the optical fiber must be converged minimally to realize power of light and an energy density required to modify the surface.

Since a general optical fiber for transmitting a power laser beam has a high diffusion coefficient of emitted laser beams, the laser beams must be converged at a large angle. As a result, a converging lens having a very small focal depth must be employed. It leads to a fact that a laser emitting optical system including the optical fibers and the converging lens must precisely be located with respect to the surface which must be machined.

To eliminate the necessity of precisely locating the laser emitting optical system, the inventors of the present invention have applied a preventive-maintenance/repair apparatus in Japanese Patent Application No. HEI 8-256532. The apparatus is capable of eliminating the necessity of precisely locating the optical fibers and the laser emitting optical system. The apparatus has a structure that a laser beam emitted from a laser oscillator disposed on an operation floor or an upper surface of the body of a shroud is transmitted through the air so as to be introduced into the laser emitting optical system. Then, the laser emitting optical system emits laser beams having a high energy density and similar to parallel beams.

The conventional structure of the incore-structure preventive-maintenance/repair apparatus will now be described with reference to FIG. 39.

As shown in FIG. 39, the conventional incore-structure preventive-maintenance/repair apparatus machines an incore structure, such as a shroud 602 installed in a pressure vessel 601 of a boiling water reactor. The incore-structure preventive-maintenance/repair apparatus incorporates a laser-beam source 604 disposed on an operation floor 603; a laser oscillator 605; a light transmission unit 606 having a light-conductive member 606; and a laser emitting head 608 disposed at the leading end of the light-conductive member 606. In the incore-structure preventive-maintenance/repair apparatus, the laser beam L emitted from the laser oscillator 605 is, in the air, transmitted to the laser emitting head 608 so that a portion which must be machined is irradiated with the laser beam L. Therefore, the necessity of precisely locating the laser emitting head 608 can be eliminated. As a result, the laser beam having a high energy density can be used in a preventive-maintenance/repair operation, for example, a laser peening operation, a melting operation, a cladding operation or a welding operation. Thus, the reliability and safety of the nuclear reactor can be improved.

A light transmission apparatus incorporating a plurality of mirrors to transmit laser beams is usually arranged to manually adjust the angles of the mirrors while the positions of the mirrors are being confirmed in a sequential order from a mirror adjacent to the laser unit in the direction of transmission of the laser beam. When the adjustment must be performed in a remote place, for example, a radioactive environment or a high-temperature environment, to which a human being cannot approach, an optical supervisory unit, such as a CCD camera, is disposed at a place which must be supervised. Thus, the mirrors are automatically adjusted while the operator is watching the image.

As described above, the conventional incore-structure preventive-maintenance/repair apparatus shown in FIG. 39 is arranged to machine a portion of an inner wall of the shroud 602 which is the incore structure of the pressure vessel 601 or another incore structure. However, a difficulty is imposed when a vertical welding line (a welding line on the inside of V5) in the lower half of the intermediate body of the shroud or a horizontal welding line (a welding line on the inside of H6a) at the lower end of the inner portion of an intermediate body of the shroud is welded. In the foregoing case, the laser beam must be transmitted to a small cylindrical portion held between the intermediate body of the shroud and the core support plate 609 and having a width of about 30 mm and a depth of about 400 mm. However, the laser emitting head 608 cannot transmit a laser beam to the above-mentioned small cylindrical portion.

When stress is eliminated from the surface of the small cylindrical portion of the intermediate body of the shroud adjacent to the welding line by using the laser beam, when the surface of a sensitized metallographic structure is modified or when a repairing operation is performed by welding, a large incidental angle must be made on the surface which must be irradiated when the points which must be irradiated are scanned to realize an energy density which permits a machining operation using laser beam to be performed.

The foregoing method is structured such that the laser emitting optical system is disposed on the core support plate 609 to irradiate the bottom portion of the small cylindrical portion with laser beams. The foregoing method encounters undesirably reduction in the incidental angle, causing a problem to arise in that a sufficiently high energy density required to perform the machining operation cannot be realized. There arises another problem in that a precise locating mechanism must be provided to scan the points which must be irradiated because the distance which must be irradiated is elongated excessively. As a result, there arises a problem that the preventive-maintenance/repair apparatus becomes too complicated and, therefore, the reliability deteriorates.

When the above-mentioned light transmission apparatus is used to perform a preventive maintenance operation or a repair operation in a nuclear power plant, there arise the following problems in an operation for transmitting and applying laser beams to an incore structure of a nuclear reactor.

Since a sufficiently large working space cannot be permitted in the nuclear reactor and the incore structures are disposed in the core, the light transmission apparatus has a complicated transmission passage. Therefore, the distance for which the laser beam must be transmitted is elongated. As a result, errors are frequently made during the transmission, a large number of places must be supervised and a large number of the optical supervising units, such as CCD cameras, must be provided.

If the environment is changed during transmission of the laser beam in the light transmission apparatus, there is apprehension that the optical axis of the light transmission passage is misaligned owning to the change in the environment. Therefore, the light transmission apparatus must be adjusted to be adaptable to the changed environment as occasion demands.

When the light transmission apparatus must transmit laser beams for a long distance, influences of fluctuations of air are exerted on the laser beam. Moreover, influences of vibrations of peripheral apparatuses are exerted on the laser beam through the transmission mirrors. As a result, the laser beam is undesirably swayed and, therefore, there arises a problem in that the laser beam cannot stably be transmitted to a required transmission point.

If a large number of CCD cameras are provided for the light transmission apparatus, a long time is required to adjust the CCD cameras. Moreover, the electronic elements, such as the CCD camera, cannot be used in an environment in which the high intensity of radioactive rays is shown.

The apparatus of transmitting laser beams disclosed in Japanese Patent Application No. HEI 8-256532 is a preferred apparatus for performing a preventive-maintenance/repair operation of an inner surface of the shroud and a welded optical fiber of an incore structure in the shroud of a boiling water reactor. However, the foregoing apparatus cannot be operated to machine the outside of the shroud body, that is, the outer wall of the shroud body, the inner surface of the pressure chamber and a space called an annulus portion in the form of a small cylindrical shape interposed between baffle plates and having a multiplicity of jet pumps stood erect therebetween. The reason for this matter lies in that no specific mechanism and structure has been disclosed which inserts and brings closer a light conducting pipe, through which the laser beam is transmitted, to the annular space, which must be machined, while the light conductive pipe is moved around impediments, such as the jet pumps. Moreover, no specific mechanism and structure has been disclosed which can efficiently be moved from the core in any one of all 360° horizontal directions.

The inventors of the present invention have found a fact that the method of transmitting laser beams by using the light conductive pipe for transmitting light to the annular portion is able to efficiently perform a preventive-maintenance/repair operation of an incore structure. Thus, a specific machining apparatus and a structure can be provided.

In view of the foregoing, an object of the present invention is to provide a laser-beam emitting head which is capable of efficiently performing a preventive-maintenance/repair operation using laser beams even if a portion which must be machined is a narrow portion, a light transmission apparatus incorporating the laser-beam emitting head and a preventive-maintenance/repair apparatus for an incore structure.

Another object of the present invention is to provide a laser-beam emitting head which is capable of efficiently performing a preventive-maintenance/repair operation of a cylindrical narrow portion held between an intermediate body of a shroud of the inner wall of a shroud body, which is an incore structure, and attached/detached with respect to a core support plate in an underwater environment by using laser beam, a preventive-maintenance/repair apparatus for an incore structure having the laser-beam emitting head and a method of performing the operation.

Another object of the present invention is to provide a preventive-maintenance/repair apparatus for an incore structure which is capable of efficiently and effectively improving stress of a surface layer adjacent to a welding line, modifying the surface of a sensitize (desentization) metal structure and repairing welded portion by using laser beam in an underwater environment such that a welding line of welding lines of the inner wall of the shroud body, which is the incore structure, existing in a cylindrical narrow portion held by an intermediate body of the shroud and the core support plate is made to be the subject.

Another object of the present invention is to provide a light transmission apparatus which is capable of automatically and stably adjusting the optical axis of a light transmission passage formed by combining mirrors from a remote position and an adjustment method.

Another object of the present invention is to provide a light transmission apparatus which is capable of simply and easily adjusting the optical axis to a required position which must be irradiated with light when light is transmitted in the light transmission passage, correcting deflection of the optical axis caused from fluctuation of air and mechanical vibrations of peripheral equipment and stably supplying light to the irradiation position and an adjustment method.

Another object of the present invention is to provide a light transmission apparatus which is capable of automating the adjustment of the optical axis to the final irradiation point and adjusting the optical axis of the light transmission passage from a remote position to enable the apparatus to be used in a portion, such as an incore structure, to which a human being cannot easily approach, and an adjustment method.

Another object of the present invention is to provide a light transmission apparatus which is not require an electronic device, such as a CCD camera which has unsatisfactory radioactive-ray resistance even if light is transmitted to a portion in which the intensity of radioactive rays is high and adjusting the optical axis of a light transmission passage and an adjustment method.

Another object of the present invention is to provide a core preventive-maintenance/repair apparatus adapted to a laser method which is capable of, in an underwater environment, such as cooling water in a reactor pressure vessel, improving stress in a surface layer adjacent to a welding line such that residual tensile stress caused from an influence of heat generated in a welding operation is transformed into compressive stress, modifying the sensitized surface of a metal structure and performing a repair operation of a welded portion such that the surface of a welded structure existing between an outer wall of a shroud body and a baffle plate which are incore structures and in a space partitioned by the inner wall of the reactor pressure vessel.

DISCLOSURE OF THE INVENTION

To achieve the above-mentioned object, according to the present invention, there is provided a laser-beam emitting head for irradiating a portion which must be machined with laser beams output from a laser unit, the laser-beam emitting head comprising: an emitting head body having a light guide member for guiding the laser beams; a converging lens for converging the laser beams guided from the light guide member in the head; a reflecting mirror for irradiating the portion which must be machined with the converged laser beams; mirror rotating means for rotatively holding the reflecting mirror around the optical axis of the laser beam; distance-adjustment means for adjusting the relative distance between the reflecting mirror and the converging lens; and moving means for moving the reflecting mirror and the converging lens such that the relative distance is maintained, wherein introduction/discharge of the light guide member in the head, the converging lens and the reflecting mirror to and from a portion which must be machined and which is formed in a narrow gap is permitted.

To achieve the above-mentioned object, the laser-beam emitting head has a structure that the body of the laser-beam emitting head is provided with a flat and elongated elevation support mechanism which is slidable by a frame elevating unit, the elevation support mechanism is provided with an irradiation scan optical system constituted by a converging lens and a reflecting mirror, and the frame elevating unit constitutes moving means for moving the converging lens and the reflecting mirror such that the relative distance is maintained.

To achieve the above-mentioned object, the laser-beam emitting head has a structure that the light guide member in the head incorporates a cylindrical member and an optical member for causing the inside portion of the cylindrical to be an air state, and the light guide member in the head is joined to the body of the emitting head such that the laser beams are guided to the converging lens.

To achieve the above-mentioned object, the laser-beam emitting head has a structure that the light guide member in the head is made of glass so that the laser beams are guided to the converging lens.

To achieve the above-mentioned object, the laser-beam emitting head has a structure that an optical path from the light guide member in the head to the converging lens and an optical path from the converging lens to the reflecting mirror are exposed to the environment, and the optical paths are formed into spatial transmission passages realized by the environment.

To achieve the above-mentioned object, there is provided a preventive-maintenance/repair apparatus for an incore structure incorporating a laser unit for output laser beams, laser beam guiding means for guiding the laser beams output from the laser unit into a nuclear reactor and a laser-beam emitting head for irradiating a portion of an incore structure which must be machined with the laser beams guided into the reactor, the preventive-maintenance/repair apparatus for an incore structure comprising: a body locating unit suspended in the reactor so as to be disposed in a core portion; a head moving mechanism which moves forward and rearward the laser-beam emitting head accommodated in the body locating unit with respect to the portion which must be machined; and laser-beam transmission means for receiving the laser beams guided into the nuclear reactor so as to guide the laser beam to the laser beam emitting head, wherein the laser-beam emitting head is located to extend towards the portion on the inner wall of a shroud which must be machined.

To achieve the above-mentioned objects, the preventive-maintenance/repair apparatus for an incore structure has a structure that the body locating unit incorporates an elongated cylindrical body case, the laser-beam emitting head and the laser beam transmission means are accommodated in the body case such that introduction/discharge is permitted, and the body locating unit is suspended through a lattice of an upper lattice plate so as to be disposed on a control-rod guide pipe in an accommodated state.

To achieve the above-mentioned objects, the preventive-maintenance/repair apparatus for an incore structure has a structure that the body locating unit incorporates a clamping unit having an upper portion secured to an upper lattice plate, a turning unit for determining a direction in which the laser beam emitting head accommodated in the body case is extended, a head moving mechanism for extending the laser-beam emitting head and the laser beam transmission means to the portion to be machined and a base elevating unit for moving upward and downward body base for supporting the head moving mechanism in the body case.

To achieve the above-mentioned objects, the preventive-maintenance/repair for an incore structure has a structure that the laser beam transmission means constitutes a movable transmission passage for receiving the laser beams in a water environment in the nuclear reactor to transmit the laser beams to the laser-beam emitting head in air.

To achieve the above-mentioned objects, according to the present invention, there is provided a light transmission apparatus incorporating light transmission means constituting a light transmission passage by combining mirrors and a mirror adjustment unit for controlling an angle of inclination of at least one mirror constituting the light transmission means, the light transmission apparatus comprising: electronic optical image pickup means disposed coaxially with an optical axis of light which is transmitted in the light transmission passage; an image processing unit for calculating image information supplied from the electronic optical image pickup means to measure an amount of deviation of the angle of the mirror from a normal position; and a control unit for receiving the amount of deviation of the angle of the mirror so as to operate the mirror adjustment unit.

To achieve the above-mentioned objects, the light transmission apparatus has a structure that the light transmission means incorporates targets for an image process disposed adjacent to the mirrors and the targets have light transmission openings.

To achieve the above-mentioned objects, the light transmission apparatus has a structure that the light transmission means incorporates an illuminating unit illuminating portions adjacent to the mirror or the targets for the image process.

To achieve the above-mentioned objects, the light transmission apparatus has a structure that the image processing unit incorporates a pattern matching unit which compares a previously registered image pattern and an image photographed when the mirror has been adjusted with each other so as to detect an amount of deviation in the position of the photographed image.

To achieve the above-mentioned objects, according to the present invention, there is provided a light transmission apparatus incorporating light transmission means for constituting a light transmission passage by combining mirrors and a mirror adjustment unit for controlling an angle of inclination of the mirrors constituting the light transmission means, the light transmission apparatus comprising: half mirrors or wavelength separation mirrors which are portions of the mirrors on the light transmission passage; a light-position detecting unit disposed on a sampling optical path to which light separated by the half mirrors or the wavelength separation mirrors is transmitted; and a control unit for calculating information about deviation in the light position outputted from the light-position detecting unit to operate a mirror adjustment unit in a direction in which an amount of deviation in the light position is canceled.

The light transmission apparatus has a structure that one or more types of guide laser beam units for making incident guide laser beams on the light transmission passage are provided.

To achieve the above-mentioned objects, according to the present invention, there is provided a light transmission apparatus incorporating light transmission means for constituting a light transmission passage by combining mirrors and a mirror adjustment unit for controlling an angle of inclination of at least one mirror constituting the light transmission means, the light transmission apparatus comprising: a main laser unit for outputting laser beams for machining, inspecting or preventive-maintenance/repair of a portion to be machined; a guide laser unit for outputting a guide laser beam which is different from the main laser beam; half mirror guide means for guiding the guide laser beam emitted from the guide laser beam unit to the light transmission passage; sampling separation mirror means disposed at an intermediate position of the light transmission passage; parallel reflecting optical means disposed on an optical path separated by the separation mirror means; a light position detecting unit on which light reflected by the parallel reflecting optical is made incident through the half mirror guide means; and a control unit for receiving information about position deviation of light detected by the light position detecting unit to process information so as to operate the mirror adjustment unit.

To achieve the above-mentioned objects, the light transmission apparatus has a structure that the parallel reflecting optical means is a retro-reflector comprising a corner cube prism or a hollow corner cube or a cat's eye optical system.

To achieve the above-mentioned objects, according to the present invention, there is provided a light transmission apparatus incorporating light transmission means for constituting a light transmission passage by combining mirrors; and a mirror adjustment unit for controlling an angle of inclination of at least one mirror constituting the light transmission passage, the light transmission apparatus comprising: a main laser unit for outputting laser beams for machining, inspection or preventive-maintenance/repair of a portion to be machined; a guide laser unit for outputting a non-polarized or circularly polarized guide laser beam which is different from the main laser beam; half mirror guide means for guiding the guide laser beam output from the guide laser beam unit to the light transmission passage; sampling separation mirror means disposed in two portions different in a direction of an optical axis on the light transmission passage; parallel reflecting optical means provided for optical paths separated by the sampling separation mirror means; polarizing optical means provided for either of the separated optical paths of the two parallel reflecting optical means; separation polarizing optical means to which light reflected by each of the parallel reflecting optical means through the half mirror guide means; first and second light position detecting units to which each reflected light separated by the separation parallel optical means is supplied; and a control unit for receiving information about deviation in the light position detected by the two light position detecting units to process information so as to operate the mirror adjustment unit.

To achieve the above-mentioned objects, according to the present invention, there is provided a light transmission apparatus incorporating light transmission means for constituting a light transmission passage by combining mirrors; and a mirror adjustment unit for controlling an angle of inclination of at least one mirror constituting the light transmission passage, the light transmission apparatus comprising: a main laser unit for outputting laser beams for machining, inspection or preventive-maintenance/repair of a portion to be machined; a plurality of guide laser units for outputting guide laser beams having the wavelengths which are different from that of the main laser beam and oscillation wavelengths which are different from one another; a plurality wavelength separation mirror means disposed on the light transmission passage so as to correspond to the guide laser units; parallel reflecting optical means disposed on optical paths for the guide laser beams separated by the wavelength separation mirror means; wavelength separation mirror means for reflected light to separate the guide laser beams reflected by each of the parallel reflecting optical means for each wavelength to guide the guide laser beams; a plurality of light position detecting units for individually receiving reflected guide laser beams separated by the wavelength separation mirror means; and a control unit for receiving information about deviation in the light position detected by each of the light position detecting unit to process information so as to operate the mirror adjustment unit.

To achieve the above-mentioned objects, according to the present invention, there is provided a method of adjusting a light transmission apparatus comprising the steps of: providing electronic optical image pickup means on an extension line of an optical axis of a light transmission passage formed by combining mirrors adjacent to a light source; causing the electronic optical image pickup means to observe a mirror image of a target for an image process through a first automatic adjustment mirror adjacent to the light source; adjusting the first automatic adjustment mirror such that the observed mirror image is positioned in the central portion; and adjusting the optical axis of the light transmission passage by sequentially adjusting automatic adjustment mirrors in a similar mirror adjustment method after the first automatic adjustment mirror has been adjusted.

To achieve the above-mentioned objects, according to the present invention, there is provided a method of adjusting a light transmission apparatus comprising the steps of: disposing a light-position detecting unit on an extension line of a light transmission passage formed by combining mirrors adjacent to a light source; disposing a parallel reflecting optical means at an intermediate position of the light transmission passage or adjacent to a laser-beam emitting head; causing the light position detecting unit to detect light reflected by the parallel reflecting optical means for the guide laser beam made incident from the light transmission passage adjacent to the light source; and adjusting feedback-control of an angle an automatic adjustment mirror such that an amount of deviation in the light position detected by the light position detecting unit is canceled.

To achieve the above-mentioned objects, according to the present invention, there is provided a method of adjusting a light transmission apparatus comprising the steps of: disposing electronic optical image pickup means on an extension line of a light transmission passage formed by combining mirrors adjacent to a light source; causing the electronic optical image pickup means to observe a mirror image of a target for an image process through a first automatic adjustment mirror adjacent to the light source; adjusting the first automatic adjustment mirror such that the observed mirror image is positioned in the central portion of the image; performing coarse adjustment of the light transmission passage by sequentially adjusting the automatic adjustment mirrors on the light transmission passage by a method similar to the method of adjusting the first automatic adjustment mirror after the first automatic adjustment mirror has been adjusted; and performing a precise adjustment of the light transmission passage by using a light position detecting unit disposed on an extension line of the light transmission passage adjacent to a light source and parallel reflecting optical means disposed at an intermediate position of the light transmission passage or adjacent to a laser-beam emitting head, wherein the precise adjustment operation is performed such that a light position detecting unit detects reflected light of the guide laser beam made incident from the light source of the light transmission passage and reflected by the parallel reflecting optical means and adjustment of the angle of the automatic adjustment mirror is feedback-controlled such that an amount of deviation in the light position detected by the light position detecting unit is canceled so that precise adjustment of the light transmission passage is performed and an influence of external vibration is corrected.

To achieve the above-mentioned objects, the apparatus according to the present invention comprises a laser oscillator disposed on an operation floor, a control panel, a support column temporarily disposed above a pressure vessel, a light guide pipe held by the support column, a reflecting mirror box having an end connected to an emission opening of the laser oscillator and another end position at an intermediate position of the support column and accommodating a reflecting mirror having an automatic alignment mechanism for modifying refection angle, a mast-shape light guide pipe having an upper end connected to the reflecting mirror box and a lower end partitioned by flat glass so as to transmit laser beams into the reactor in the air, a reflecting mirror box having an upper surface to which the lower end of the light guide pipe mast is connected and one of side surfaces connected to a horizontal light guide pipe, constituted by one or a plurality of mirrors and provided with an automatic alignment mechanism for modifying the angle, a turning vehicle having a turning function which permits rotation and temporarily provided on the upper body of the shroud, the horizontal light guide pipe included in the turning vehicle and plural types of annulus laser machining units each having a structure with which attachment/detachment with respect to the turning vehicle is permitted in the reactor, arranged to receive the laser beams transmitted from the end surface of the horizontal light guide pipe to machine each welding line of a structure in a space surrounded by an outer wall of the shroud body in the boiling-type nuclear reactor pressure vessel, an inner wall of the reactor pressure vessel and a baffle plate and each having a mechanism and a structure specified to be adaptable to each portion which must be machined.

A structure may be employed in which the apparatus including the support column on the operation floor, a light guide pipe mast for connecting the apparatus and the turning vehicle to each other, the turning vehicle and the annulus laser machining units can be separated in the reactor by partitioning the connection portion of the light guide portion for each element. Thus, changing and assembling operations of the plural types of the annulus laser machining units can be performed in the reactor from a remote position.

The end surface of each of the connection portions of the light guide pipe mast, the horizontal light guide pipe included in the turning vehicle and the light guide pipe of the annulus laser machining unit are partitioned by flat glass so that individual closed spaces are maintained. Moreover, the end surface of each of the connection portions of the light guide pipe mast characterized in that one or more water nozzles are secured to spray water to the liquid side of the flat glass, the horizontal light guide pipe included in the turning vehicle and the light guide pipe of the annulus laser machining unit are partitioned by flat glass so that individual closed spaces are maintained. Moreover, one or more water nozzles are secured to spray the liquid side of the flat glass.

The end surface of each of the connection portions of the light guide pipe mast, the horizontal light guide pipe included in the turning vehicle an d the light guide pipe of the annulus laser machining unit are partitioned by flat glass so that individual closed spaces are maintained. Further, an air pressure tube is connected to each light guide pipe.

The turning vehicle incorporates a turning-vehicle clamping mechanism having a link, a hydraulic piston and a pad; a turning mechanism incorporating a rotational bearing having a base which is the turning-vehicle clamping mechanism and permitting rotation of the overall body of the turning vehicle around the center of the reactor pressure vessel, a motor for turning and wheels for turning; and a horizontal light guide pipe disposed on the turning mechanism and having a slide mechanism incorporating a linear guide, a ball screw, gears and a servo motor.

The laser machining unit for annulus incorporates a connection mechanism which can be attached or detached with respect to a horizontal light guide pipe included in the turning vehicle; an expandable light guide pipe for transmitting the laser beam transmitted from the horizontal light guide pipe perpendicularly connected downwards such that the connection mechanism serves as a base, a laser emitting head disposed at the leading end of the light guide pipe performing preventive maintenance machining of surrounding of each of the welding line in the diffuser of the jet pump lower portion, repair machining or the like by laser emitting; and a fixing portion for fixing, to the center of the axis, the laser emitting head at an arbitrary height of a jet pump diffuser disposed in the diffuser.

Prior to installing the apparatus according to the present invention, a head bolt, a 180°-elbow pipe, a nozzle, a barrel, an adapter and so forth of the elements of the jet pump are previously removed to permit an access to the inside portion of the diffuser to be be machined or worked.

The annulus laser machining unit incorporates a connection mechanism which can be attached or detached with respect to a horizontal light guide pipe mounted on the turning vehicle; a rotational light guide pipe for transmitting the laser beam transmitted from the horizontal light guide pipe perpendicularly connected downwards such that the connection mechanism serves as a base and having a shape and dimensions with which seating on the upper end of the diffuser is permitted; a connection portion for a machining arm included in the lower end portion of the rotational light guide pipe and which can be attached or detached from a remote position; and a machining arm arranged to be attached or detached with respect to the connection portion in the reactor pressure vessel from a remote position to perform a laser irradiation operation of the outer surface of the diffuser.

Prior to installing the apparatus according to the present invention, a head bolt, a 180°-elbow pipe, a nozzle, a barrel, an adapter and so forth of the elements of the jet pump are previously removed to permit provision of the rotational light guide pipe for the upper end of the diffuser.

The annulus laser machining unit incorporates a connection mechanism which can be attached or detached with respect to the horizontal light guide pipe included in the turning vehicle; a light guide pipe mast perpendicularly connected downwards such that the connection mechanism serves as a base; a shroud-intermediate portion diffraction mechanism having a hydraulic piston and a parallel link mechanism; an insertion mast having a shape with which passing through a space between the jet pump and the outer wall of the shroud body is permitted; and a laser emitting head.

According to the present invention, the laser emitting head incorporates a converging lens unit, a reflecting mirror or a prism for scanning, a horizontal scanning mechanism, a swinging scan mechanism, a step translation mechanism, a focal-distance adjustment mechanism, a dust removing unit from a surface to be machined, at least one small microphone, a half mirror, a retro-reflector and a monitoring or supervising camera, the structure of the optical system of the laser emitting head is formed such that the laser beam transmitted from the light guide pipe connected to the head is passed through a bellows pipe to be introduced into the half mirror after which the laser beam is divided by the half mirror to the retro-reflector and the converging lens, the laser beam transmitted to the retro-reflector is polarized by a polarizing filter, and then returned to the half mirror and returned to the laser oscillator, the laser beam transmitted to the converging lens is passed through a bellows pipe and a converging lens, and then passed through the partitioning flat glass, after which the laser beam is introduced into water and then reflected by the reflecting mirror for scanning so as to be applied to a portion to be machined, a drive mechanism of the laser emitting head incorporates the step translation mechanism which enables the overall body of the optical system of the head to be moved in a stepped manner and which incorporates a linear guide, a ball screw, gears and a rotation actuator, a converging lens unit which is capable of changing the focal distance from a remote position and which incorporates gears, screws and a rotation actuator, a swingable scan mechanism which enables the reflecting mirror to swing and rotate around the optical axis of the incident laser beam and which incorporates a bearing, gears and a rotation actuator and a horizontal scan mechanism which enables the overall bodies of the converging lens unit and the swingable scan mechanism to be moved laterally in a stepped manner and which incorporates a liner guide, a ball screw, gears and rotation actuator.

The laser emitting head incorporates light converging lens unit, a reflecting mirror (or a prism) for scanning, a swingable scan mechanism, a telescopic light guide pipe mechanism, a focal-distance adjustment mechanism, a dust removing unit from a surface to be machined, at least one small microphone and a monitoring camera, the structure of the optical system of the laser emitting head is formed such that the laser beam transmitted from the light guide pipe to which the head is connected is passed through a hollow-piston type telescopic light guide pipe mechanism partitioned by two flat glass plates so as to be introduced into the converging lens unit, passed through the partitioning flat glass, introduced into water and reflected by the reflecting mirror for scanning so as to be applied to a portion to be machined, and the drive mechanism of the laser emitting head incorporates the telescopic light guide pipe mechanism which enables the overall body of the optical system of the head to be vertically extended or contracted in a stepped manner and which incorporates two flat glass plates, a linear position sensor, an O-ring, a piston mechanism, a returning spring and an air pressure tube, a converging lens unit which has a focal distance which can be changed from a remote position and which incorporates gears, screws and a rotation actuator and a swingable scan mechanism which enables the reflecting mirror to be swung and rotate perpendicularly to the optical axis of the incident laser beam and in a direction of the axis including the mirror surface and which incorporates a bearing, a rotation actuator and an angle detecting sensor.

The laser emitting head incorporates a converging lens unit, a converging lens rotating mechanism, a reflecting mirror (or a prism) for scanning, a telescopic light guide pipe mechanism, a focal-distance adjustment mechanism, a swingable scan mechanism, a dust removing unit from a surface which must be machined, at least one small microphone and a monitoring camera, the structure of the optical system of the laser emitting head is formed such that the laser beam emitted from the light guide pipe to which the head is connected is passed through a hollow piston shape telescopic light guide pipe mechanism partitioned by two flat glass plates, introduced into the converging lens unit formed and assembled such that the position of the focal point is polarized side by somewhat shifting the optical axis of the converging lens with respect to a light incident axis, passed through the partitioning flat glass, introduced into water and reflected by the reflecting mirror for scanning so that a portion to be machined is irradiated with the laser beam, the drive mechanism of the laser emitting head incorporates the telescopic light guide pipe mechanism which enables the overall body of the optical system of the head to be extended or contracted vertically in a stepped manner and which incorporates two flat glass plates, a linear position sensor, an O-ring, a piston mechanism, a returning spring and an air pressure tube, a converging lens unit which has a focal distance which can be changed from a remote position and which has a focal-distance adjustment mechanism incorporating gears, screws and a rotation actuator, a converging-lens rotating mechanism which enables the overall body of the converging lens unit to be rotated around the optical axis of the laser beam and which incorporates gears, screws and a rotation actuator and a swingable scan mechanism which enables the reflecting mirror to be rotated coaxially with the rotational axis of the converging-lens rotating mechanism and which incorporates a rotational shaft and a rotation actuator.

According to the present invention, the laser machining unit incorporates an underwater propeller composed of a screw and a motor and disposed adjacent to the leading end of the laser machining unit, and the propelling force of the underwater propeller prevents external force exerted on the laser machining unit and reaction of a water flow or the dust removing unit from the surface to be machined so that force for stably maintaining the laser emitting head in the portion to be machined is obtained. According to the present invention, the laser oscillator is enclosed in the pressure-proof container so as to temporarily be disposed on the turning vehicle. Thus, the light guide pipe from the laser oscillator to the turning vehicle and the support column are not required so as to be formed into an emitting opening of the laser oscillator.

The laser oscillator has a locating pin and a locking mechanism to permit installation, assembly or separation with respect to the turning vehicle in the reactor from a remote position. Moreover, the light guide pipe between the laser optical fiber and the turning vehicle is partitioned by flat glass one time.

According to the present invention, the laser beams emitted from the laser oscillator disposed above the reactor pool or on the operation floor are passed through the light guide pipe and the multi-step assembly type light guide pipe mast so as to be transmitted to a position immediately below the core in the space. Then, turning on the shroud body and the light guide pipe provided for the inside portion of the slide mechanism cause the laser beams in a lateral direction. Then, the annulus laser machining unit irradiates, with the laser beam, a portion of the annulus portion which must be machined and which is formed on the outer surface of the shroud body and between the reactor pressure vessel and the shroud body. Thus, the laser beams can efficiently be transmitted from the position above the reactor pool or the operation floor to a portion in the incore annulus portion which must be machined.

The light guide pipe for each element has end surfaces each of which is partitioned by glass to permit separation and attachment or detaching from a remote position. Therefore, any one of a variety of annulus laser machining units adaptable to the required operation can easily be selected in the reactor.

The inside portion of the light guide pipe for each element can be maintained in water or air. Since clear water is always sprayed from the water nozzle, introduction of dust into water left in the gap of the partition glass plate and generation of air bubbles on the surface of the glass plate can be prevented after the light guide pipes have been connected to one another so as to be assembled.

Furthermore, substitution of dry air for air (or gas) in each light guide pipe is permitted. Therefore, underwater dew condensation on the mirror in the light guide pipe and glass can be prevented.

The turning vehicle can be fixed to the lattice in the central portion of the core of the upper lattice plate. Thus, the turning vehicle can be turned around the core. The included horizontal light guide pipe can be positioned in an arbitrary azimuth around the outer surface of the shroud body. Moreover, the position of the annulus laser machining unit joined to the turning vehicle by the slide mechanism can be slid and adjusted in the radial direction.

Furthermore, the laser beams can effectively be transmitted to the inside portion of the diffuser below the jet pump. Therefore, the preventive-maintenance/repair operation of a vertical or lateral welded portion can be performed from the inside portion.

According to the present invention, the annulus laser machining unit is divided into two elements or sections which are a rotational light guide pipe and a machining arm. Thus, the outer surface of the diffuser can be machined.

That is, upper elements which obstructs the machining operation are removed from the head bolt, the nozzle, the barrel and the adapter which are portions of the elements of the jet pump and which are positioned upper than the diffuser. Then, the rotational light guide pipe is disposed. The laser beams are transmitted to the upper end of the diffuser through the rotational light guide pipe. Then, the machining arm is able to machine any position around the lower welded portion on the outer surface of the diffuser. The degree of freedom of the rotational light guide pipe to rotate the central axis of the diffuser simultaneously with turning of the machining arm and the degree of freedom of the vertical extension/contraction of the machining arm realize the foregoing operation.

The overall shape of the annulus laser machining unit is formed into a flat and elongated shape. Therefore, insertion into the incore annulus portion is not obstructed by the water supply sparger, the shroud body, the shroud head bolt bracket and the jet pump riser. A flat open space between the jet pumps having a size which is hundred and tens of millimeter×tens of millimeters and through which the baffle plate can be seen from a position above the reactor is used to vertically suspend the annulus laser machining unit. After the insertion has been completed, the upper end of the unit is connected to a connection mechanism of the turning vehicle so as to be placed and secured to the inside portion of the reactor.

Then, the parallel link mechanism is operated to approach the insertion mast to the outer wall of the intermediate body of the shroud. In the described attitude, the parallel link mechanism is positioned in a gap between the lower portion of the upper body of the shroud and the head of the jet pump. Further, the insertion mast has the shape and dimensions to be capable of passing through a gap between the jet pump and the intermediate body of the shroud.

Since the turning vehicle is turned, the annulus laser machining unit is able to move for half of the outer surface of the shroud body without a necessity of vertically moving the annulus laser machining unit. Therefore, a preventive-maintenance/repair operation of the horizontally welded portion on the outer surface of the shroud body can continuously be performed.

In the present invention, the laser beam is scanned one time in the horizontal direction owning to the swing of the reflecting mirror of the swingable scan mechanism. The foregoing operation and vertical step movement of the overall body of the optical system of the head caused by the step translation mechanism are combined with each other. Thus, a predetermined region adjacent to the melted welding line which must be machined can be irradiated with pulse laser beams or continuous laser beams to perform preventive-maintenance, such as improvement in stress or modification of the material, or a repairing operation using laser beam welding. The laser beam can be focused also by a focal-distance adjustment mechanism.

The retro-reflector is mounted as described above. Therefore, if the light guide pipe is vibrated and the optical axis is moved owning to disturbance, such as vibrations, information about position deviation between the present position of the optical axis and a required position of the optical axis can be returned to the laser emitting portion in a real time manner by the retro-reflector. In accordance with information above, the control mechanism of the automatic alignment unit precisely adjust the angles of several movable reflecting mirrors positioned upstream of the laser-beam emitting head. Thus, the optical axis can automatically be corrected. Therefore, deviation in the optical axis of the laser beam can always satisfy a predetermined range, so that the laser beam can be transmitted to the converging lens.

States during the optical fiber and before and after the operation can be monitored by the monitoring camera and one or more small microphones such that sound information is analyzed. Since the dust removing unit from the surface to be machined is mounted, introduction of dust into the optical path for the laser beam can be prevented to smoothly perform the machining operation.

In the present invention, the laser beams are scanned in the vertical direction because the inclination of the reflecting mirror of the swingable scan mechanism is swung. The foregoing operation and the rotation of the reflecting mirror caused by the horizontal scan mechanism are combined with each other. Thus, a predetermined region adjacent to the melted welding line which must be machined can be irradiated with pulse laser beams or continuous laser beams. As a result, preventive-maintenance, such as improvement in the stress or modification of the material or a repairing operation, such as laser welding, can be performed.

The laser beam can be focused by the focal-distance adjustment mechanism. The modification and movement of the position which must be machined are performed by the telescopic light-guide-pipe mechanism. The retro-reflector is mounted as described above. Therefore, if the light guide pipe is vibrated and the optical axis is moved owning to disturbance, such as vibrations, information about position deviation between the present position of the optical axis and a required position of the optical axis can be returned to the laser emitting portion in a real time manner by the retro-reflector.

In accordance with such information, the control mechanism of the automatic alignment unit precisely adjust the angles of several movable reflecting mirrors positioned upstream of the laser-beam emitting head. Thus, the optical axis can automatically be corrected. Therefore, deviation in the optical axis of the laser beam can always satisfy a predetermined range. Therefore, the laser beam can be transmitted to the converging lens.

The state of the machining optical fiber and states before and after the operation can be monitored by the monitoring camera and one or more small microphones such that sound information is analyzed. Since the dust removing unit from the surface to be machined is mounted, introduction of dust into the optical path for the laser beam can be prevented to smoothly perform the machining operation.

Since the central axis of the converging lens is made to be eccentric with respect to the rotational axis of the converging lens, the focal point exists at a position deviated sideward from the rotational axis of the converging lens. When the converging lens is rotated, the focal point is turned around the rotational axis. This fact is usable to realize circular scanning, followed by bending the laser beam by the reflecting mirror and followed by swinging the reflecting mirror. As a result, the circular scanning is swung horizontally to realize spiral and two dimensional scanning.

The propelling force of the underwater propeller presses the annulus laser machining unit against the surface which must be machined. Thus, the laser-beam emitting head can stably be positioned.

Since the laser oscillator is disposed in the reactor, the elements, such as the light guide pipe and the support column, from the operation floor to the turning vehicle, are not required. Therefore, a compact system can be realized.

Only the laser oscillator can be recovered to the outside of the retro-reflector such that the turning vehicle is left in the reactor. If adjustment must be performed during the operation because, for example, maintenance of the laser oscillator is required, only the laser oscillator can easily be moved upwards to the operation floor to perform direct maintenance. Therefore, deterioration in the working efficiency can be prevented.

BEST MODE FOR CARRYING OUT THE INVENTION

An embodiment of a laser emitting head and an incore-structure preventive-maintenance/repair apparatus incorporating an emitting head according to the present invention will now be described with reference to the accompanying drawings.

Figure 1:
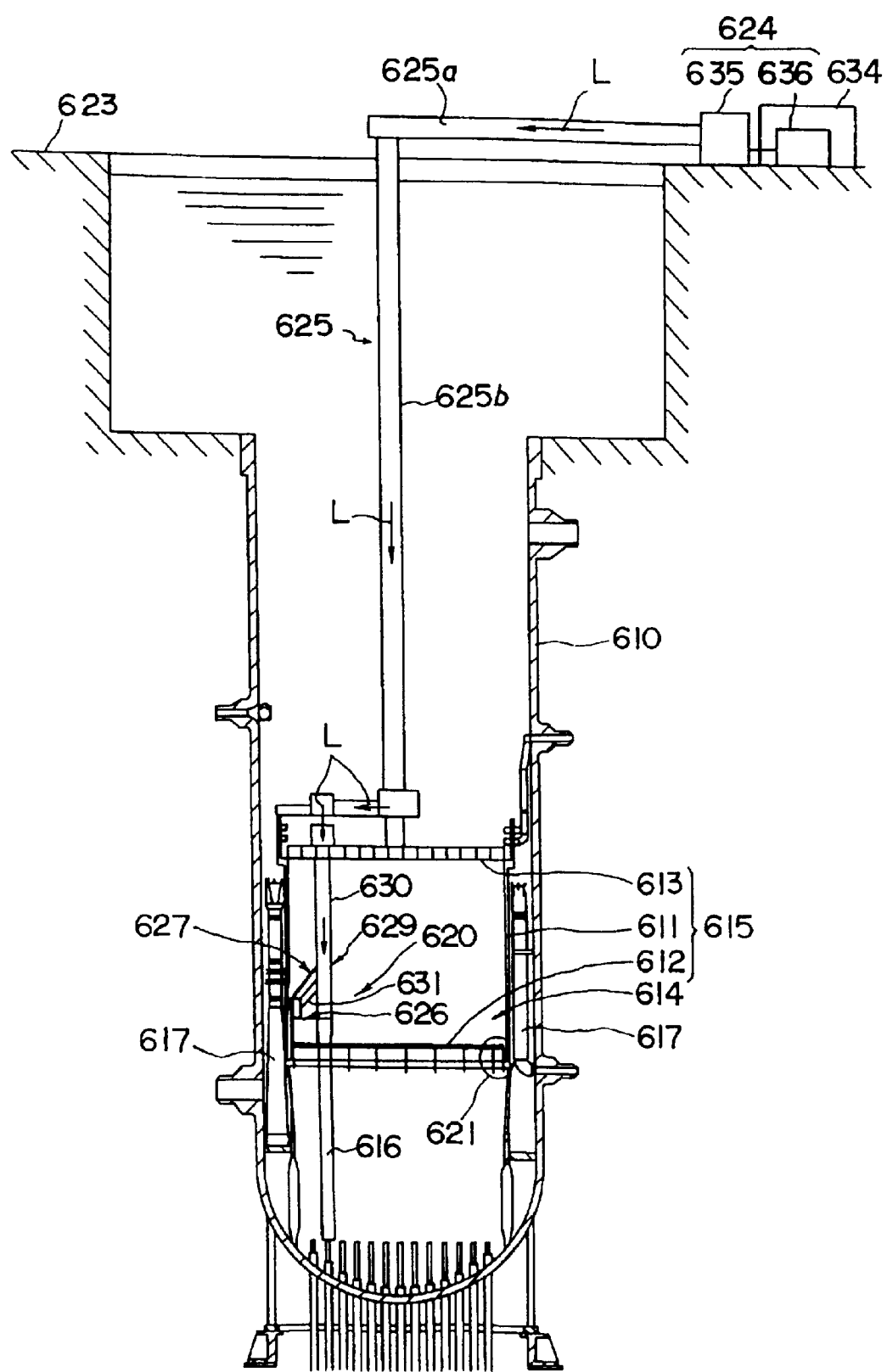
FIG. 1 is a schematic view showing a laser-beam emitting head according to the present invention and a state in which a preventive-maintenance/repair apparatus for an incore structure has been set in the nuclear reactor.

FIG. 1 is a schematic view showing an embodiment in which the incore-structure preventive-maintenance/repair apparatus according to the present invention is applied to a small portion in the nuclear reactor.

Referring to FIG. 1, reference numeral 610 represents a (nuclear) reactor pressure vessel 610 of, for example, a boiling water reactor. In the reactor pressure vessel 610, a cylindrical shroud 611, a core support plate 612 and an upper lattice plate 613 are accommodated. Thus, a core portion 614 is constituted. The shroud 611, the core support plate 612 and the upper lattice plate 613 constitute an incore structure 615. Moreover, a multiplicity of control-rod guide pipes 616 are disposed below the core support plate 612. FIG. 1 shows only one control-rod guide pipe 616. Reference numeral 617 represents jet pumps.

The incore structure 615 in the nuclear-reactor pressure vessel 610 is checked or inspected when a periodic inspection or the like is performed. Fuel in predetermined quantity is changed to perform a next operation of the nuclear reactor. The periodic inspection is performed such that a region above the nuclear-reactor pressure vessel 610 is covered with water. When the periodic inspection or the like is performed, a preventive-maintenance/repair apparatus 620 according to the present invention is operated.

The preventive-maintenance/repair apparatus 620 uses laser beams to perform a preventive-maintenance/repair operation of a small portion in the reactor pressure vessel 610, the operation being performed in an underwater environment. A number of small portions exist in the reactor pressure vessel 610. For example, a sleeve-shape or a truss shape small portion held between the cylindrical shroud 611 and the core support plate 612 in the reactor pressure vessel 610 is a cylindrical small portion 621 having a width of about 30 mm and a depth of 400 mm. A portion of a vertical welding line and a lateral welding line of the shroud 611 correspond to the cylindrical small portion 621.

The shroud 611 is formed into the cylindrical shape by integrating plate-like or annular shroud component members (an upper body, an intermediate body and a lower body) to one another along the vertical and lateral welding lines by welding. A portion of the vertical welding line (a welding line on the inside of V5) existing in a lower half portion on the inside of the shroud intermediate body or a horizontal welding line (a welding line on the inside of H6a) at the lower end of the inside portion of the shroud intermediate body are positioned in the cylindrical small portion 621 of the shroud 611 and the core support plate 612. Since each welding line of the shroud 611 is subjected to a thermally severe environment during the operation of the nuclear reactor, there is apprehension of deterioration after use for a long time. The preventive-maintenance/repair apparatus 620 performs a preventive-maintenance/repair operation of the small portion of the incore structure 615. Thus, the stress removing from the surface layer of the cylindrical small portion 621 of the incore structure 615 which cannot easily be machined, surface modification of a sensitized (desensitization) metallographic structure of the same and repair (maintenance) by performing a welding operation are efficiently and effectively performed.

The preventive-maintenance/repair apparatus 620 for the incore structure of a nuclear reactor, as shown in FIG. 1, incorporates a laser emitting unit 624 disposed on an operation floor 623 above the reactor pressure vessel 610; a laser-beam transmission means 625 for introducing laser beams L emitted from the laser emitting unit 624 into the reactor pressure vessel 610; and a laser-guide joining/scanning means 627 serving as a laser-beam transmission means for introducing the transmitted laser beam into the laser emitting head 626. The laser-guide joining/scanning means 627 constitutes a laser-beam transmission means for, in air, transmitting laser beam L transmitted from the laser-beam transmission means 625 to the laser emitting head 626. The laser-guide joining/scanning means 627 constitutes an underwater-environment light transmission means for introducing the laser L to the laser emitting head 626 in an underwater environment.

Figure 2:
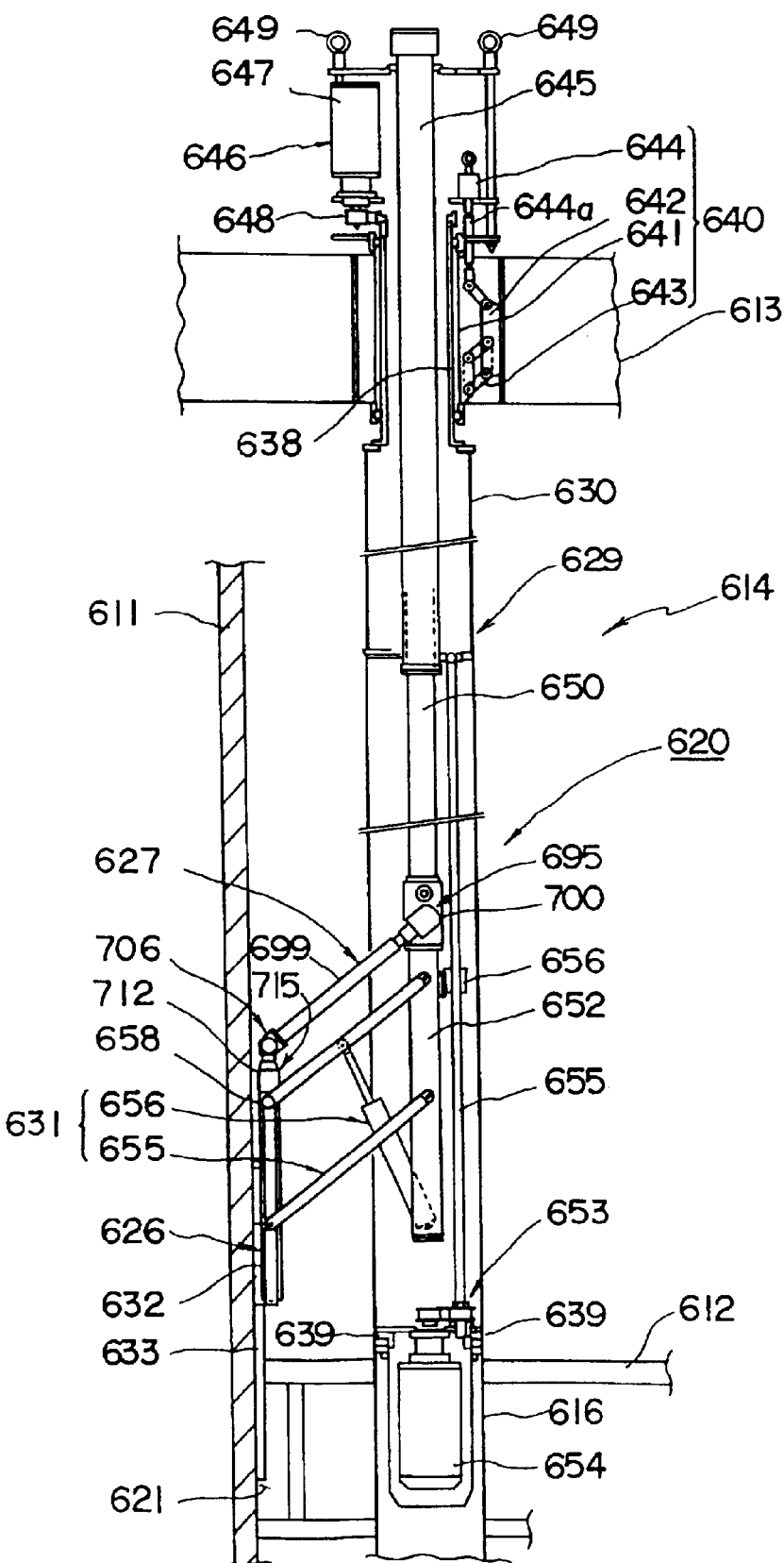
FIG. 2 is a side view showing an embodiment of the preventive-maintenance/repair apparatus for an incore structure according to the present invention.

As shown in FIG. 2, the preventive-maintenance/repair apparatus 620 incorporates a box-shape main-body locating unit 629 disposed between the upper lattice plate 613 and the core support plate 612 in the core portion 614. The main-body locating unit 629 incorporates a cylindrical main-body case 630 which is able to freely rotated. The laser emitting head 626 is accommodated in the main-body case 630 such that introduction and discharge are permitted by a head movement mechanism 631. The laser emitting head 626 is supported such that movement between an accommodation position in the main-body case 630 and a position extending sideward from a side opening of the main-body case 630 is permitted.

The laser emitting head 626 incorporates a laser-emitting-head body 632 in a flat frame structure or a plate structure; and an elevation-support frame mechanism 633 serving as an elevation support mechanism supported by the laser-emitting-head body 632 such that elevation is permitted and formed into an elongated and flat shape. A reflecting mirror (to be described later) serving as an emission mirror for emitting the laser beam L is disposed adjacent to the lower end of the elevation-support frame mechanism 633. The laser emitting unit 624 disposed on the operation floor 623 above the reactor pressure vessel 610, as shown in FIG. 1, incorporates a laser oscillator 635 and a laser-beam source 636 for applying a high voltage required to perform the emission of the laser beams. Furthermore, a control plate and an operation plate 634 for controlling the operation of the preventive-maintenance/repair apparatus 620 and operating the same are disposed on the operation floor 623.

The laser beam L emitted from the laser oscillator 635 is introduced to a position adjacent to the upper lattice plate 613 by an incore upper light transmission unit 625 which is a laser-beam transmission means. Then, the laser beam L is transmitted into the main-body case 630 of the main-body locating unit 629. The incore laser-beam transmission means 625 is an L-shape means formed by connecting an air light-transmission means 625a and an underwater light-transmission means 625b so that the laser beam L is transmitted in the air. The leading end of the underwater light-transmission means 625b is disposed on the upper lattice plate 613 so as to be supported by the same.

As shown in FIG. 2, the main-body locating unit 629 incorporates a cylindrical member 638 in an upper portion in the axial direction thereof, the main-body locating unit 629 being joined integrally with the main-body case 630 in the axial direction. A case flange 639 for the main-body case 630 is disposed in the leading end in the axial direction. The case flange 639 is rotatively supported by a top end of the control-rod guide pipes 616. The cylindrical member 638 above the main-body case 630 is positioned so as to correspond to a lattice portion of the upper lattice plate 613. The upper portion of the main-body case 630 is clamped rotatively with respect to the upper lattice plate 613 by the clamping unit 640.

The clamping unit 640 incorporates a sleeve-shape clamp cylinder 641 for rotatively covering the cylindrical member 638; clamp pads 642 which are brought into contact with the lattice wall of the upper lattice plate 613 so as to be stopped; a pad-movement support mechanism 643 for supporting the clamp pad 642 such that introduction and discharge of the clamp pads 642 to and from the clamp cylinder 641 are permitted; and a clamp operating mechanism 644 for operating the pad-movement support mechanism 643. The number of the clamp pads 642 is four so as to correspond to the rectangular lattice wall of the upper lattice plate 613.

The clamp operating mechanism 644 comprises, for example, an air cylinder which is secured to a stationary light-transmission pipe 645 provided in the main-body case 630. When the air cylinder has been operated, an operation rod 644a is moved upward/downward (up and down). Thus, the clamp pads 642 is supported to be movable between a clamping position, at which the clamp pads 642 is pressed against the lattice wall of the lattice wall of the upper lattice plate 613 so as to be stopped, and a release position retired from the lattice wall.

Furthermore, a rotating unit 646 for rotating the clamping unit 640 is disposed so as to correspond to the clamping unit 640. The rotating unit 646 is provided for the stationary light-transmission pipe 645. The rotating unit 646 incorporates, for example, a rotating motor 647. When the motor operation has been performed, the power transmitting means 648 rotates the cylindrical member 638 through a motor output shaft. Thus, the main-body case 630 is rotated around the central axis. A suspending bolt 649 is disposed adjacent to the top end of the stationary light-transmission pipe 645. The suspending bolt 649 is used so that a suspending unit (not shown) suspends and dispose the main-body case 630 of the preventive-maintenance/repair apparatus 620. The suspending unit is joined to a fuel exchanging machine provided in the building of the nuclear reactor or an operation vehicle.

On the other hand, in the main-body case 630, a telescopic elevating light-transmission pipe 650 is provided for the stationary light-transmission pipe 645. The elevating light transmission pipe 650 is telescopically supported by the stationary light-transmission pipe 645 such that elevation and rotation are permitted. Thus, integral rotation with the main-body case 630 is permitted. An elongated main-body base 651 is integrally connected to the lower end of the elevating light-transmission pipe 650. The up and down movement of each of the elevating light-transmission pipe 650 and the main-body base 651 is performed by a base elevating unit 653 disposed in the lower portion of the main-body case 630.

The base elevating unit 653 incorporates an elevating motor 654 secured to the lower end of the main-body case 630 and capable of rotating reversibly; a screw shaft 655 which is rotated by the elevating motor 654 through a power transmission means and which serves as an elevating ball screw; and an elevating nut 656 which is engaged to the screw shaft 655 by a thread. The elevating nut 656 is secured to the elevating main-body base 651 so that the elevating nut 656 is moved up and down by the rotations of the elevating motor 653. To follow the up and down movement of the elevating nut 656, the elevating main-body base 651 and the elevating light-transmission pipe 650 are integrally moved up and down.

The elevating main-body base 651 movably supports the laser emitting head 626 through the head movement mechanism 631 serving as a head projecting mechanism. The head movement mechanism 631 is composed of, for example, parallel four-joint linking mechanisms 655 and a linking operation mechanism 656. The parallel four-joint linking mechanisms 655 forming a pair are disposed opposite to each other at positions between the laser emitting head 626 and the elevating base of the 652 of the main-body case 630. The parallel four-joint linking mechanism 655 is operated by a linking operation mechanism 656, such as an air cylinder. Thus, the parallel four-joint linking mechanism 655 is supported movably between the projection position, at which the parallel four-joint linking mechanism 655 is pressed against the inner wall of the shroud 611, and the accommodating position in the main-body case 630. The linking operation mechanism 656 comprises, for example, an air cylinder. An end of the air cylinder 656 is connected to the elevating base 652 and an operation rod at another end of the same is connected to an intermediate position of a component link of the parallel four-joint linking mechanism 655 such that rotations are permitted by means of hinges.

Figure 3:
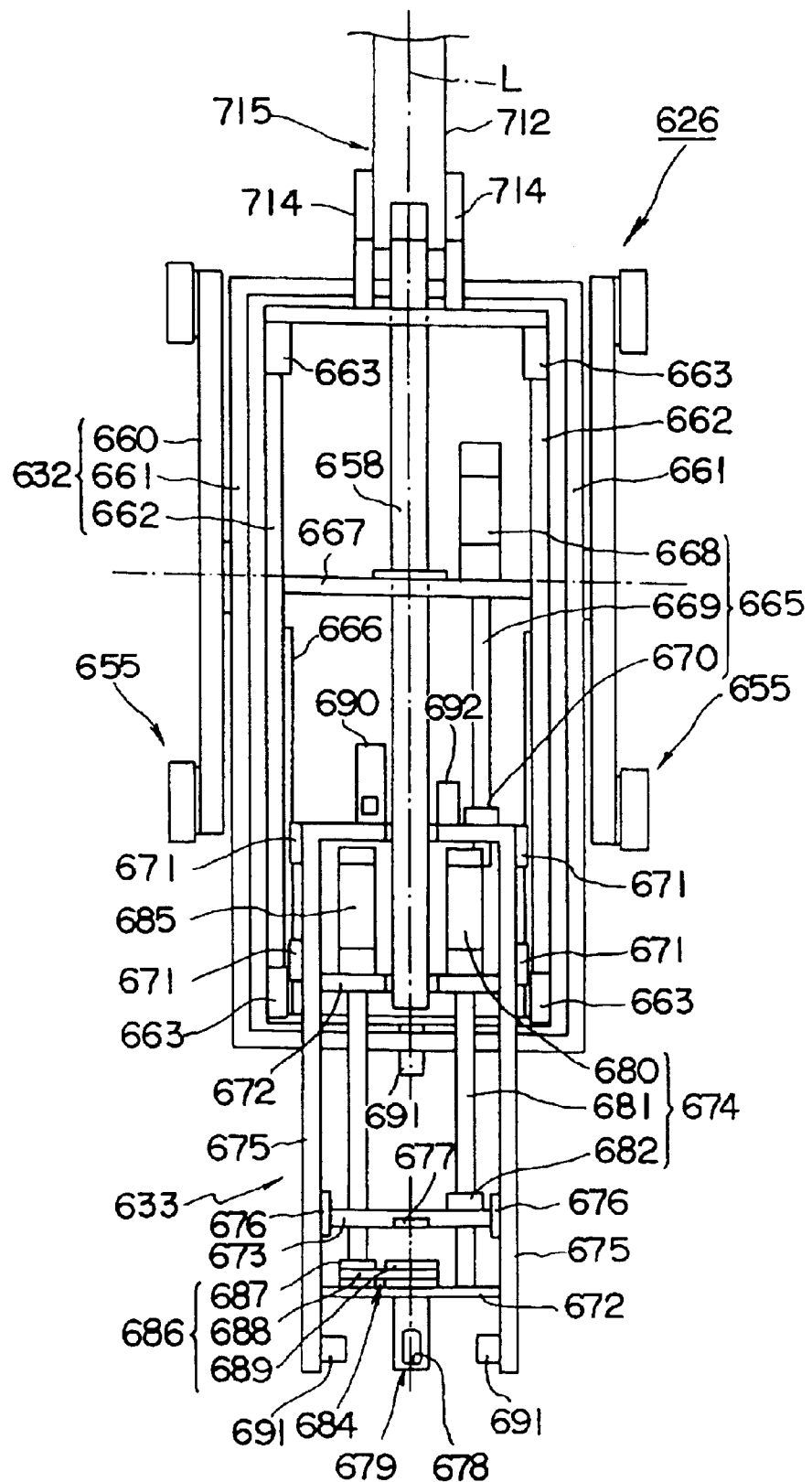
FIG. 3 is a front view showing the laser-beam emitting head provided for the preventive-maintenance/repair apparatus shown in FIG. 2.

As shown in FIG. 3, the laser emitting head 626 incorporates a laser-emitting-head body 632 connected to the parallel four-joint linking mechanism 655 which is the head movement mechanism 631 and formed into a flat and rectangular frame shape. The laser-emitting-head body 632 incorporates, in the central portion thereof, a head-inside light-transmission member 658 serving as a laser-beam transmission pipe which is disposed in the lengthwise direction. On the other hand, the laser-emitting-head body 632 incorporates a leading-end swing link of the parallel four-joint linking mechanism 655. The laser-emitting-head body 632 is formed into a frame structure constituted by an outer frames 660 forming the swing link and forming a pair of a first frame 661 supported by the outer frame 660 such that rotation around a trunnion is permitted and formed into a rectangular intermediate frame and a second frame 662 supported rotatively around the vertical axis of the first frame 661 and serving as a rectangular inner frame.

Figure 4:
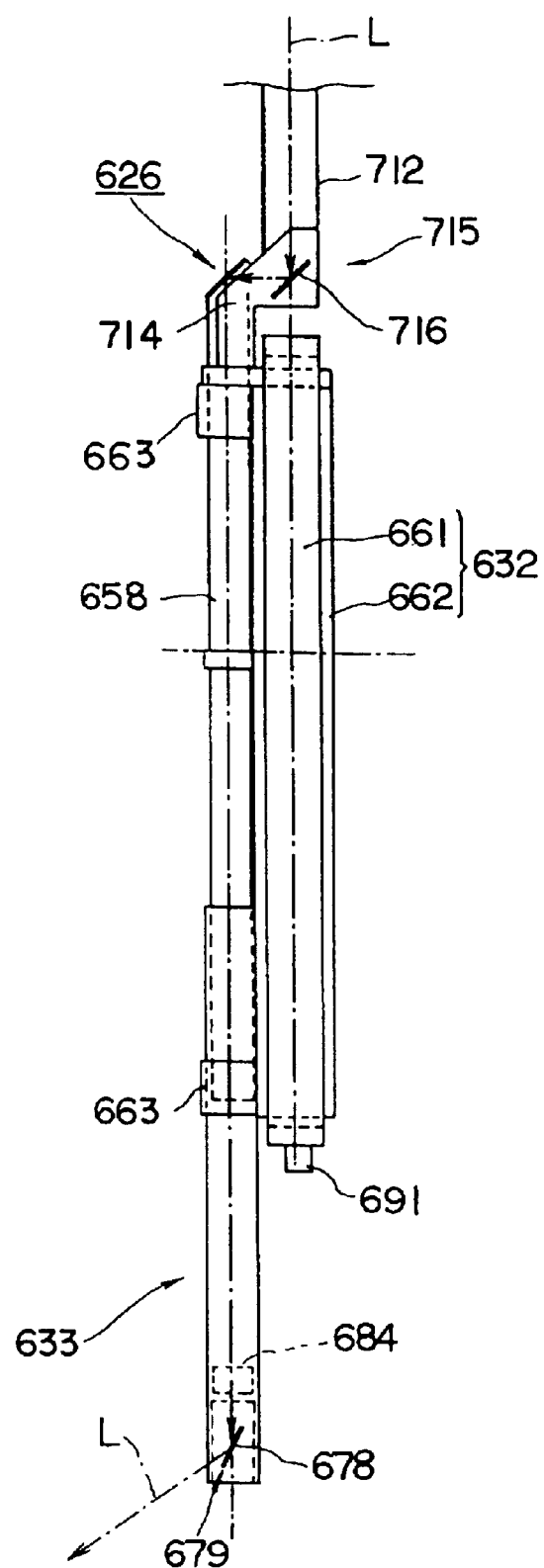
FIG. 4 is a schematic side view showing the laser-beam emitting head shown in FIG. 3 in a state in which its outer frame has been removed.

The first frame 661 and the second frame 662, as shown in FIGS. 3 and 4, constitute an orthogonal biaxial gimbal mechanism. When the parallel four-joint linking mechanism 655 has been operated to press the laser emitting head 626 against the shroud 611, pressing portions 663 provided for the four corners of the second frame 662 serving as the inner frame are stably brought into contact with the inner wall of the shroud 611. Thus, the laser emitting head 626 can stably and reliably be disposed in the shroud 611. Even if the preventive-maintenance/repair apparatus 620 is disposed diagonally, the gimbal mechanisms 661 and 662 absorb deviation in the directions of the horizontal axis and the vertical axis to press the laser emitting head 626.

A head-inside (in-head) light-transmission member 658 is, in the lengthwise direction, joined to the second frame 662 which is the inner frame of the laser-emitting-head body 632. The elevation-support frame mechanism 633 is disposed below the second frame 662 such that the up and down movement is permitted. Further, the elevation-support frame mechanism 633 is formed into a flat and rectangular frame shape so as to stably be moved up and down along the guide rail 666 by the operation of the frame elevating unit 665.

The frame elevating unit 665 is disposed between the second frame 662 and the elevation-support frame mechanism 633. Specifically, the frame elevating unit 665 incorporates, for example, an elevating motor 668 provided for a horizontal bridge frame 667 for reinforcing the second frame 662; a screw shaft 669 serving as an output shaft which is rotated by the elevating motor 668; and a frame elevating nut 670 connected to the screw shaft 669 by a thread. The frame elevating nut 670 is secured to the elevation-support frame mechanism 633.

When the frame elevating unit 665 is operated, guide shoes 671 provided on the two sides of the elevation-support frame mechanism 633 are slid and guided along the guide rails 666 of the second frame 662 so that the elevation-support frame mechanism 633 is stably and smoothly moved up and down.

The elevation-support frame mechanism 633 of the laser emitting head 626 are reinforced by bridge frames 672 disposed on the upper and lower portions of the elevation-support frame mechanism 633. On the other hand, a slide frame 673 which can be moved up and down is disposed between the upper and lower bridge frames 672. The slide frame 673 is moved up and down along the elevation frame 675 of the elevation-support frame mechanism 633 by a lens-movement adjustment unit 674. The slide frame 673 incorporates sliders 676 which are disposed on the two sides thereof and which are guided along the elevation frame 675. A converging lens 677 is disposed in the central portion of the slide frame 673.

The lens-movement adjustment unit 674 serves as a distance-adjustment means for adjusting the distance from the converging lens 677 provided for the slide frame 673 and a reflecting mirror 678 at the lower end of the elevation-support frame mechanism 633. The lens-movement adjustment unit 674 incorporates an adjustment elevating motor 680 secured to the elevation frame 675; an adjustment screw shaft 681 which is rotated by the motor 680; and an adjustment nut 682 connected to the screw shaft 681 by a thread. The adjustment nut 682 is joined to the slide frame 673.

The converging lens 677 and the reflecting mirror 678 constitute an irradiation scanning optical system 679 of the laser emitting head 626. The irradiation scanning optical system 679 is accommodated in an elevation-support frame mechanism 633 formed into an elongated flat frame structure. The irradiation scanning optical system 679 can freely be introduced/discharged together with the elevation-support frame mechanism 633 with respect to a number of small portions, such as the cylindrical small portion 621 of the incore structure 615. The optical path between the converging lens 677 of the irradiation scanning optical system 679 and the reflecting mirror 678 and the optical path from the head-inside light-transmission member 658 to the converging lens 677 are exposed to the surrounding environment so as to form a space transmission passage. Each of the head-inside light-transmission member 658, the converging lens 677 and the reflecting mirror 678 is independently joined to the laser emitting head 626. Thus, joining freedom can be improved.

The reflecting mirror 678 disposed in the central portion of the lower end of the elevation-support frame mechanism 633 is supported such that swinging is permitted (rotation is permitted) around the optical axis of the laser beam L by an oscillation unit 684 serving as a mirror rotating means. The oscillation unit 684 incorporates an oscillation motor 685 provided for the bridge frames 672 of the elevation frame 675; and a power transmitting means 686 for transmitting the rotational force of the motor to the reflecting mirror 678. The drive pulley 687 incorporates a drive pulley 687 secured to a motor output shaft; and a driven pulley 689 connected to the drive pulley 687 through a timing belt 688 so as to be rotated. The driven pulley 689 is rotatively supported by the bridge frames 672 of the elevation-support frame mechanism 633. The driven pulley 689 is integrated or integrally provided for a support cylinder for supporting the reflecting mirror 678. The diameter of the driven pulley 689 is larger than that of the drive pulley 687 to be capable of precisely adjusting the oscillation angle of the reflecting mirror 678. Note that the power transmitting means 686 may be formed into a gear mechanism in place of the belt pulley mechanism.

The motor 685 of the oscillation unit 684 and the motor 680 of the lens-movement adjustment unit 674 are disposed on the right-hand and left-hand sides of the upper bridge frames 672 of the elevation-support frame mechanism 633. Thus, the weights of right-hand and left-hand portions of the elevation support frame mechanism 633 can be balanced on the two sides of the head-inside light transmission member 658. In place of providing the lens-movement adjustment motor 680 for the elevation-support frame mechanism 633, the motor 680 may be provided for the slide frame 673. In the foregoing case, the ferrite indicator 682 is provided for the elevation-support frame mechanism 633.

As an alternative to providing the motor 668 of the frame elevating unit 665 for moving up and down the elevation-support frame mechanism 633 for the second frame 662 of the laser-emitting-head body 632, the motor 668 may be provided for the elevation-support frame mechanism 633. In this case, the frame elevating unit 665 is able to move the converging lens 677 and the reflecting mirror 678 in the direction of the optical axis of the laser beam such that a predetermined distance from the converging lens 677 to the reflecting mirror 678 is maintained.

The elevation-support frame mechanism 633 of the laser emitting head 626 is provided with a visual monitoring camera 680 serving as a head-position detecting means for detecting the position of the laser emitting head 626 with respect to the place which must be machined. The visual monitoring camera 680 enables the position of the laser emitting head 626, the welding line and a state of machining to be recognized from a remote position. For example, a plurality of, for example, three supersonic microphone 681 for recognizing and measuring a state of irradiation of the portion which must be machined with the laser beams are joined to the elevation-support frame mechanism 633. A ferrite indicator 682 serving as a laser-beam applying position (the welding line) detecting means is provided for the elevation-support frame mechanism 633. The ferrite indicator 682 detects the position of the laser emitting head 626 with respect to the welding line to align the position of the laser emitting head 626 so that position adjustment is permitted.

Figure 5:
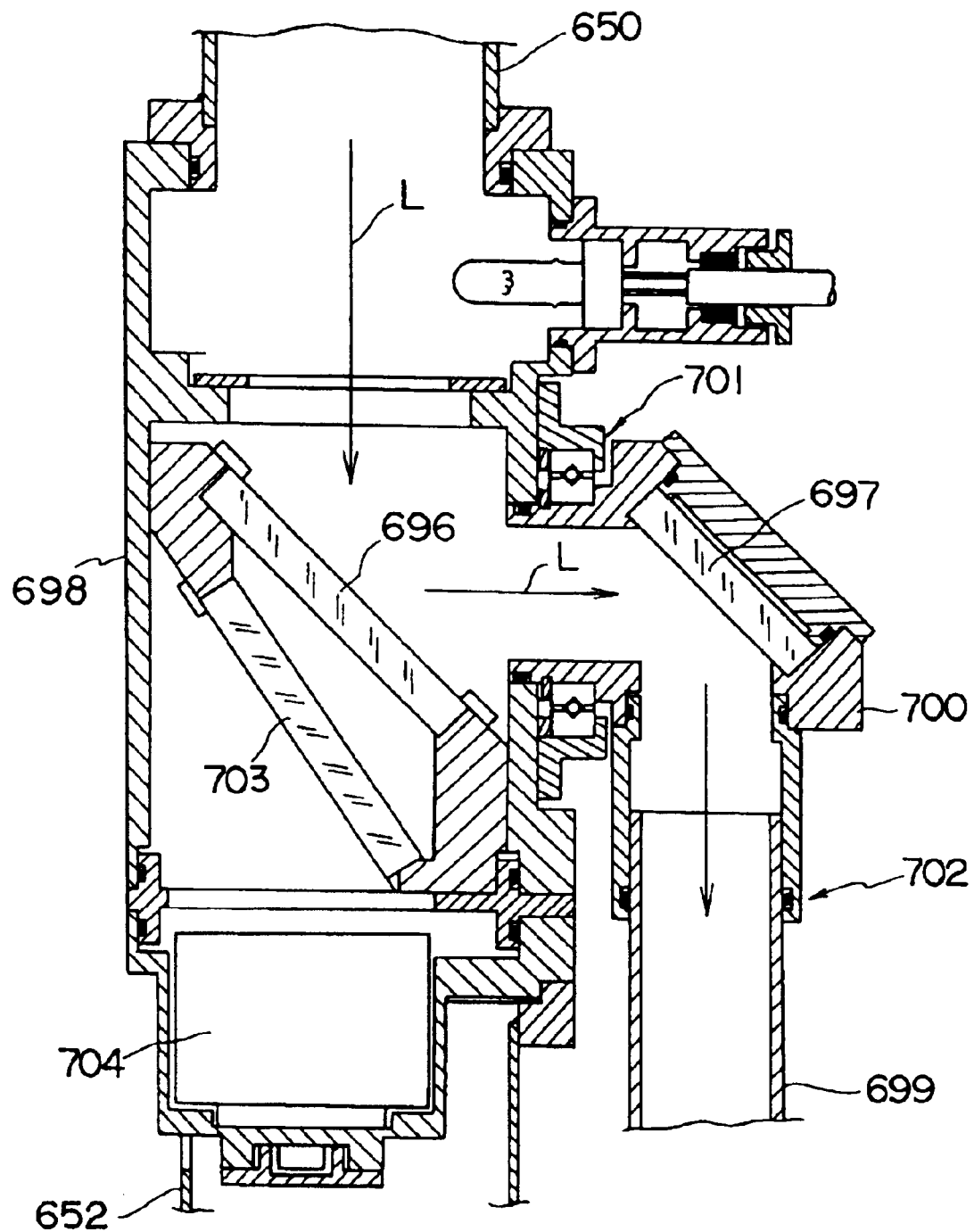
FIG. 5 is a cross sectional view showing an upper rotational joint portion of a body locating unit provided for the preventive-maintenance/repair apparatus shown in FIG. 2.
Figure 6:
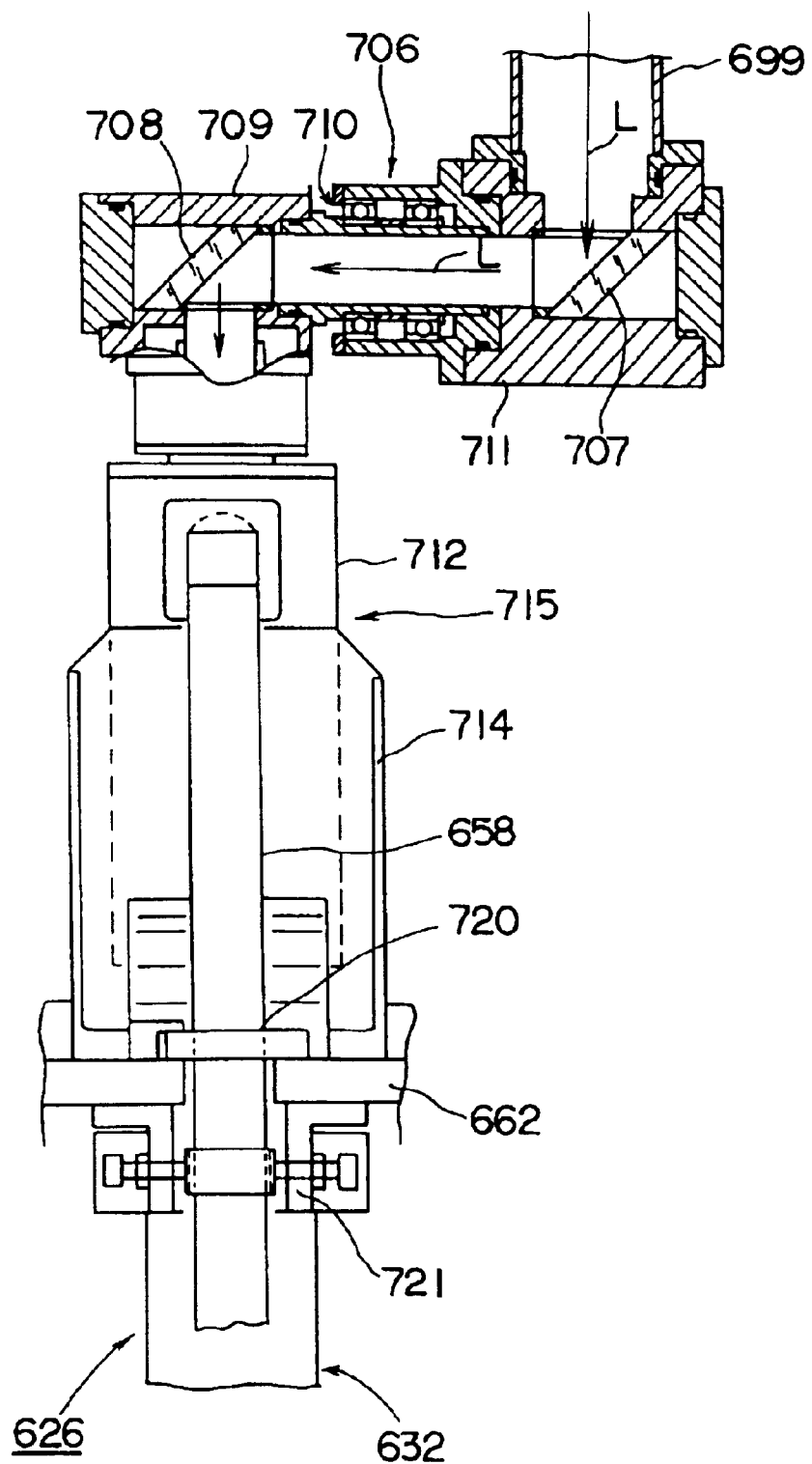
FIG. 6 is a diagram showing a lower rotational joint portion disposed above the laser-beam emitting head.

Referring to FIGS. 5 and 6, a laser-beam transmission apparatus for transmitting the laser beam L introduced into the reactor pressure vessel 610 to the laser emitting head 626 will now be described.

The laser beam L introduced into the position adjacent to the upper lattice plate 613 in the reactor pressure vessel 610 by the laser-beam transmission means 625 is introduced into the main-body case 630 of the preventive-maintenance/repair apparatus 620. Specifically, the laser beam L is introduced into the stationary light-transmission pipe 645 of the main-body case 630 which constitutes the main-body locating unit 629, and then introduced into the elevating light-transmission pipe 650 from the stationary light-transmission pipe 645.

A first cranking (crank) scan mechanism 695 which is capable of rotary-scanning the laser beam L in a crank shape is disposed below the elevating light-transmission pipe 650. The first cranking scan mechanism 695 constitutes an upper rotation joint scanning mechanism. The first cranking scan mechanism 695 incorporates a pair of crank mirrors 696 and 697, as shown in FIG. 5 to scan the laser beam in the crank shape. The first crank mirror 696 is a half mirror diagonally provided for a main-body cylinder 698 secured to a position below the elevating light-transmission pipe 650. The laser beam L introduced from an upper portion into the elevating light-transmission pipe 650 is reflected sideward at an angle of 90° by the first crank mirror 696. The laser beam L is again reflected sideward at an angle of 690° by the second crank mirror 697 so as to be scanned in the crank shape so as to be introduced into the extension light-transmission pipe 699.

The main-body cylinder 698 of the first cranking scan mechanism 695 constitutes a connection means for integrally connecting the elevating light-transmission pipe 650 and the main-body base 651 to each other. An elbow member 700 is rotatively supported on the side of the main-body cylinder 698 by an upper rotation joint 701. The elbow member 700 is provided with the second crank mirror 697 which constitutes a reflecting (reflector) mirror. The extending light-transmission pipe is, by the slide joint 702, telescopically and slidably supported by the elbow member 700. Thus, even if the extending light-transmission pipe 699 is rotated, the laser beam L can be transmitted to the central portion.

On the other hand, the first crank mirror 696 of the first cranking scan mechanism 695 is a half mirror. A portion of the laser beam L which has penetrated the half mirror is passed through the polarizing device 703, and then made incident on a retro-reflector 704 serving as an optical-axis detection means. The retro-reflector 704 is an optical device for reflecting the laser beam L towards the central portion during the laser beam L is being transmitted through the axis of the elevating light-transmission pipe 650. If the laser beam L is deviated from the foregoing axis, the retro-reflector 704 reflects the laser beam L to the direction opposite to the direction of the deviation. Even if the optical axis of the laser beam L is deviated from the axis, the retro-reflector 704 enables the optical axis of the laser beam L to be corrected by, on the incident portion (adjacent to the laser output portion), detecting light reflected by the retro-reflector 704.

The laser beam L passed from the elevating light-transmission pipe 650 to the light-transmission pipe 699 through the first cranking scan mechanism 695 is introduced into a second cranking (crank) scan mechanism 706 disposed at another end of the extending light-transmission pipe 699. As shown in FIG. 6, the second cranking scan mechanism 706 incorporates a pair of crank mirrors 707 and 708 to scan the laser beam L in the crank shape. The first crank mirror 707 is diagonally disposed at the other end of the extending light-transmission pipe 699 to reflect the laser beam L passed through the extending light-transmission pipe 699 to the side portion at an angle of 90°. For example, the laser beam L is reflected to the horizontal direction. The laser beam L reflected downward at an angle of 90°, for example, to the vertical direction, by the second crank mirror 708 so as to be scanned in the crank shape.

A holding cylinder 709 for holding the second crank mirror 708 is, by the lower horizontal-rotation joint 710, supported on the holding cylinder 711 of the first crank mirror 707 such that rotation around the axis is permitted.

An extending cylindrical 712 serving as a head-upper-portion housing is rotatively supported on the 710 of the second crank mirror 708 by the lower vertical-rotation joint 713. The extending cylindrical 712 is joined to the laser-emitting head body 632 of the laser emitting head 626 through a joining bracket 714 to constitute a head upper portion 715.

Figure 7:
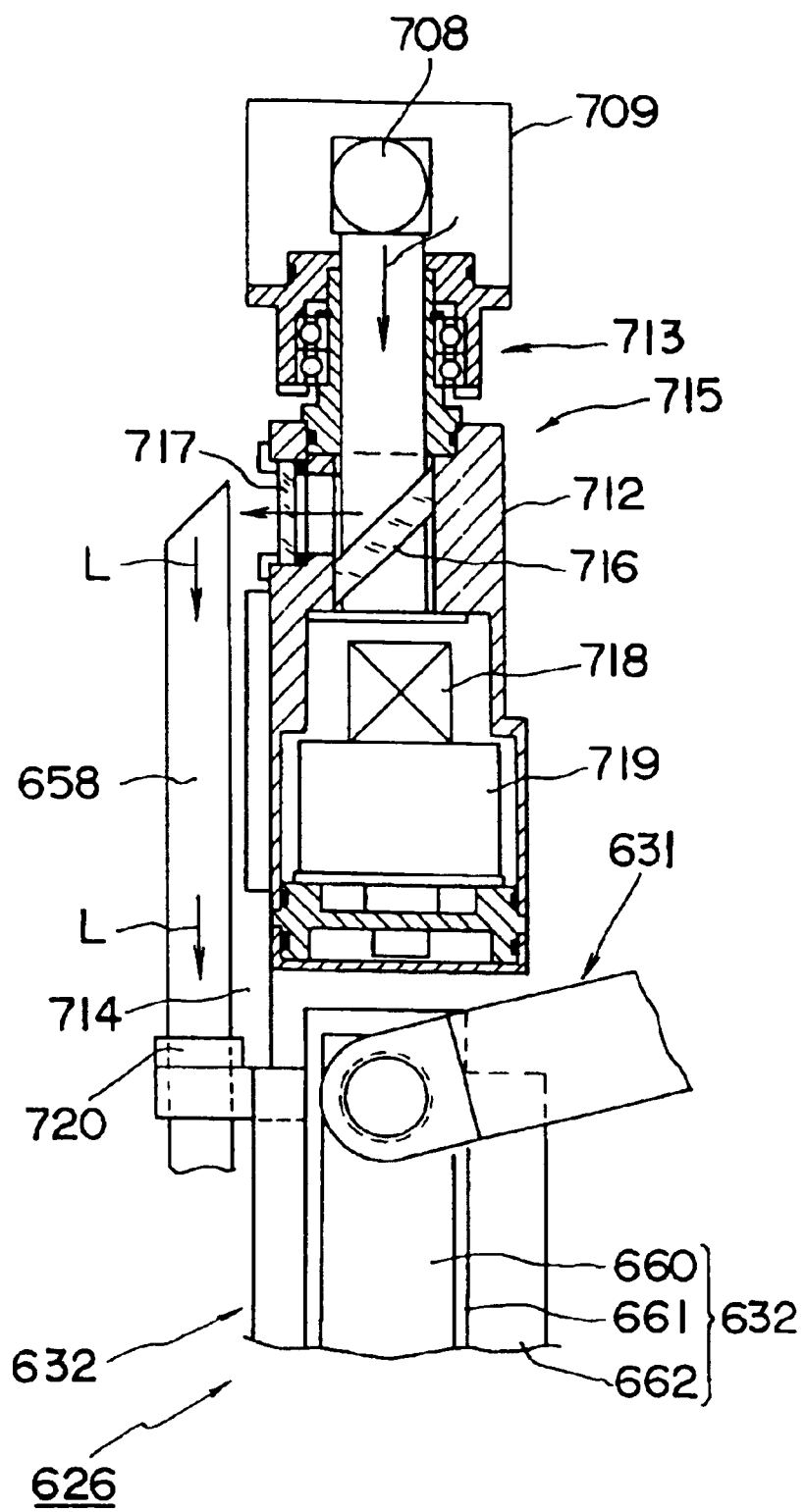
FIG. 7 is a partial and side cross sectional view showing an upper portion of the head of the laser-beam emitting head.

As shown in FIG. 7, an emitting-head upper mirror 716 is diagonally disposed at an intermediate position of the extending cylindrical 712. The upper mirror 716 is a half mirror. The laser beam L introduced into the extending cylindrical 712 by the second cranking scan mechanism 706 is reflected forward at an angle of 90° by the emitting-head upper mirror 716 so as to be passed through a seal glass 717. Then, the laser beam L is introduced into the cylindrical in-head light-transmission member 658 of the laser emitting head 626 so as to be transmitted through the in-head light-transmission member 658 in the air.

The emitting-head upper mirror 716 is a half mirror. A portion of the laser beam L penetrates the upper mirror 716 so as to be introduced into the polarizing device 718. Then, the portion of the laser beam L is passed through the polarizing device 718 so as to be made incident on a retro-reflector 719 serving as an optical-axis deviation detection means. Similarly to the retro-reflector 704 (see FIG. 5) accommodated in the main-body case 630, the retro-reflector 719 constitute a means for detecting and correcting deviation of the optical axis of the laser beam L.

The retro-reflector 704 is disposed as described above. Thus, even if the optical axis of the laser beam L is deviated in a downstream position because the laser beam L, the optical axis of which has been corrected before it is passed through the light-transmission pipe 699, is passed through the first and second cranking scan mechanisms 695 and 706, the laser beam L can be corrected towards the axis.

The laser beam L introduced from the seal glass 717 which is the optical device of the extending cylindrical 712 into the head-inside light-transmission member 658 of the laser emitting head 626 is, in the air, transmitted through the in-head light-transmission member 658. Thus, as shown in FIGS. 3 and 4, the laser beam L is emitted into water from the lower end of the in-head light-transmission member 658. Then, the laser beam L is passed through the converging lens 677 so that the cylindrical small portion 621 to be machined is irradiated with the laser beam by the reflecting mirror 678. As a result, the preventive-maintenance/repair operation of the lower portion of the intermediate body of the shroud to be machined is performed. Since the portion which must be machined is irradiated with the laser beam, stress removal to convert residual tensile stress into compressive stress can be performed. Moreover, modification of the stress in the surface layer adjacent to the welding line can be performed. In addition, modification of the surface of the sensitized metallographic structure and welding repair can be performed.

As described above, the in-head light-transmission member 658 of the laser emitting head 626 is, by the joining member 720, secured to the second frame 662 which constitutes the gimbal mechanism of the laser-emitting-head body 632. Therefore, also the in-head light-transmission member 658 is moved around the horizontal axis and the vertical axis. Since the second frame 662 and the extending cylindrical 712 are connected to each other by the joining bracket 714, the laser-beam receiving portion of the laser emitting head 626 is not deviated. The in-head light-transmission member 658 comprises a light-transmission pipe having an upper portion to which a prism (not shown) is joined and a lower portion to which an optical member, such as seal glass, is joined to transmit the laser beam L in the air of the same. Further, reference numeral 721 represents a position adjustment mechanism for the in-head light-transmission member 658.

At this time, displacement with respect to the horizontal axis and the vertical axis of the gimbal mechanism of the second frame 662 of the laser emitting head 626 is absorbed by the rotational (turning) and slide operations of the upper rotation joint 701, the slide joint 702, the lower horizontal-rotation joint 710 and the lower vertical-rotation joint 713. Therefore, the optical axis of the laser beam L is not deviated.

The laser beam L passed through the in-head light-transmission member 658 is converged by the converging lens 677 so that the portion to be machined is irradiated with the laser beam L by the reflecting mirror 678. If the distance from the reflecting mirror 678 to the portion which must be machined (the position to be irradiated with the laser beam) is changed, the change of the distance from the converging lens 677 to the reflecting mirror 678 by the lens-movement adjustment unit 674 enables the focal point of the laser beam L to be aligned to the portion to be machined. Thus, the deviation of the laser emitting head 626 occurring when the installing operation has been performed can be adjusted as described above. As a result, an energy density of the laser beam L with which the machining operation can be performed can effectively be obtained.

Thus, the laser beam L emitted from the laser oscillator 635 is introduced into the position adjacent to the upper lattice plate 613 by the laser-beam transmission means 625 which is the light transmission means. Then, the introduced laser beam L is introduced into the main-body case 630 of the preventive-maintenance/repair apparatus 620.

The laser beam L introduced into the main-body case 630 of the main-body locating unit 629 is introduced into the elevating light-transmission pipe 650 from the stationary light-transmission pipe 645. Then, the laser beam L is passed from the stationary light-transmission pipe 645 though the first cranking scan mechanism 695 so as to be introduced into the extending light-transmission pipe 699. The stationary light-transmission pipe 645, the elevating light-transmission pipe 650, the first cranking scan mechanism 695, the extending light-transmission pipe 699, the second cranking scan mechanism 706 and the extending cylindrical 712 constitute the laser-guide joining/scanning means 627. The laser-guide joining/scanning means 627 serves as the laser-beam transmission means for introducing the laser beam L introduced into the position adjacent to the upper lattice plate 613 of the reactor pressure vessel 610 to the laser emitting head 626.

An operation method using the preventive-maintenance/repair apparatus for an incore structure according to the embodiment of the present invention will now be described.

In a state in which the laser emitting head 626 is accommodated in the main-body case 630, the preventive-maintenance/repair apparatus 620 for the incore structure is suspended so as to be moved downward by using a crane (not shown) provided for the ceiling or a lift unit (not shown) provided for a fuel exchanging machine. Thus, the main-body locating unit 629 of the preventive-maintenance/repair apparatus 620 is passed through the lattice of the upper lattice plate 613 so as to be disposed on the control rod guide pipes 616. At this time, the inside portion of the reactor pressure vessel 610 is covered with water. The main-body locating unit 629 is suspended and moved downwards in a state in which the laser emitting head 626 and the laser-beam transmission means are accommodated in the main-body case 630.

The main-body locating unit 629 of the preventive-maintenance/repair apparatus 620 is disposed on the control rod guide pipes 616. Then, the clamping unit 640 is operated to press the clamp pads 642 to the four portions in the lattice of the upper lattice plate 613. Thus, the main-body locating unit 629 is secured between the upper lattice plate 613 and the core support plate 612. Then, the rotating motor 647 is operated to turn the main-body case 630 of the main-body locating unit 629 around the lengthwise axis so that a direction in which the laser emitting head 626 is projected is determined.

Then, the base elevating unit 653 is operated so that the main-body base 651 is moved up and down so that the laser emitting head 626 is moved up and down so that the position which is subjected to the laser machining working is determined. Moreover, the head movement mechanism 631 is operated to project the laser emitting head 626 over the main-body case 630. Thus, the laser emitting head 626 is pressed against the inner wall of the shroud 611 which is the incore structure 615 so as to be secured. The foregoing securing operation is stably performed by the gimbal mechanisms 661 and 662 provided for the laser emitting head 626. In a state in which the laser emitting head 626 is pressed against the inner wall of the shroud 611 and secured to the same, the lower extended portion of the laser emitting head 626 is inserted into the cylindrical small portion 621 between the shroud 611 and the core support plate 612. Specifically, the flat-frame-shape elevation-support frame mechanism 633 of the laser emitting head 626 is slid downward with respect to the laser-emitting-head body 632 by operating the frame elevating unit 665 shown in FIG. 3 so as to be inserted into the cylindrical small portion 621.

Moreover, the laser emitting unit 624 is disposed on the operation floor 623 above the reactor pressure vessel 610. In addition, the lower end of the laser-beam transmission means 625 for transmitting the laser beam L emitted from the laser emitting unit 624 into the reactor pressure vessel 610 in the air is disposed on the upper lattice plate 613. Thus, the preparation for the preventive-maintenance/repair operation is completed.

Then, the laser emitting unit 624 is operated so that the preventive-maintenance/repair operation of the cylindrical small portion 621 of the incore structure 615 is performed in a water environment.

When the laser emitting unit 624 has been operated, the laser beam L is emitted from the laser oscillator 635. The emitted laser beam L is passed through the laser-beam transmission means 625 (the air light-transmission means 625a and the underwater light-transmission means 625b). Then, the laser beam L is introduced into the position adjacent to the upper lattice plate 613 in the reactor pressure vessel 610, and then introduced into the main-body locating unit 629 of the preventive-maintenance/repair apparatus 620.

The laser beam L is introduced through the stationary light-transmission pipe 645 of the main-body case 630 of the main-body locating unit 629 so as to be introduced into the elevating light-transmission pipe 650. Then, the laser beam L is transmitted from the elevating light-transmission pipe 650 to the light-transmission pipe 699 by the first cranking scan mechanism 695 in the air. Then, the laser beam L is passed from the light-transmission pipe 699 through the second cranking scan mechanism 706 so as to be introduced into the extending cylindrical 712 which is the head-upper-portion housing of the laser emitting head 626. That is, the laser beam L introduced into the position adjacent to the upper lattice plate 613 in the nuclear-reactor pressure vessel 610 by the laser-beam transmission means 625 is, by the laser-guide joining/scanning means 627 which is the laser-beam transmission means, transmitted to the laser emitting head 626 in the air. Then, the laser beam is introduced into the in-head light-transmission member 658 of the laser emitting head 626.

The laser beam L introduced into the laser emitting head 626 is, in the air, transmitted through the in-head light-transmission member 658 so as to be converged by the converging lens 677 shown in FIG. 3. Thus, the portion of the cylindrical small portion 621 to be machined is irradiated with the laser beam L by the reflecting mirror 678. As a result, a number of machining operations can be performed.

Figure 8A:
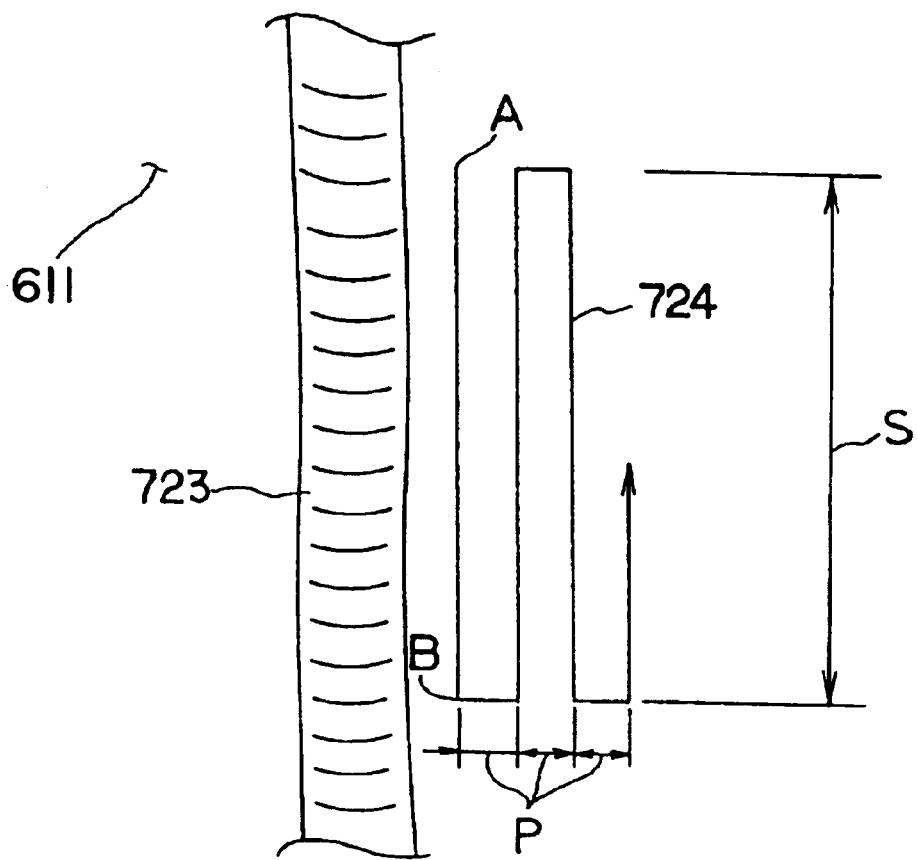
FIG. 8(A) is a diagram showing a locus of a laser beam in a right portion of the vertical welding line of a shroud and FIG. 8(B) is a schematic plan view showing a state of laser beam irradiation in a right portion of the vertical welding line of the shroud.
Figure 8B:
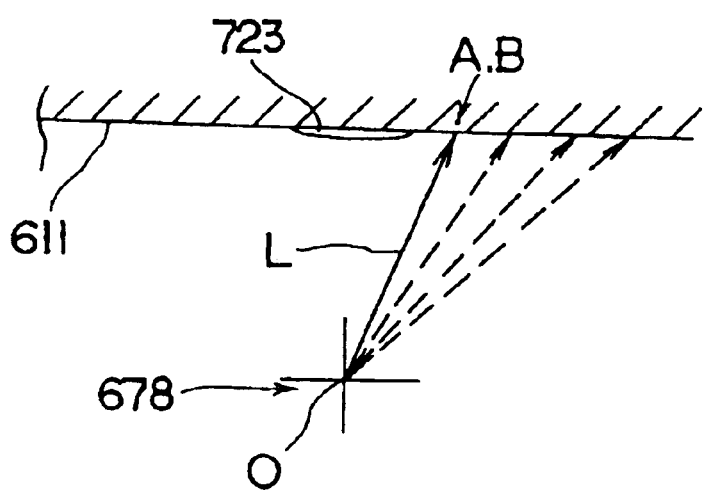

The irradiation of the laser beam L emitted from the laser emitting head 626 is performed in the procedures shown in FIGS. 8(A) and 8(B). The irradiating procedure using the laser beam L emitted from the laser emitting head 626 will now be described.

FIG. 8(A) shows loci of the laser beams L, with which the right-hand portion of a thermally-affected portion is irradiated, realized in an example case of vertical welding lines (vertical welding lines V5) 123 of the shroud 611 at the cylindrical small portion 621 of the incore structure 615.

The laser beam L is applied from reflecting point 0 of the reflecting mirror 678 in the downward diagonal direction as shown in FIG. 4 so as to be applied to laser irradiation point A on the inner wall of the shroud 611. In the realized state of irradiation with the laser beam, the lens-movement adjustment unit 674 is operated to adjust the distance between the converging lens 677 and the reflecting mirror 678. After the adjustment has been completed, in a state in which the relative distance between the converging lens 677 and the reflecting mirror 678 is maintained, the frame elevating unit 65 is operated to move upward (up and down movement) the elevation-support frame mechanism 633. As a result of the downward slide of the elevation-support frame mechanism 633, the laser irradiation point A is shifted to point B. Since the slide of the elevation-support frame mechanism 633 is performed in the axial direction of the in-head light-transmission member 658, the laser beam L is scanned in parallel with the optical axis which reaches the converging lens 677. The length of the optical path from the converging lens 677 to the laser irradiation point through the reflecting mirror 678 is constant during the scanning operation. Therefore, differently from the operation in which the reflecting mirror 678 is rotated around an axis which is perpendicular to the optical axis of the laser beam, the energy density of the laser beam is uniformed. As a result, the quality of machining can be improved.

After a laser-beam scan for one span S has been completed, the oscillation unit 684 is operated so that the movement for one pitch P is performed. Specifically, the reflecting mirror 678 is rotated by the oscillation motor 685 to shift the laser irradiation GA point for one pitch P. Then, the frame elevating unit 665 is operated to slide upward the elevation-support frame mechanism 633 for one span S. Then, the foregoing operation is repeated sequentially. An irradiation locus 724 of the laser beam L is formed into a zigzag shape as shown in FIG. 8(A).

When the reflecting mirror 678 is sequentially rotated by the operation of the oscillation unit 684, the distance from the reflecting point 0 of the reflecting mirror 678 to the laser irradiation point is changed. If the change in the distance causes a laser energy density required to perform the machining operation not to be obtained because the focal point of the laser beam L cannot be aligned at the laser irradiation point, the lens-movement adjustment unit 674 is operated. Thus, the distance from the converging lens 677 to the reflecting mirror 678 is adjusted so that the focal point of the laser beam L can be aligned to the machining point (the laser irradiation point).

In the preventive-maintenance/repair apparatus 620 according to this embodiment, the laser emitting head 626, as shown in FIG. 7, has an optical path formed from the seal glass 717 of the extending cylindrical 712 to the in-head light-transmission member 658, that from the in-head light-transmission member 658 to the converging lens 677 and that from the converging lens 677 to the reflecting mirror 678 are exposed to the environment so that the laser beam L is transmitted underwater. Since the laser beam L is not transmitted through a light transmission pipe for transmitting the laser beam L in the air, the in-head light-transmission member 658, the converging lens 677 and the reflecting mirror 678 can individually be joined to the laser emitting head 626. As a result, freedom in joining can be improved and the optical axis of the laser beam L can easily be adjusted.

The relative distance from the converging lens 677 to the reflecting mirror 678 can easily be adjusted by the lens-movement adjustment unit 674. Moreover, in a state where the relative distance from the converging lens 677 to the reflecting mirror 678 is maintained, up and down movements can be performed by the frame elevating unit 665. The adjustment of the relative distance from the converging lens 677 to the reflecting mirror 678 and the elevation in the state where the relative distance is maintained does not require the foregoing two elements to be connected to each other by a fluid-tight light-transmission pipe. Therefore, the thickness of the light-transmission pipe can be used as a light transmission area for introducing the laser beam, and hence, the reliability in the light transmission to the reflecting mirror 678 can be improved.

The laser beam L is applied from the laser emitting head 626 by pressing against one point and securing the same to the point in the above-mentioned procedure by the laser emitting head 626. Then, the above-mentioned laser-beam applying procedure is performed for the vertical welding line (inner welding line V5) 723 by shifting the laser emitting head 626 vertically and horizontally.

To shift the laser emitting head 626, the extending force of the head movement mechanism 631 shown in FIG. 2 is reduced by operating the air cylinder of the linking operation mechanism 656. Then, the base elevating unit 653 and the turning unit 647 are operated so that the laser emitting head 626 is shifted.

The horizontal welding lines (welding lines on the inside of H6a) in the cylindrical small portion 621 is irradiated with the laser beams by shifting the laser emitting head 626. Thus, a similar machining operation can be performed.

The preventive-maintenance/repair apparatus 620 is able to machine a portion in the cylindrical small portion 621 which is held between the intermediate body of the shroud which is the incore structure 615 and the core support plate 612 and which cannot easily be machined. Thus, improvement in the stress in the surface layer adjacent to the welding line by using laser beams, modification of the surface of the sensitized metallo-graphic structure and a repair operation using welding can automatically be performed by using the laser beams.

As shown in FIG. 3, the visual monitoring camera 690 joined to the laser emitting head 626 enables the machining position and a state of machining to be monitored and recorded. Therefore, the quality of machining can be improved. The supersonic microphone 691 joined to the inside portion of the laser emitting head 626 detects the supersonic wave generated and transmitted at the laser irradiation point B to detect the relative position of the laser irradiation point B with respect to the laser emitting head 626. Thus, the reliability of the machining position can be improved.

A modification of the preventive-maintenance/repair apparatus for an incore structure according to the present invention will now be described.

In the embodiment of the preventive-maintenance/repair apparatus 620, the structure incorporates the in-head light-transmission member 658 for air transmission as shown in FIG. 2. The in-head light-transmission member 658 may comprises a rod-shape glass having excellent transparency. When the head-inside light-transmission member 658 is made of glass, the laser beam L received in the upper portion of the laser emitting head 626 can be reflected by the side surface of the glass member to transmit the laser beam even if the position of the camera is shifted. Therefore, the laser beam can be introduced into the converging lens 767 without exception. As a result, the reliability of the preventive-maintenance/repair apparatus 620 can be improved and, thus, the quality of machining can be improved.

The elevation-support frame mechanism 633 formed into a flat frame structure is provided for the laser-emitting-head body 632 of the laser emitting head 626 such that the upward/downward movement is permitted. Moreover, the lens-movement adjustment unit 674 is provided for the elevation-support frame mechanism 633 as shown in FIG. 3 to enable the movement of the converging lens 677 to be adjusted. As an alternative to the lens-movement adjustment unit 674, another distance adjustment unit may be employed if the unit is able to adjust the relative distance between the converging lens 677 and the reflecting mirror (the emitting mirror) 678. The distance adjustment unit may be a unit which is capable of adjusting the movement of the reflecting mirror 678.

The preventive-maintenance/repair apparatus for an incore structure in a nuclear reactor incorporates the laser emitting head which is composed of the emitting head body and the elevation support frame mechanism which is capable of sliding on the emitting head body. Moreover, the elevation support frame mechanism is formed into the elongated frame structure to be inserted/discharged to and from the cylindrical small portion in the incore structure. The elevation support frame mechanism is not limited to the flat frame structure if the mechanism can be inserted into and discharged from the small portion of the incore structure. An elongated box-like shape, an elongated cylindrical shape or another shape may be employed.

Moreover, the preventive-maintenance/repair apparatus for the structure in the nuclear reactor is able to perform a preventive-maintenance/repair operation of an incore structure of a pressurized water reactor as well as the incore structure of the boiling water reactor.

Moreover, according to the present invention, there are provided a light transmission apparatus and a method of adjusting the same. Their embodiments will now be described with reference to the drawings.

Figure 9:
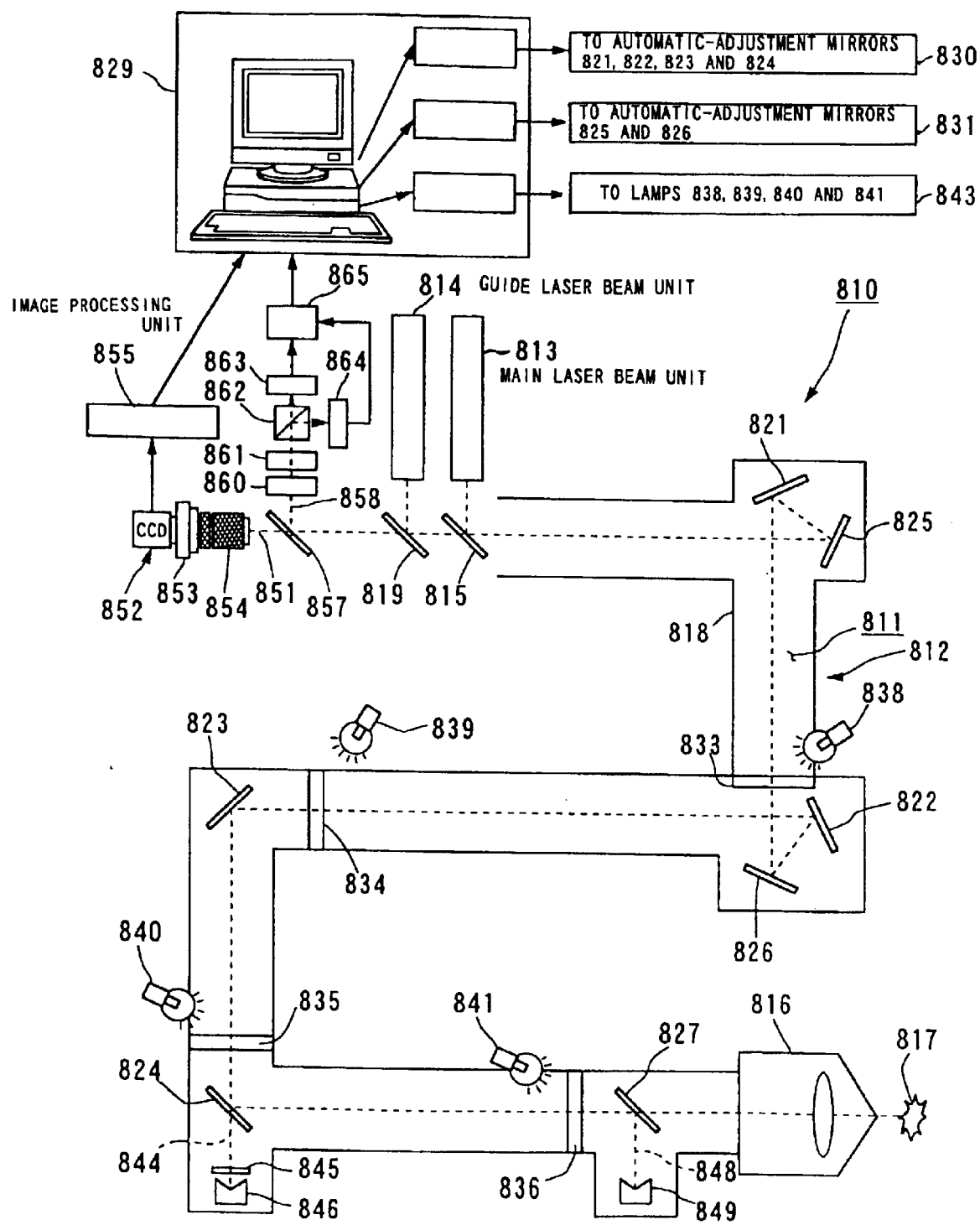
FIG. 9 is a basic structural view showing a first embodiment of a light transmission apparatus according to the present invention.

FIG. 9 is a basic structural view showing a first embodiment of the light transmission apparatus according to the present invention.

Referring to FIG. 9, reference numeral 810 represents a light transmission apparatus for transmitting laser beams in the air. The light transmission apparatus 810 comprises a light transmission means 812 serving as a laser beam transmission means formed by combining mirrors to constitute a light transmission passage 811; a main laser emitting unit 813 serving as a light source for emitting laser beams for machining, inspection or preventive-maintenance/repair to the light transmission passage 811; and a guide laser emitting unit 814 for emitting guide laser beams which are guide laser beams for adjusting the optical axis of the light transmission passage 811.

The laser beam emitted from the main laser emitting unit 813 passes through a dichroic mirror 815 which is a light synthesizing means so as to be introduced into the light transmission passage 811. The laser beam is transmitted through the light transmission passage 811 in the air so as to be introduced into the laser-beam emitting head 816. Then, a subject 817 is irradiated with the laser beam emitted from the laser beam emitting head 816 so that machining, inspection or preventive-maintenance/repair operation of the subject 817 is performed.

FIG. 9 shows the main laser emitting unit 813 including a YAG laser unit. In this example, the laser beam emitted from the YAG laser unit is transmitted through the light transmission passage 811 by the light transmission apparatus 810. Thus, the main laser emitting unit 813, which is, for example, an incore structure in an radioactive environment is irradiated with the laser beam. The main laser emitting unit 813 may be any one of a variety of laser units including a carbon-dioxide laser and a pulse laser except for the YAG laser unit.

The light transmission passage 811 constituting the light transmission means 812 is covered with a shielded tube 818, such as a laser transmission pipe or a light transmission pipe. Thus, the laser beam is transmitted through the shielded tube 818 in the air. In the light transmission passage 811, the guide laser beam emitted from the guide laser emitting unit 814 is introduced into the light transmission passage 811 upstream of the dichroic mirror 815 through the half-mirror guide means 819. The guide laser emitting unit 814 comprises a He—Ne laser unit for emitting a circularly polarized laser beam. As an alternative to the He—Ne laser unit, any laser beam unit may be employed if it is able to emit a laser beam having a wavelength different from that of the main laser beam. The guide laser beam may be a non-polarized laser beam.

The dichroic mirror 815 constitutes a light synthesizing mirror means. Thus, the dichroic mirror 815 has a high reflectance with respect to laser beams in the vicinity of the wavelength of the main laser beam and arranged to be transmitted by a major portion of laser beams having other wavelengths. The half mirror of the half-mirror guide means 819 has a reflectance of about 50% with respect to the guide laser beam and a high transmission characteristic with respect to laser beams having other wavelengths.

The light transmission passage 811 includes, for example, six automatic mirrors and one fixed mirror. FIG. 9 shows an example in which four (first to fourth) automatic-adjustment mirrors 821, 822, 823 and 824, two automatic angle-adjustment mirrors (automatic adjustment mirrors) 825 and 826 serving as angle precise-adjustment mirrors and one fixed mirror 827 are provided for the light transmission passage 811. The angles of inclination of the automatic-adjustment mirrors 821, 822, 823 and 824 are adjusted by a mirror adjustment unit 830 which is operated by a control unit 829. Further, the angles of inclination of the automatic angle-adjustment mirrors 825 and 826 are adjusted by a mirror-angle adjustment unit (a mirror adjustment unit) 831 which is operated by the control unit 829.

Each of the automatic angle-adjustment mirrors 825 and 826 which constitute the light transmission passage 811 are disposed opposite to each other at positions upstream of the first and second automatic adjustment mirrors 821 and 822. Moreover, first to fourth targets 833, 834, 835 and 836 for processing images are disposed on the light transmission passage 811 adjacent to the automatic adjustment mirror 826, the third and fourth automatic adjustment mirrors 823 and 824 and the fixed mirror 827.

Each of the first to fourth targets 833, 834, 835 and 836 disposed to traverse the light transmission passage 811 is made of an aluminum plate member having a surface which has been blast-machined. Each of the first to fourth targets 833, 834, 835 and 836 for processing images has, in, for example, the central portion thereof, a light penetration opening, formed into a variety of shapes including a truss shape, a washer shape, a ring shape and a square shape and permitting light penetration.

Moreover, the light transmission passage 811 is provided with lamps 838, 839, 840 and 841 serving as illuminating units capable of illuminating the portions adjacent to the first to fourth targets 833, 834, 835 and 836 for processing images. Each of the lamps 838, 839, 840 and 841 is individually turned on or off by a lamp-flashing control means 843 in accordance with a control command issued from the light transmission passage 811.

The third automatic adjustment mirror 824 disposed at an intermediate position of the light transmission passage 811 constitutes a sampling separation mirror means 824. The separation mirror means 824 comprises a half mirror or a wavelength separation mirror for separating the guide laser beam from the light transmission passage 811. The separation mirror means 824 is a mirror having a transmissivity of about 50% in the vicinity of the wavelength of the guide laser beam and a relatively high reflectance with respect to the main laser beam except for the guide laser beam.

On the optical path 844 separated by the separation mirror means 824, a ¼-wavelength plate 845 serving as a polarizing optical means and a retro-reflector 846 serving as a parallel reflecting optical means are disposed. The ¼-wavelength plate 845 polarizes the laser beam introduced into the optical path 844. When the laser beam passes through the ¼-wavelength plate 845, for example, a circularly polarized laser beam is converted into a linearly polarized laser beam and a straight-polarized laser beam is converted into a circularly polarized laser beam.

The retro-reflector 846 comprises a parallel reflecting optical device, such as a corner cube prism or a hollow corner cube formed by combining three mirrors. A parallel reflecting optical device represented by a cat's eye optical system may be employed.

The retro-reflector 846 reflects a laser beam made incident on the central portion thereof such that the incident laser beam is reflected to pass through the same passage as that for the incident laser beam. When a laser beam is made incident on a position deviated from the central portion of the retro-reflector 846, the laser beam is reflected from a position symmetric to the central portion in parallel to the incident laser beam.

Further, the fixed mirror 827 disposed on the light transmission passage 811 at a position adjacent to the laser-beam emitting head 816 constitutes the separation mirror means. The fixed mirror 827 is a mirror having a high transmissivity with respect to the main laser beam and a high reflectance with respect to the guide laser beam. A retro-reflector 849 serving as a parallel reflecting optical means is disposed on the optical path 848 separated by the fixed mirror 827. The retro-reflector 849 reflects an incident circularly-polarized laser beam such that the polarization rotation direction is inverted. The retro-reflector 849 constitutes a laser-beam position detection means.

A detecting guide optical path 851, to which the guide laser beams reflected by the retro-reflectors 846 and 849 are introduced, is formed adjacent to the half-mirror guide means 819 for introducing the guide laser beam which is the laser beam from the guide laser emitting unit 814. The detecting guide optical path 851 is formed as an extension from the optical axis of the light transmission passage 811 adjacent to the light source. A CCD camera 852 serving as an electronic optical intermediate body pickup means for constituting a camera system is disposed on the detecting guide optical path 851. The CCD camera 852 incorporates a notch filter 853 for permitting transmission of laser beams having wavelengths except for the wavelengths of the main laser beam and the guide laser beam and also incorporates a lens 854 having a focal distance and a focal point which can be electrically adjusted. The optical axis of the CCD camera 852 is adjusted such that the direction of the optical axis in which the photographing operation is permitted is the same axis as that of the main laser beam. Image information detected by the CCD camera 852 is supplied to an image processing unit 855 so as to be processed.

The image processing unit 855 has images previously registered to serve as references. The registered images and camera images observed by the CCD camera 852 are compared with each other in a pattern matching process. Thus, information about the position deviation of the target observed in the image is output to the control unit 829. The image processing unit 855 is provided with a pattern matching unit. The control unit 829 receives position deviation information to operate the mirror adjustment unit 830 in a direction in which the position deviation is canceled or minimized.

A dichroic sampling mirror 857 is disposed at an intermediate position of the detecting guide optical path 851. The dichroic sampling mirror 857 branches the sampling optical path 858. The sampling optical path 858 is formed as an extension of the optical axis of the light transmission passage 811 adjacent to the light source. The guide laser beam reflected by the parallel reflecting optical means, such as the parallel reflection optical means 846 and 849 provided for the light transmission apparatus is introduced into the sampling optical path 858.

The sampling optical path 858, into which the reflected guide laser beam is introduced, is provided with a ¼-wavelength 860 serving as a polarizing optical means; an interference filter 861 for permitting transmission of only the reflected guide laser beam; and a polarizing beam splitter 862 serving as a light separation means for splitting the reflected guide laser beam passed through the interference filter 861. Each of the reflected guide laser beams split by the polarizing beam splitter 862 is supplied to each of the light-position detecting units 863 and 864. The light-position detecting units 863 and 864 detect the incident positions of the guide laser beams to calculate an amount of deviation of the optical axis.

The light-position detecting units 863 and 864 comprise four-quadrant detectors, pointing detectors or CCD devices. The four-quadrant detector converts an equilibrium state of incident power of the reflected guide laser beam on a photoelectric surface divided into four quadrant as the position of incidence of the laser beam to detect an amount of the position deviation of the light transmission passage 811. The amount of position deviation of the guide laser beam detected by the light-position detecting units 863 and 864 is converted into an electric signal by a signal processing unit 865 so as to be supplied to the control unit 829. The control unit 829 controls the operation of the mirror adjustment unit 830 or the mirror-angle adjustment unit 831.

The automatic-adjustment mirrors 821 to 824, the operations of which are controlled by the mirror adjustment unit 830, are automatic mirrors each having a structure that a mirror is provided for a biaxial-inclination stage which is moved by a stepping motor. The angles of the automatic-adjustment mirrors 821 to 824 can be controlled when the mirror adjustment unit 830 operates a driver (not shown) for each of the stepping motors in accordance with a control command issued from the control unit 829. The automatic-adjustment mirrors 821 to 824 arranged to be moved by the stepping motors have a characteristic that the operation speed is low and a wide operation range is permitted. As an alternative to the stepping motors, drive mechanisms, such as servo motors may be employed.

The automatic angle-adjustment mirrors (the automatic adjustment motor) 825 and 826, the movements of which are controlled by the mirror-angle adjustment unit 831 are automatic and precise adjustment mirrors. The automatic angle-adjustment mirrors 825 and 826 are PZT automatic mirrors each having a structure in which a mirror is provided for a biaxial-inclination stage which is moved by an electrostriction (electrostrictive) device (PZT). In accordance with a control command issued from the control unit 829, adjustment of mirror angles can precisely be controlled by the mirror-angle adjustment unit 831.

When the mirrors which are moved by the electrostriction devices are employed as the automatic angle-adjustment mirrors 825 and 826, the mirror angles can be quickly and precisely adjusted in spite of unsatisfactory small operation ranges for the mirrors. As an alternative to the mirrors which are moved by the electrostriction devices, mirrors which are moved by galvanometers may be employed as the automatic angle adjustment mirrors to realize a similar function.

The automatic angle-adjustment mirrors 825 and 826 are mirrors having high reflectance with respect to the main laser beam (for example, YAG laser beam), the guide laser beam (for example, He—Ne laser beam) and light having a wavelength region which is observed by the CCD camera 852. The distance between the automatic angle-adjustment mirror 825 and the first automatic adjustment mirror 821 and that between the automatic angle-adjustment mirror 826 and the second automatic adjustment mirror 822 are maintained to be sufficiently short distance with respect to the distance of transmission of the light transmission passage 811.

E The operation of the first embodiment of the light transmission apparatus according to the present invention will now be described.

Prior to perform laser machining, inspection or preventive-maintenance/repair of a subject by using the light transmission apparatus 810, alignment of the light transmission passage 811 of the light transmission apparatus 810 is adjusted. The alignment adjustment includes a coarse adjustment operation for roughly maintaining the light transmission passage 811, a precise adjustment operation which is performed after the coarse adjustment operation has been performed and which uses the retro-reflectors 846 and 849 and a vibration correction operation for compensating position deviation caused from vibrations or the like of the light transmission passage 811. In order to perform the operations, the light transmission apparatus 810 is provided with a means for coarsely adjusting the optical path for coarsely adjusting the light transmission passage 811 and an optical-path precise adjustment means for precisely adjusting the light transmission passage 811. Each of the adjustment means can be operated automatically by remote control. The optical-path precise adjustment means is a control means for quickly feedback-control the automatic angle-adjustment mirrors 825 and 826. Further, an operation for correcting vibrations caused from external vibrations can be performed.

Operation for Coarsely Adjusting Light Transmission Passage

The CCD camera 852 coincides with the optical axis of the laser beam which is transmitted through the light transmission passage 811. Therefore, the optical axis of the laser beam exists in the central portion of an image photographed by the CCD camera 852. Therefore, when the position of the focal point and the focal distance of the CCD camera 852 are varied in the photographing operations, a position of transmission of the laser beam can be confirmed at an arbitrary position on the light transmission passage 811. The coarse adjustment of the light transmission passage 811 can be performed by sequentially adjusting the automatic-adjustment mirrors 821 to 824.

Operation for Adjusting Automatic Adjustment Mirrors

Initially, a procedure for adjusting the first automatic adjustment mirror 821 will now be described.

The light transmission passage 811 is covered with the shielded tube 818 to prevent outward leakage of light. Therefore, the target 833 for the image process cannot be observed in a case of no illumination. Therefore, the control unit 829 is caused to operate the lamp-flashing control means 843 to turn on the lamp 838 disposed downstream of the first automatic adjustment mirror 821 so that only the target for the image process is illuminated. Since the target 833 is illuminated, the CCD camera 852 is able to selectively observe the target 833. Thus, a mirror image of the first automatic adjustment mirror 821 can be observed.

Simultaneously with the illumination effected by the lamp 838, the zooming position and the position of the focal point of the CCD camera 852 are adjusted to predetermined positions in accordance with a command issued from the signal processing unit so as to sufficiently recognize the shape of the target 833 for the image process, that is, the mirror image of the first automatic adjustment mirror 821.

When the zooming position and the position of the focal point of the CCD camera 852 are adjusted, the target 833 can be observed through the CCD camera 852 through the automatic angle-adjustment mirrors 825 and 821. If the angle of the positioned first automatic adjustment mirror 821 is deviated, the position of the target 833 on the photographed image is deviated from the central portion of the photographed image.

The image processing unit 855 has a reference image corresponding to a case in which the target 833 is observed in the central portion and previously registered therein. The registered image and the observed camera image are compared with each other by performing a pattern matching process. The amount of deviation of the position of the target from the central portion on the image is calculated owning to the pattern matching process. A result of the calculation (an amount of the image deviation) is outputted from the image processing unit 855 to the control unit 829. In accordance with information about the image deviation, the control unit 829 operates the mirror adjustment unit 830 to adjust the mirror angle such that the amount of the image deviation is canceled or minimized. As a result of the adjustment of the mirror angle, the target 833 is adjusted to be moved to the central position on the image which is being photographed by the CCD camera 852.

Since the mirror angle of the first automatic adjustment mirror 821 has been adjusted, the target 833 can be observed in the central portion of the image photographed by the CCD camera 852. This fact indicates that the laser beam is being passed through the central position of the target 833. When the target 833 is positioned in the central portion of the image which is being photographed by the CCD camera 852, the coarse adjustment of the first automatic adjustment mirror 821 is completed.

After the coarse adjustment of the first automatic adjustment mirror 821 has been completed, the coarse adjustment of the next automatic adjustment mirror 822 is performed. Such coarse adjustment is performed basically similar to the operation for adjusting the first automatic adjustment mirror 821.

That is, after the coarse adjustment of the first automatic adjustment mirror 821 has been completed, the lamp-flashing control means 843 is operated in accordance with a command issued from the control unit 829 to turn the lamp 838 off. Then, only the next lamp 839 is turned on.

Simultaneously with the operation for turning the lamp 839 on, the zooming position and the position of the focal point of the CCD camera 852 are adjusted to predetermined positions so as to sufficiently recognize the shape of the target 834.

After the zooming position and the position of the focal point of the CCD camera 852 have been adjusted, the target 834 for the image process can be observed through the automatic-adjustment mirrors 825, 821, 826 and 822. Thus, the mirror image of the automatic adjustment mirror 822 can be observed. If the angle of the automatic adjustment mirror 822 is deviated, the position of the target 834 on the image photographed by the CCD camera 852 is deviated from the center of the photographed image.

The image processing unit 855 has a reference image which is realized when the target 834 is observed in the central portion and which is previously registered. The registered image is compared with the observed camera image (the mirror image) by performing a pattern matching process. A result (an amount of deviation of the image and a degree of deviation of the angle) of a calculation of an amount of deviation of the position of the target 834 from the central portion on the image is output from the image processing unit 855 to the control unit 829.

In accordance with information about the deviation of the image, the control unit 829 operates the mirror adjustment unit 830 to adjust the angle of the second automatic adjustment mirror 822 such that the target 834 is positioned in the central portion of the image which is being photographed by the CCD camera 852.

Since the mirror angle of the second automatic adjustment mirror 822 is adjusted, the target 834 can be observed in the central portion of the image which is photographed by the CCD camera 852. This fact indicates that the laser beam is being passed through the central position of the target 834. When the target 834 is positioned in the central portion of the image photographed by the CCD camera 852, the coarse adjustment of the second automatic adjustment mirror 822 is completed.

After the coarse adjustment of the automatic adjustment mirror 822 has been completed, a combination of the lamp 840, the target 835 and the automatic-adjustment mirror 823 is subjected to a similar coarse adjustment process. Thus, the coarse adjustment of the automatic adjustment mirror 823 is performed. After the coarse adjustment of the automatic-adjustment mirror 823 has been completed, a combination of the lamp 841, the target 836 and the automatic-adjustment mirror 824 is subjected to a similar process. Thus, the adjustment of the automatic adjustment mirror 824 is performed.

Since the automatic-adjustment mirrors 821, 822, 823 and 824 are sequentially adjusted, a necessity for an operator to approach each point (each bending point) of the light transmission passage 811 can be eliminated. Thus, the coarse adjustment of the light transmission passage 811 can automatically be performed. Thus, the coarse adjustment of the light transmission passage 811 enables the main laser beam to be transmitted to a required point through the light transmission passage 811.

Operation for Precisely Adjusting Light Transmission Passage

An operation for precisely adjusting the light transmission passage 811 and a function of correcting vibrations of the light transmission passage will be described hereunder.

After the coarse adjustment of the light transmission passage 811 has been completed, the operations for precisely adjusting the light transmission passage 811 and correction of the vibrations are performed.

Initially, for example, a He—Ne laser is employed as the guide laser emitting unit 814 shown in FIG. 9. A previous adjustment is performed such that the guide laser beam which is emitted is a clockwise circularly-polarized beam.

The circularly-polarized guide laser beam is branched into two laser beams consisting of a reflected beam and a transmitted beam at the position of the automatic adjustment mirror 824 which serves as the sampling separation mirror means. The direction of polarization of the guide laser beam passed through the automatic adjustment mirror 824 is converted after the guide laser beam has passed through the ¼-wavelength plate 845, the direction of polarization being defined by the polarizing characteristic axis of the ¼-wavelength plate 845. Thus, the guide laser beam is converted into a linearly-polarized laser beam. Then, the linearly-polarized laser beam is reflected by the retro-reflector 846 so as to be returned to the ¼-wavelength plate 845. The retro-reflector 846 has an optical characteristic with which an incident laser beam is reflected in parallel with the incident beam regardless of the incident angle.

That is, a laser beam made incident on the central portion of the retro-reflector 846 is reflected to pass through the same passage as that for the incident laser beam. A laser beam made incident on a position deviated from the central portion is reflected in parallel with the incident laser beam from a position deviated symmetrically from the central portion.

In this embodiment, the retro-reflector 846 is constituted by a parallel reflecting optical means in the form of a hollow corner cap obtained by combining three mirrors. The polarization of the laser beam reflected by the retro-reflector 846 is linear polarization in the same polarization direction as that of the incident laser beam.

The linearly-polarized laser beam reflected by the retro-reflector 846 is again made incident on the ¼-wavelength plate 845 from an opposite direction. Therefore, this laser beam is formed into a circularly-polarized reflected laser beam having the same angle of rotation as the direction of rotation realized at the time of the incidence. The returned laser beam passes in the opposite direction through the light transmission passage 811 so as to be returned to the guide laser emitting unit 814 adjacent to the light source.

In the portion of the guide laser emitting unit 814 adjacent to the light source, only the reflected guide beam is reflected by the dichroic sampling mirror 857 to the sampling optical path 858 so as to be sampled. The reflected guide laser beam introduced into the sampling optical path 858 is converted into a linearly-polarized laser beam by the ¼-wavelength 860. The positional relationship between the ¼-wavelength 860 and the polarizing beam splitter 862 is adjusted such that when the incident laser beam is circularly-polarized, the direction of rotation of the circular polarization is made, that is, the laser beam is distributed to the position detection unit 863 or 864 depending on a fact whether the polarization is clockwise circular polarization or counterclockwise circular polarization.

Since the interference filter 861 is disposed at an intermediate position of the sampling optical path 858, laser beams having wavelengths except for that of the guide laser beam cannot reach the light-position detecting units 863 and 864.

The laser beam reflected from the retro-reflector 846 is formed into a clockwise circularly-polarized laser beam with respect to the direction of transmission when the laser beam has been reflected by the dichroic sampling mirror 857.

As a result, only the reflected beam of the guide laser beams reflected by the retro-reflector 846 is made incident on only the light-position detecting unit 863.

The position of incidence of the laser beam made incident on the light-position detecting unit 863 is converted into an electric signal by the signal processing unit 865 so that control information is received by the control unit 829.

The guide laser beam reflected by the automatic adjustment mirror 824 propagates toward the fixed mirror 827.

Only the He—Ne laser beam of the guide laser beam is reflected by the fixed mirror 827 toward the retro-reflector 849. Residual laser beams penetrate the fixed mirror 827 so as to be introduced into the laser-beam emitting head 816.

Similarly to the retro-reflector 846, the retro-reflector 849 is constituted by three flat mirrors. Therefore, the circularly-polarized incident laser beam is reflected such that the direction of rotation of the polarization is inverted. The guide laser beam reflected by the retro-reflector 849 is returned in a direction opposite to the direction of the incident. Thus, the laser beam passes through the light transmission passage 811 to reach the dichroic sampling mirror 857.

At this time, the direction of the circular polarization of the reflected guide laser beam returned from the retro-reflector 849 is opposite to the direction of the circular polarization of the reflected guide laser beam returned from the other retro-reflector 846.

Therefore, the guide laser beam reflected by the retro-reflector 849 is made incident on the light position detecting unit 864. Thus, information about the position deviation of the guide laser beam at the position of the retro-reflector 849 is supplied to the control unit 829 through the signal processing unit 865.

In the operation for precisely adjusting the light transmission passage 811, information of position deviation of each of the retro-reflector 846 and the retro-reflector 849 can be separated from each other by detecting the reflected guide laser beam. Thus, the control unit 829 is able to recognize information of the position deviation.

In accordance with information about the position deviation of the two positions, the control unit 829 operates the mirror-angle adjustment unit 831 such that the position deviation of the reflected laser beam is canceled or minimized. Thus, feedback control is performed such that the angles of the automatic angle-adjustment mirrors 825 and 826 are adjusted.

The light-position detecting units 863 and 864, the signal processing unit 865, the control unit 829 and the automatic angle-adjustment mirrors 825 and 826 to be used for the precise adjustment of the light transmission passage 811 are units exhibiting quick response. In accordance with the response of the feedback loop, the position deviation of the beam caused from vibrations of the automatic angle-adjustment mirrors 825 and 826 can be corrected. In accordance with the accuracy of each of the retro-reflectors 846 and 849 and the light-position detecting units 863 and 864 and control accuracy of each of the automatic angle-adjustment mirrors 825 and 826, the position to which the laser beam is transmitted can be controlled. The light transmission apparatus 810 according to this embodiment is able to correct fluctuations of the laser beam caused from air and mechanical vibrations occurring when the long-distance transmission using the automatic adjustment mirror. Therefore, the laser beam can stably be transmitted for a long time to the position of the subject 817 which must be irradiated with the laser beam.

In the light transmission apparatus 810 according to this embodiment, the optical axis of the light transmission passage 811 for the laser beam and the axis of measurement of the CCD camera 852 are made to be the same, that is, a common axis. Therefore, the light transmission passage 811 for the laser beam can linearly be observed from the inlet portion to the outlet portion of the light transmission passage 811. The deviation in the angle of the optical axis can be calculated from the position deviation at the outlet portion to coarsely adjust the optical axis by an amount of the deviation by using the automatic-adjustment mirrors 821 to 824. Therefore, a necessity of disposing an electronic image pickup unit, such as the CCD camera 852, in the light transmission passage 811 can be eliminated. Therefore, the adjustment of the optical axis of the light transmission passage 811 can automatically and stably be performed from a remote position even in an environment in which intense radioactive rays exist.

Moreover, the CCD camera is not required to be disposed at each of the positions in the light transmission passage 811 at which the automatic adjustment mirror is disposed. Only one CCD camera 852 is able to adjust the optical axis from a remote position. Image information supplied to the CCD camera 852 is supplied to the image processing unit 855 to obtain information about the position deviation. Therefore, an amount of deviation in the angle of each of the automatic-adjustment mirrors 821 to 824 can automatically be measured in accordance with the image photographed by the CCD camera 852 to automatically adjust the automatic-adjustment mirrors 821 to 824.

In the light transmission apparatus 810, the targets 833 to 836 for image process are disposed adjacent to the mirrors 826, 823, 824 and 827 for use in transmitting the laser beam to calculate deviation in the angle of the optical axis in accordance with deviation in the position of each of the targets 833 to 836. Therefore, the optical axis can be adjusted by using only the mirrors 826, 823, 824 and 827 immediate before the targets 833 to 836 encountered the position deviation. That is, when the automatic-adjustment mirrors 821 to 824 in the light transmission passage 811 are adjusted from a remote position, the positions which must be adjusted and to which the laser beam must be transmitted can be clarified. Moreover, the contents of the image process can be simplified.

In accordance with the shape of each of the targets 833 to 836 for the image process, the positions of the mirrors and the targets on the optical axis of the light transmission passage 811 which must be adjusted can clearly be determined to simplify the determination of the positions which must be adjusted. Moreover, an amount of deviation of each of the automatic-adjustment mirrors 821 to 824 can accurately be measured.

The light transmission apparatus 810 according to this embodiment includes the lamps 838 to 841, as illuminating units, disposed adjacent to the mirrors 826, 823, 824 and 827 for transmitting the laser beams. When each of the targets 833 to 836 which are being observed by the CCD camera 852 is illuminated, the target which is being corrected can be recognized. Therefore, the position deviation can be calculated in accordance with a more clear camera image. That is, the positions of the targets 833 to 836 downstream of the automatic-adjustment mirrors 821 to 824 which are being adjusted can clearly be distinguished from the other mirrors and images of the other targets. Therefore, the positions of the mirrors which must be adjusted can easily be determined. Furthermore, an amount of deviation of the mirror can accurately be measured.

In the light transmission apparatus 810, the mirror adjustment unit 830 which is operated by the control unit 829 is the automatic mirror unit operated by the stepping motor or the servo motor. When the automatic-adjustment mirrors 821 to 824 are moved in accordance with information of the image process, the automatic-adjustment mirrors 821 to 824 can accurately be moved in accordance with the amounts which must be moved. Therefore, a necessity of repeatedly adjusting the same automatic-adjustment mirrors 821 to 824 can be eliminated at a time when the angles of the mirrors are adjusted simultaneously. Therefore, the adjustment of the optical axis can further quickly be performed.

Furthermore, the light transmission apparatus 810 has the structure that the pattern matching function is added to the image processing unit 855 for the CCD camera 852. Therefore, the image of the light transmission passage 811 previously registered and the observed image can be compared with each other. Therefore, even if a point which must be irradiated with the laser beam cannot be observed by the CCD camera 852, the deviation in the angle of the optical axis can be calculated to adjust the optical axis. That is, since the pattern matching unit is provided for the image processing unit 855, the shapes and deviation in the positions of the targets 833 to 836 corresponding to the automatic-adjustment mirrors 821 to 824 which must be adjusted can easily be evaluated in accordance with the registered pattern realized after the adjustment has been completed. Therefore, the speed and accuracy of the adjustment of the optical axis of the light transmission passage 811 can be improved. Moreover, frequency of a malfunction of the light transmission apparatus 810 owning to an incorrect recognition result made by the image processing unit 855 can be reduced.

The light transmission apparatus 810 according to this embodiment includes the light transmission means 812 formed by combining one or more mirrors and constituting the light transmission passage 811. A portion or all of the mirrors which constitute the light transmission passage 811 are provided with the mirror adjustment units 830 and 831 with which the angles of inclinations of the mirrors can be controlled from a remote position. The light transmission apparatus 810 includes a portion of the mirrors which are disposed on the light transmission passage 811 and which are separation mirror means 824 and 827, being semi-transmission mirrors or wavelength separation mirrors. Furthermore, the light-position detecting units 863 and 864 are disposed at the positions to which the reflected guide laser beams separated by each of the separation means 824 are transmitted. The control unit 829 is provided for operating information of the positions outputted from the light-position detecting units 863 and 864 to operate the automatic mirror unit serving as the mirror-angle adjustment unit 831. Therefore, the accuracy can be improved as compared with the method of measuring the position deviation of the mirror by using the CCD camera 852. Moreover, the speed to measure the position can be raised considerably as compared with the method using the CCD camera 852. Therefore, even if the optical axis is moved owing to vibrations of the apparatus, the automatic angle-adjustment mirrors 825 and 826 are moved at high speed in a direction in which deviation of the optical axis can be canceled. Thus, an adverse influence of external vibrations can be eliminated.

The light transmission apparatus 810 incorporates the guide laser emitting unit 814 individually from the main laser emitting unit 813 for outputting the main laser beam. Therefore, even if the main laser beam which must be transmitted is a low repetition pulse laser or the like having a variable factor, the optical path can be adjusted by using, as the reference, the guide laser beam emitted from the individual guide laser emitting unit 814 for adjusting the optical path. Therefore, stable light transmission can be performed.

The light transmission apparatus 810 has a portion of the automatic adjustment mirror 824 and the fixed mirror 827 disposed on the light transmission passage 811 and comprising the separation mirror means, such as the semi-transparent mirrors or the wavelength separation mirrors. Moreover, the light transmission apparatus 810 includes the parallel reflecting optical means 846 and 849 disposed at the positions to which the guide laser beams separated by the separation mirror means 824 and 827 are transmitted and represented by the corner cube prism, the hollow corner cub and the cat's eye optical device. Furthermore, the light transmission apparatus 810 includes the half-mirror guide means 819 disposed adjacent to the guide laser emitting unit 814; the light-position detecting units 863 and 864 disposed next to the half-mirror guide means 819; and the control unit 829 for operating the mirror-angle adjustment unit 831 by calculating information about the positions output from the light-position detecting units 863 and 864. Therefore, the electronic optical elements, such as the light position detecting units 863 and 864, are not required to be disposed in the light transmission passage 811 when an amount of deviation of the position of light must be measured. Therefore, complicated wiring is not required, thus, permitting application to an environment in which intense radioactive rays exist. Moreover, production of noise can be prevented and, therefore, the S/N ratio can be raised.

The light transmission apparatus 810 according to this embodiment includes the guide laser emitting unit 814 provided individually from the main laser emitting unit 813 for emitting laser beams which must be transmitted, the guide laser emitting unit 814 being the unit for emitting non-polarization or circularly-polarized laser beams. A portion of the mirrors disposed in two portions on the light transmission passage 811 are the separation mirror means 824 and 827, such as the semi-transparent mirrors or the wavelength separation mirrors. The polarizing optical device 845 is disposed at a position to which the guide laser beams separated by the separation mirror means 824 are transmitted. Furthermore, the parallel reflecting optical means 846 represented by the corner cube prism, the hollow corner gap and the cat's eye optical device is disposed. There are provided the half mirror means 819 and 857 disposed adjacent to the guide laser emitting unit 814; the polarizing optical device 860 disposed next to the half mirror means 819 and 857; the two light position detecting units 863 and 864; and the control unit 829 which operates information about the positions output from the light position detecting units 863 and 864 to operate the automatic mirror unit 831 serving as the mirror-angle adjustment means. Therefore, the polarizing characteristic of light can be used to provide two portions in which the deviation of the positions of the guide laser beams is measured by one type of the guide laser emitting unit 814.

The automatic mirror unit 831 serving as the mirror-angle adjustment means comprises the automatic mirror unit which is operated by an electrostriction device exhibiting a quick response or the automatic mirror unit which is operated by the galvanometer. The light position detecting units 863 and 864 comprise the light position detecting devices incorporating PSD (Position Sensitive Detectors) devices or the separation-type photodiode devices. Therefore, even if an influence of vibrations having higher frequency components is exerted on the light transmission apparatus 810, the influence of the deviation of the optical axis caused from the vibration can be eliminated. The light transmission apparatus 810 is able to automate the process including the coarse adjustment of the light transmission passage 811, the precise adjustment of the optical path and removal of the influence of vibrations.

If the main laser emitting unit 813 is disposed apart from the portion in which the subject 817 is machined or inspected, a stable laser machining and inspection can be performed. The light transmission apparatus 810 is arranged to machine the subject 817 which is the incore structure. When the subject 817 is repaired, a large output laser beam can stably be transmitted to the light transmission passage 811, thus performing a reliable operation. The same light transmission passage 811 may be used to photograph the position to which the laser beam is transmitted with the CCD camera 852 from a remote position.

Figure 10:
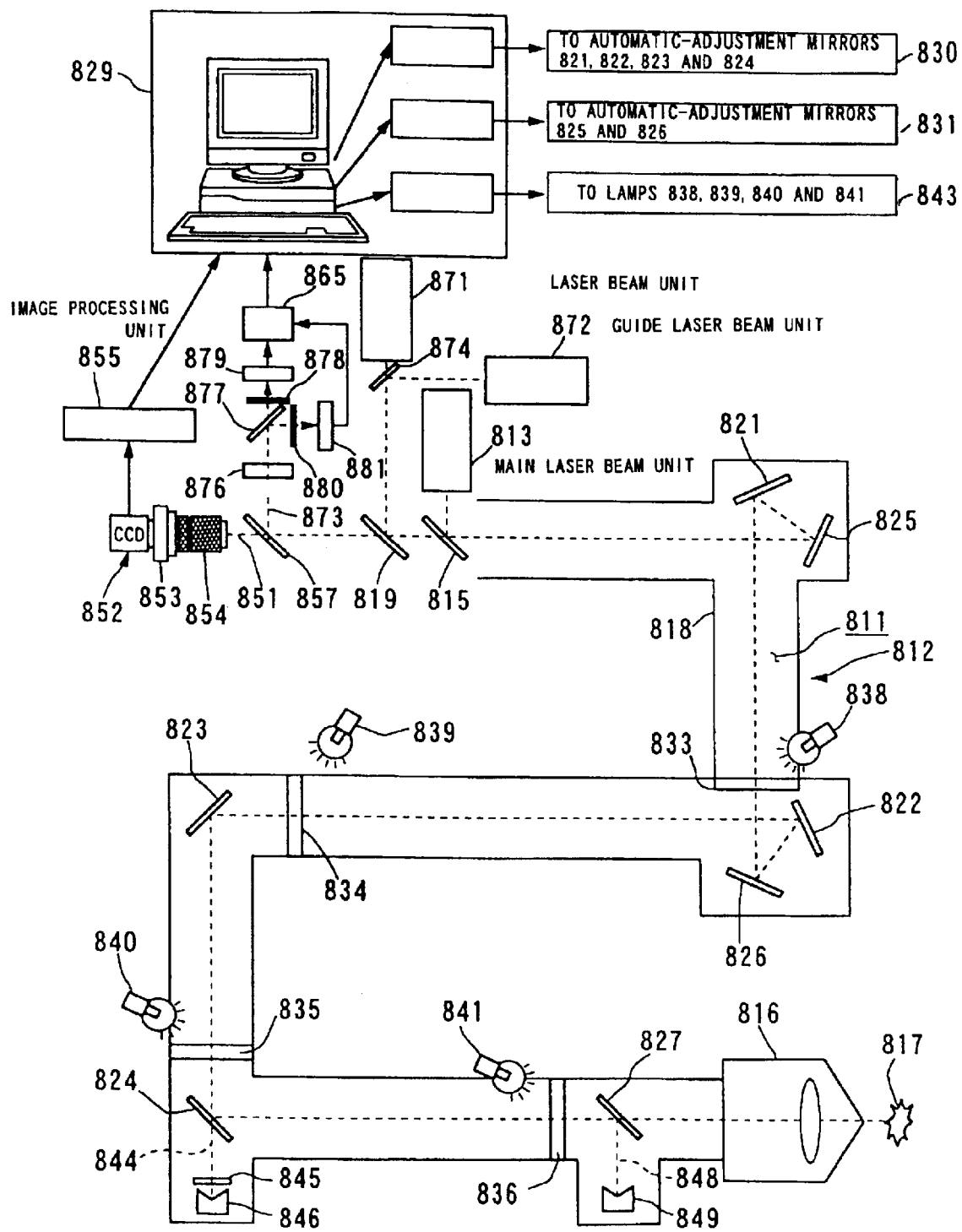
FIG. 10 is a basic structural view showing a second embodiment of the light transmission apparatus according to the present invention.

FIG. 10 is a basic diagram showing a second embodiment of the light transmission apparatus according to the present invention.

The light transmission apparatus 870 according to the second embodiment is basically different from the light transmission apparatus 870 according to the first embodiment in a plurality of guide laser units 871 and 872 for emitting laser beams having different wavelengths. Since the plurality of the guide laser units 871 and 872 are provided, the polarizing optical means is not required. Therefore, a sampling detection passage 873 has a different structure. The other structures are substantially the same as those of the light transmission apparatus 810 according to the first embodiment. Therefore, the same reference numerals are given to simplify description.

FIG. 10 shows an example having two guide laser units 871 and 872. The first guide laser unit 871 is a He—Ne laser unit for emitting He—Ne laser beams, while the second guide laser unit 872 is a He—Cd laser unit for emitting He—Ne laser beam having a different wavelength.

A red guide laser beam (He—Ne laser beam) outputted from the first guide laser unit 871 and a purple guide laser beam (He—Cd laser beam) outputted from the second guide laser unit 872 are synthesized with each other by a dichroic mirror 874 which is a light synthesizing means so as to be transmitted from a half mirror which is the half-mirror guide means 819 to the light transmission passage 811 through the dichroic mirror 815 of the light synthesizing means.

On the other hand, the main laser emitting unit 813 serving as the light source is, for example, a carbon dioxide gas laser unit. The main laser beam (the carbon dioxide gas laser beam) outputted from the main laser emitting unit 813 is passed through the dichroic mirror 815 so as to be introduced into the light transmission passage 811. Then, the main laser beam is transmitted through the light transmission passage 811 in the air so as to be introduced into the laser-beam emitting head (the laser machining head) 816. Thus, the laser beam is applied from the laser-beam emitting head 816 to a portion which must be irradiated with the laser beam, such as the incore structure, which is the subject 817. Thus, machining, inspection or preventive-maintenance/repair of the subject 817 is performed. As an alternative to the carbon dioxide gas laser, the main laser emitting unit 813 may be the YAG laser, the pulse laser or another laser to be adaptable to the purpose, such as machining, inspection or a preventive-maintenance/repair operation.

The dichroic mirror 815 for synthesizing laser beams introduces two guide laser beams such that a common axis is possessed with the main laser beam which is introduced through the light transmission passage 811. The dichroic mirror 815 has a high reflectance with respect to light in the vicinity of the wavelength of the carbon dioxide gas laser beam which is the main laser beam. The dichroic mirror 815 permits transmission of light having the other wavelengths.

The half mirror of the half-mirror guide means 819 for introducing the guide laser beam, which is the guide beam, emitted from the first and second guide laser units 871 and 872 to the light transmission passage 811 has a partial reflection characteristic having a reflectance of about 50% with respect to the wavelength of the He—Cd laser beam and the He—Ne laser beam which is the guide laser beam. The transmission characteristic of the half mirror can be improved with respect to the other wavelengths.

The guide laser beams emitted from the first and second guide laser units 871 and 872 are introduced into the light transmission passage 811 by the dichroic mirrors 873 and 815, which are light synthesizing means, and the half-mirror guide means 819. Thus, the guide laser beam is scanned through the light transmission passage 811. The guide laser beam is scanned through the light transmission passage 811 so that, for example, a first guide laser beam (He—Ne laser beam) is guided into the separation optical path 844 by the automatic adjustment mirror 824 also serving as the separation mirror means. On the other hand, for example, a second guide laser beam (He—Cd laser beam) is guided into the separation optical path 848 by the fixed mirror 827 serving as the separation mirror means.

The automatic adjustment mirror 824 constituting the separation mirror means is a mirror having a transmission and reflection characteristic having a high wavelength transmissivity with respect to, for example, the first guide laser beam (He—Ne laser beam). On the other hand, the fixed mirror 827 which is the other separation mirror means is a mirror having a high wavelength reflectance with respect to the second guide laser beam and a high transmissivity with respect to light having the other wavelength and the main laser beam.

The guide laser beams guided by the separation optical paths 844 and 848 are reflected in parallel by the retro-reflectors 846 and 849 which are the parallel-reflection optical means so as to be returned to the light transmission passage 811. The retro-reflectors 846 and 849 comprise prism-type parallel reflection devices. As an alternative to the retro-reflectors 846 and 849, parallel reflecting optical devices, such as cat's eye optical systems, may be employed.

The guide laser beam returned through the light transmission passage 811 is passed through the dichroic mirror 815 and the half-mirror guide means 819, and then guided into the dichroic sampling mirror 857. The dichroic sampling mirror 857 guides the guide laser beam toward the sampling detection passage 873.

The sampling detection passage 873 is provided with an interference filter 876 for permitting transmission of first and second guide laser beams and cutting the light having the wavelength except for that of the first and second guide laser beams. Moreover, a dichroic mirror 877 serving as a light separation means for bisecting the transmitted guide laser beam is provided. The dichroic mirror 877 separates the wavelength of the transmitted guide laser beam into the first laser beam (He—Ne laser beam) and the second guide laser beam (He—Ge laser beam) and reflects the second guide laser beam.

The wavelength-separated first guide laser beam is passed through the interference filter 878 and then guided into a light position detecting unit 879. The light position detecting unit 879 detects an amount of deviation in the light position of the first guide laser beam and then transmits the detected amount of deviation to the signal processing unit 865. The interference filter 878 permits transmission of light in the vicinity of the wavelength of the first guide laser beam and cuts light having the other wavelengths.

The second guide laser beam, subjected to the wavelength separation by the dichroic mirror 877 of the light separation means is passed through an interference filter 880 which permits only the second guide laser beam and then guided into the light position detecting unit 81. The light position detecting unit 81 detects an amount of the light position of the second guide laser beam and transmits a detection signal to the signal processing unit 865.

The signal processing unit 865 processes the detection signal representing the detected amounts of deviation of the light positions (optical axis) of the two guide laser beams so as to convert the amounts into electric signals to supply the electric signals to the control unit 829. The control unit 829 controls the operations of the mirror adjustment unit 830 and the mirror-angle adjustment (fine adjustment) means 831. Thus, the control unit 829 controls the movements of the automatic-adjustment mirrors 821, 822, 823 and 824 and the automatic angle-adjustment (fine adjustment) mirrors 825 and 826. Thus, adjustment is performed such that the amount of deviation in the optical axis is canceled or minimized.

The reflected guide laser beam which has not been reflected by the dichroic sampling mirror 857 towards the sampling detection passage 873 and which has been passed through the dichroic sampling mirror 857 is guided into the CCD camera 852 which serves as the electronic optical image pickup means. The CCD camera 852 is a camera system incorporating a notch filter 852 permitting light having wavelengths, except for the main laser beam (carbon dioxide gas laser beam) and the guide laser beam, and a lens 853 having a focal point and the position which can electrically be adjusted. The position of the CCD camera 852 is adjusted such that the direction of the optical axis which can be photographed coincides with the optical axis of the main laser beam.

An image outputted from the CCD camera 852 is received by the image processing unit 855 so as to be processed. The image processing unit 855 has a central image of the target registered previously. The registered image and the image observed by the CCD camera 852 are compared with each other by a patter matching process. Thus, an amount of the deviation of the observed image from the reference registered image is detected. The detected amount of deviation in the image is supplied to the control unit 829 so as to be processed. In the control unit 829, the mirror adjustment unit 830 is operated to adjust the angle of each of the automatic-adjustment mirrors 821, 822, 823 and 824 such that the amount of deviation in the image is canceled or minimized.

On the other hand, the light transmission passage 811 is constituted by combining, for example, six automatic mirrors and fixed mirrors. The automatic mirror is constituted by, for example, the automatic-adjustment mirrors 821, 822, 823 and 824 and the automatic angle-adjustment (fine adjustment) mirrors 825 and 826.

The automatic-adjustment mirrors 821, 822, 823 and 824 are automatic mirrors each having a mirror disposed on a biaxially-inclination stage which is moved by a stepping motor. In accordance with a control command issued from the control unit 829, the angles of the mirrors can be adjusted by stepping motor drivers constituting the mirror adjustment unit 830. The automatic mirror which is moved by the stepping motor is able to move over a wide range though the operation speed is unsatisfactorily low.

A drive mechanism, such as a servo-motor, may be employed in place of the stepping motor.

The automatic angle-adjustment mirrors 825 and 826 are PZT automatic mirrors each comprising a mirror disposed on a biaxially inclination stage which is moved by an electrostriction device (PZT). The angle of each of the automatic angle-adjustment mirrors 825 and 826 can be adjusted when the operation of the mirror-angle adjustment unit 831 is controlled in accordance with a control command issued from the control unit 829. The mirror which is moved by the electrostriction device (PZT) is a precise adjustment mirror having a narrow operation range and exhibiting an excellent accuracy.

As an alternative to the PZT automatic mirrors, mirrors each of which is moved by, for example, a galvanometer, may be employed as the automatic angle-adjustment mirrors 825 and 826. The automatic angle-adjustment mirrors 825 and 826 are mirrors each having a high reflectance with respect to the wavelength of the guide laser beam, that of the main laser beam and the wavelength region which is observed by the CCD camera 852.

The distance between the automatic-adjustment mirrors 825 and 821 and that between the automatic-adjustment mirrors 826 and 822 are sufficiently short with respect to the overall transmission distance of the light transmission passage 811.

Moreover, targets 833 to 836 are disposed immediately before the automatic mirrors 826, 823 and 824 and the laser-beam emitting head 816. Each targets 833 to 836 is a plate member having a surface subjected to a blast process and made of aluminum. The shape of the target may be an annular shape, a rectangular shape or another shape having an opening formed at a position through which light passes.

Lamps 838 to 841 are disposed adjacent to the targets 833 to 836 at positions at which only the portions in the vicinity of the targets can be illuminated and which serve as illuminating units. In accordance with a control command issued from the control unit 829, the lamps 838 to 841 can individually be turned on/off by the lamp-flashing control means 843.

The operation of the second embodiment of the light transmission apparatus according to the present invention will now be described.

In the light transmission apparatus 870 shown in FIG. 10, the main laser beam emitted from the main laser emitting unit 813 is guided into the light transmission means 812 by the dichroic mirror 815. Then, the main laser beam is passed through the light transmission passage 811 of the light transmission means 812 to be guided into the laser-beam emitting head 816. From the laser-beam emitting head 816, the main laser beam is applied to, for example, an incore structure which is the subject 817. As a result of the application of the laser beam, machining, inspect or preventive-maintenance/repair operation of the subject 817 is performed.

Prior to, in the air, transmitting the main laser beam emitted from the main laser emitting unit 813 through the light transmission means 812 to irradiate the subject from the laser-beam emitting head 816, the optical path of the light transmission passage 811 constituting the light transmission means 812 is adjusted. The adjustment of the light transmission passage 811 includes a coarse adjustment using the targets 833 to 836 and the illuminating unit and a precise adjustment using the guide laser units 871 and 872 and the parallel reflecting optical means.

Coarse Adjustment of Light Transmission Passage

The coarse adjustment operation of the light transmission passage 811 is performed such that the CCD camera 852, which is the electronic optical image pickup means is disposed to be aligned to the optical axis of the laser beam in the light transmission passage 811. Moreover, the optical axis of the laser beam is positioned at the center of the image photographed by the CCD camera 852. The position of the focal point and the focal distance of the CCD camera 852 can automatically be adjusted. When an image is photographed by changing the position of the focal point and the focal distance, the position through which the laser beam is passed can be recognized at an arbitrary position in the light transmission passage 811.

A procedure for adjusting the angle of the first automatic adjustment mirror 821 will now be described.

The light transmission passage 811 is usually covered with the shielded tube 818 to constitute the light transmission means 812 from which the light does not leak outward and through which the light is transmitted in the air. Therefore, the target 833 cannot be observed with no illumination. Therefore, the control unit 829 first issues a command to cause the lamp-flashing control means 843 to turn only the lamp 838 on. Since only the target 833 is illuminated when the lamp 838 has been turned on, only the target 833 can selectively be observed by the CCD camera 852.

After the target 833 has been illuminated, the signal processing unit issues a command to adjust the zooming position and the position of the focal point of the CCD camera 852 to perform a previous setting to sufficiently recognize the shape of the target 833.

When the zooming position and the position of the focal point of the CCD camera 852 have been adjusted, the target 833 for the image process can be observed as a mirror image through the automatic angle-adjustment mirrors 825 and 821. If the angle of setting of the first automatic adjustment mirror 821 is deviated, the position of the target 833 on an image which is being photographed by the CCD camera 852 is deviated from the center of the photographed image. The photographed image is transmitted from the CCD camera 852 to the image processing unit 855.

An image which is formed when the target 833 is observed in the central portion is previously registered to the image processing unit 855. The registered image and the observed camera image (the mirror image) are compared with each other in a pattern matching process. After the pattern matching process has been performed, an amount of deviation of the position of the target from the central portion is calculated by the image processing unit 855. A signal denoting a result of the process is outputted from the image processing unit 855 to the control unit 829. In accordance with information about the result of the image process, the control unit 829 controls the operation of the mirror adjustment unit 830 to move the automatic-adjustment mirror 821. The angle of the automatic-adjustment mirror 821 is adjusted so that adjustment is performed to position the target 833 in the central portion of the image which is being photographed by the CCD camera 852.

As a result, the central portion of the target 833 can be observed in the central portion of the image photographed by the CCD camera 852. A fact that the central portion of the target 833 is positioned in the central portion of the image which is being observed by the CCD camera 852 corresponds to a fact that the laser beam is passing through the central portion of the target 833. As a result, the coarse adjustment of the automatic-adjustment mirror 821 has been completed.

After the coarse adjustment of the automatic-adjustment mirror 821 has been completed, a coarse adjustment of the next automatic-adjustment mirror 822 is performed. The coarse adjustment of the automatic adjustment mirror 822 is performed similarly to the coarse adjustment of the automatic-adjustment mirror 821.

The coarse adjustment of the automatic-adjustment mirror 822 is performed such that the lamp-flashing control means 843 is operated in accordance with a command issued from the control unit 829 so as to turn the lamp 838 off. On the other hand, only the lamp 839 is turned on. Simultaneously, the signal processing unit issues a command to adjust the zooming position and the position of the focal point of the CCD camera 852 so that previous setting is performed to enable the shape of the target 834 to sufficiently be recognized.

After the lamp 839 has been turned on, the target 834 can be observed by the CCD camera 852 through the automatic mirrors 825, 821, 826 and 822. If the angle of the set automatic-adjustment mirror 822 is deviated, the position of the target 834 on the image which is being observed by the CCD camera 852 is deviated from the central portion of the photographed image. The image photographed by the CCD camera 852 is supplied to the image processing unit 855 so as to be processed.

An image formed when the target 834 is observed in the central portion has been registered to the image processing unit 855. The registered image is compared with the camera image by performing a pattern matching process. The comparison between the registered image and the observed image is made so that an amount of the deviation of the position of the target from the central portion is calculated. A result of the calculation is outputted from the image processing unit 855 to the control unit 829.

In accordance with information about the result of the image process supplied from the image processing unit 855, the control unit 829 operates the mirror adjustment unit 830 such that the target 834 is positioned in the central portion of the image which is being photographed by the CCD camera 852. Thus, the angle of the automatic-adjustment mirror 822 is adjusted.

As a result of the adjustment of the angle of the automatic-adjustment mirror 822, the central portion of the target 834 can be observed in the central portion of the image photographed by the CCD camera 852. The foregoing fact means a fact that the laser beam is passing through the central portion of the target 834. Thus, the coarse adjustment of the automatic-adjustment mirror 822 has been completed.

After the coarse adjustment of the automatic-adjustment mirror 822 has been completed, a combination of the lamp 840, the target 835 and the automatic-adjustment mirror 823 is subjected to a similar coarse adjustment process. Thus, the coarse adjustment of the automatic-adjustment mirror 823 is performed. After the coarse adjustment of the automatic-adjustment mirror 823 has been completed, a combination of the lamp 841, the target 836 and the automatic-adjustment mirror 824 is subjected to a similar process. Thus, the adjustment of the automatic-adjustment mirror 824 is performed.

The coarse adjustment processes of the automatic-adjustment mirrors 821 to 824 are sequentially performed by the control unit 829 by using the CCD camera 852 and the image processing unit 855. Thus, it is not necessary for an operator to approach each point in the light transmission passage 811. Therefore, the adjustment of the light transmission passage 811 to a required position can automatically be performed from a remote position. As a result, the carbon dioxide gas laser beam, which is the main laser beam can be guided into the adjusted light transmission passage 811.

Process for Precisely Adjusting Light Transmission Passage

A process for precisely adjusting the light transmission apparatus 870 and a function of correcting vibrations of the light transmission passage 811 will now be described.

The optical axes of the guide laser beams (the He—Ne laser beam and the He—Cd laser beam) emitted from the guide laser units 871 and 872 are adjusted to be coaxial by the light synthesizing means 874.

The He—Ne laser beam and the He—Cd laser beam adjusted to be coaxial are guided into the light transmission passage 811 so that scanning is performed. The wavelength of the guide laser beam guided in the light transmission passage 811 is separated at the position of the automatic adjustment mirror 824 disposed at the intermediate position of the light transmission passage 811. Thus, only the He—Ne laser beam is permitted to transmit so as to be guided into the separation optical path 844. The other beams are reflected and transmitted toward the next fixed mirror 827.

The He—Ne laser beam guided into the separation optical path 844 is reflected by the retro-reflector 846 which is the parallel reflecting optical means. The retro-reflector 846 has such a characteristic as that an incident beam is reflected in parallel with the incident beam regardless of the incident angle.

That is, when the laser beam is made incident on the central portion of the retro-reflector 846, the laser beam is reflected through the same passage (the light transmission passage) 811 which is the same passage for the incident beam. When the laser beam is made incident on a position deviated from the central portion, the laser beam is reflected in parallel to the incident beam from the position symmetrically deviated from the central portion.

The He—Ne beam reflected by the retro-reflector 846 is transmitted through the light transmission passage 811 in the inverse direction so as to be returned toward the guide laser units 871 and 872 which are the light sources.

In the light source portion, the dichroic sampling mirror 857 is disposed. The dichroic sampling mirror 857 reflects and samples only the reflected guide beam towards the sampling detection passage 873 and then passes through the dichroic mirror 877, which is the light separation means, so as to be made incident on the light position detecting unit 879.

Since the interference filters 876 and 878 are disposed in the sampling detection passage 873, light having the wavelength except for that of the He—Ne guide laser beam cannot reach the light position detecting unit 879. As a result, only the reflected beam of the He—Ne guide laser beam transmitted from the retro-reflector 846 is made incident on the light position detecting unit 879.

The position of incidence of the beam made incident on the light position detecting unit 879 is converted into an electric signal by the signal processing unit 65 so as to be received by the control unit 829 as control information.

On the other hand, the guide laser beam reflected by the automatic adjustment mirror 824 in the light transmission passage 811 is transmitted towards the fixed mirror 827 so that only the He—Cd laser beam which is the guide laser beam is reflected towards the retro-reflector 849. Residual light is allowed to transmit the fixed mirror 827 so as to be guided to the laser-beam emitting head 816.

The guide laser beam (the He—Cd laser beam) reflected by the fixed mirror 827 and guided to the separation optical path 848 is reflected by the retro-reflector 849 which is the parallel reflecting optical means. Light reflected by the retro-reflector 849 is transmitted in an opposite direction to the direction of the incidence so as to pass through the light transmission passage 811 to reach the dichroic sampling mirror 857.

The wavelength of the reflected guide laser beam transmitted from the retro-reflector 849 is separated by the dichroic mirror 877 which is the light separation means so as to be made incident on the light position detecting unit 881. Information of the position deviation of the guide laser beam at the position of the retro-reflector 849 is supplied to the control unit 829 through the signal processing unit 685. Since the interference filters 876 and 880 are provided for the sampling detection circuit 873, only the He—Cd laser beam is guided to the light position detecting unit 881.

As described above, the reflected guide laser beams from the retro-reflectors 846 and 849 are returned through the light transmission passage 811 so as to individually be made incident on the light position detecting units 879 and 881. Therefore, when the light position detecting units 879 and 881 detect the first and second reflected laser beam, the two reflected laser beams can individually be detected. Thus, information about the position deviation at the positions of the retro-reflectors 846 and 849 can be separated and recognized by the control unit 829.

In accordance with information about the light position deviation at the two positions, the control unit 829 controls the operation of the mirror-angle adjustment unit 831 to cancel or minimize the position deviation so as to carry out the feedback-control the automatic angle adjustment mirrors 825 and 826.

The detection control adjustment system detects the position deviation of the reflected guide laser beams so as to adjust the angles of the automatic angle-adjustment mirrors 825 and 826. Each of the components including the light position detecting units 879 and 881 for detecting the positions of the rotated guide laser beams, the signal processing unit 865, the control unit 829 and the mirror-angle adjustment unit 831 must have a quick response characteristic. Thus, position deviation of the beams caused by the vibrations of each mirror can be corrected in accordance with the speed of the feedback loop of the detection control adjustment system.

Moreover, in accordance with the accuracy of each of the retro-reflectors 846 and 849 and the position detection units 879 and 881 and the control accuracy of the automatic angle adjustment mirrors 825 and 826, the beam transmission position can be controlled.

The light transmission apparatus 870 is able to correct the fluctuation of the laser beams caused by vibration of air and mechanical vibrations which occur when a long-distance transmission is performed by using the automatic-adjustment mirror. Therefore, the laser beam can stably be transmitted to the position of the subject 817 for a long time.

In the light transmission apparatus 870 according to this embodiment, the optical axis of the light transmission passage 811 for the laser beam and the measuring axis of the CCD camera 852 are made to be the common axis. Therefore, the light transmission passage 811 for the laser beam can linearly be observed to the laser irradiation point. The deviation of the angle of the optical axis can be calculated from the position deviation of the laser irradiation point. Thus, the optical axis can be adjusted by the quantity of the deviation by using the automatic-adjustment mirrors 821 to 824. That is, it is not necessary to dispose the electronic image pickup unit, such as the CCD camera 852, at an intermediate position of the transmission passage. Therefore, the adjustment of the optical axis can be performed from a remote position even in an environment in which intense radioactive rays exist.

Furthermore, the CCD camera is not required to be disposed at each of the positions of the automatic-adjustment mirrors in the light transmission passage 811. Only one CCD camera 852 is required to perform the remote adjustment. Image information taken by the CCD camera 852 is supplied to the image processing unit 855 so as to be compared with the registered image serving as the reference image by the image processing unit 855. Thus, the pattern matching process is performed. As a result of the pattern matching process, an amount of deviation of the mirror image can automatically be measured in accordance with the image photographed by the CCD camera 852. Thus, the automatic-adjustment mirrors 821 to 824 can automatically be adjusted.

In the light transmission apparatus 870, the targets 833 to 836 for the image process are disposed adjacent to the mirrors 826, 823, 824 and 827 for use to transmit light to calculate the angle deviation of the optical axis from the position deviation of the targets 833 to 836. Therefore, only the mirrors 826, 823, 824 and 827 immediately before the targets 833 to 836 encountered the position deviation are used to adjust the optical axis. That is, when the automatic adjustment mirrors 821 to 824 in the light transmission passage 811 are adjusted from a remote position, the positions which must be adjusted to transmit light can clearly be detected, and the image process can be simplified.

In accordance with the shapes of the targets 833 to 836 for the image process, the positions of the automatic-adjustment mirrors 821 to 824 on the optical axis of the light transmission passage 811, which must be adjusted, and the targets 833 to 836 can clearly be determined. Thus, the determination of the positions which must be adjusted can be facilitated. The amounts of deviation of the automatic-adjustment mirrors 821 to 824 can accurately be measured.

In the light transmission apparatus 870 according to this embodiment, the lamps 838 to 841 which are illuminating units are disposed adjacent to the mirrors 826, 823, 824 and 827 for use in transmitting light. When illumination of only each of the targets 833 to 836 which is being observed by the CCD camera 852 is turned on, the target, the deviation of which is being corrected, can be detected. Thus, the position deviation can be calculated by using a clearer camera image. That is, the positions of the targets 833 to 836 for the image process corresponding to the automatic-adjustment mirrors 821 to 824 which must be adjusted at present can further clearly be distinguished from the other automatic-adjustment mirrors 821 to 824 and the targets 833 to 836 which are not adjusted at present. Therefore, the determination of the position which must be adjusted can be facilitated, and an amount of deviation of each of the automatic-adjustment mirrors 821 to 824 can accurately be measured.

In the light transmission apparatus 870, the mirror adjustment unit 830 which is operated by the control unit 829 is an automatic mirror unit which is moved by the stepping motor or the servo motor. When the automatic-adjustment mirrors 821 to 824 are moved in accordance with information about the image process, the automatic-adjustment mirrors 821 to 824 can accurately be moved by the amounts to be moved. Therefore, the necessity of repeatedly adjusting the same mirror can be eliminated, that is, the adjustment can be performed at a time. Therefore, an effect can be obtained in that the adjustment of the optical axis of the light transmission passage 811 can quickly be completed.

In the light transmission apparatus 870, the pattern matching function is added to the image processing unit 855 for the CCD camera 852. Therefore, a comparison with the registered image which is the reference for the light transmission passage 811 is permitted. Even if the point which must be irradiated with the laser beam cannot be observed by the CCD camera 852, the deviation in the angle of the optical axis can be calculated. Thus, the optical axis can be adjusted. That is, the image processing unit 855 provided with the pattern matching apparatus enables the shapes and position deviation of the targets 833 to 836 to easily be detected in accordance with the reference pattern (the registered pattern) registered at the previous adjustment. Therefore, the adjustment of the optical axis of the light transmission passage 811 can quickly be performed and the accuracy of the adjustment can be improved. Furthermore, the frequency of occurrence of malfunction of the apparatus caused from an incorrect recognition result of the image processing unit 855 can be lowered.

The light transmission apparatus 870 according to this embodiment includes the light transmission means 812 formed by combining one or more mirrors to constitute the light transmission passage 811. Moreover, a portion or all of the mirrors which constitute the light transmission passage 811 are provided with the mirror adjustment units 830 and 831 each of which is able to control the angle of inclination of the mirror from a remote position. A portion of mirrors on the light transmission passage 811 of the light transmission apparatus 870 is the half mirrors or the wavelength separation mirrors which are separation mirror means. Furthermore, the light position detecting units 879 and 881 are disposed at the positions at which reflected light of the guide laser beams separated by the separation mirror means 824 and 827. In addition, the control unit 829 is provided which processes position information outputted from the light position detecting units 879 and 881 to operate the mirror-angle adjustment unit 831. Therefore, the angles of the mirrors of the automatic angle adjustment mirrors can be performed more accurately than the position deviation measuring method using the CCD camera 852. The measurement of the position can considerably quickly be completed as compared with the structure using the CCD camera. Therefore, even if the optical axis is shifted owning to vibrations of the apparatus, the automatic angle-adjustment mirrors 825 and 826 are moved in a direction in which the deviation of the optical axis is canceled. Thus, the influence of the vibrations can be eliminated.

The light transmission apparatus 870 is provided with the plural guide laser units 871 and 872 individually from the main laser emitting unit 813 for outputting the main laser beam. Therefore, if the main laser beam has a repetition variation factor like that of the pulse laser, the adjustment of the optical axis of the light transmission passage 811 can be performed relative to the laser beams emitted from the guide laser units 871 and 872 for adjusting the optical axes and serving as the guide laser beams. Therefore, stable light transmission can be performed.

In the light transmission apparatus 870 according to this embodiment, a portion of the automatic adjustment mirror 824 and the fixed mirror 827 of the light transmission passage 811 are the separation mirror means, such as the half mirrors or the wavelength separation mirrors. Furthermore, there are provided: the parallel reflecting optical devices 846 and 849 disposed at the positions to which the guide laser beams separated by the separation mirror means 824 and 827 are transmitted and represented by the corner cube prism, the hollow corner cube or the cat's eye optical device; the half-mirror means 819 disposed adjacent to the light source portion of the first and second guide laser units 871 and 872; the light position detecting units 879 and 881 disposed next to the half mirror; and the control unit 829 for processing position information outputted from the light position detecting units 879 and 881 to operate the mirror-angle adjustment unit 831. Therefore, the necessity of disposing electronic elements, such as the light position detection unit in the light transmission passage 811 can be eliminated to measure an amount of the position deviation of light from a remote position. Thus, complicated wiring is not required and no electronic element is disposed in the light transmission passage 811. Therefore, it becomes possible to be applied to an environment in which intense radioactive rays exist.

The light transmission apparatus 870 according to this embodiment includes a plurality of, for example, two or more guide laser units 871 and 872 for emitting laser beams having wavelengths different from that of the main laser beam which must be transmitted. The laser beams are different from each other. A plurality of the mirrors at intermediate positions in the light transmission passage 811 are wavelength separation mirrors to correspond to the number of the first and second guide laser units 871 and 872. Still furthermore, there are also provided: the parallel reflecting optical devices 846 and 849 disposed at the positions to which the guide laser beams separated by the wavelength separation mirrors are transmitted and represented by the corner cube prism, the hollow corner cube or the cat's eye optical device; the half mirror means 819 disposed adjacent to the light source of the guide laser units 871 and 872; the wavelength separation mirror means 877; a plurality of light position detecting units 879 and 881 for individually detecting the wavelength-separated guide laser beams; and the control unit 829 which processes position information outputted from each of the light position detecting units 879 and 881 to operate the mirror-angle adjustment unit 831 serving as the automatic mirror unit. Therefore, when an amount of position deviation of the beam is adjusted at a plurality of positions in the light transmission passage 811, it is not necessary to consider an influence of the disorder of polarization of the laser beam. Therefore, deviation of the positions of the beams can be measured at a plurality of positions with satisfactory separation performance. If three or more points at which amounts of position deviation of the beams must be measured exist, only increase in the number of types of the guide laser beams is required.

The light transmission apparatus 870 according to this embodiment includes the mirror-angle adjustment means (the automatic mirror unit) 831 which is operated by the control unit 829. The mirror-angle adjustment unit 831 is the automatic mirror unit which is operated by the electrostriction device or the galvanometer exhibiting quick response. Moreover, the light position detecting units 879 and 881 are light position detecting units comprising the PSD devices (Position Sensitive Detectors) or the separation-type photo-diode devices. Therefore, even if an external influence of vibrations having higher frequency components is exerted on the light transmission apparatus 870, an influence of the deviation of the optical axis caused from vibrations can be eliminated.

The light transmission apparatus 870 according to this embodiment is able to automate the adjustment of the optical axis of the light transmission passage 811 from the coarse adjustment to the precise adjustment and elimination of the influence of vibrations.

The light transmission apparatus 870 is able to adjust the optical axis of the light transmission passage 811 from a remote position. Therefore, even if the laser unit is disposed apart from the portion in which the material is machined or inspection is performed, stable machining or inspection can be performed.

Moreover, the light transmission apparatus 870 is able to stably transmit a large output laser beam when the preventive-maintenance/repair of an incore structure is performed. Therefore, reliable operation can be performed. Moreover, the same light transmission passage 811 can be used to cause the CCD camera to photograph the transmission position from a remote position.

According to the present invention, there is provided a preventive-maintenance/repair apparatus for an incore structure, and an embodiment thereof will be described hereunder with reference to the drawings.

Figure 11:
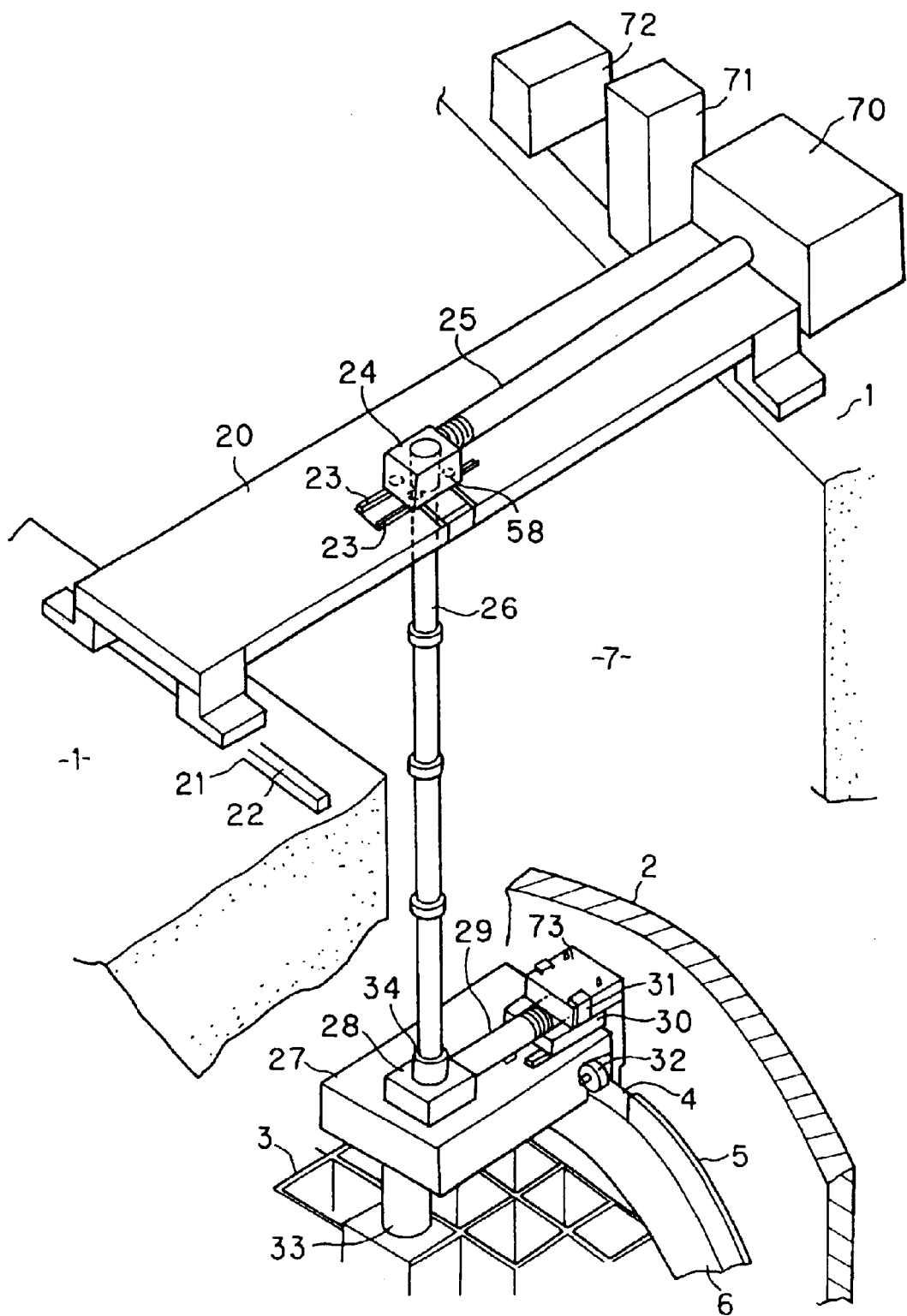
FIG. 11 is a perspective view showing an embodiment of a preventive-maintenance/repair for an incore structure.

FIG. 11 shows the overall structure of an embodiment of the preventive-maintenance/repair apparatus for an incore structure according to the present invention. In particular, a region from an operation floor 1 to an upper portion of the core shroud body 6 disposed in the reactor pressure vessel 2. A laser oscillator 70 including an automatic alignment unit and a position sensor (PSD), a power supply unit 71 and a control panel 72 are disposed on the operation floor 1. A light transmission pipe 25 is connected to the laser oscillator 70. A movable reflecting mirror box 24 serving as a first reflecting mirror box is connected to the light transmission pipe 25.

A laser beam emitted from the laser oscillator 70 is positioned and adjusted to be transmitted towards the central portion of the core in the reactor pressure vessel 2. Leakage of light from the light transmission pipe 25 is prevented by means of insulation. A support column 20 for bearing the load of the light transmission pipe 25 is disposed above a reactor pool 7 across the reactor pool 7.

The movable reflecting mirror box 24 is mounted on the central portion of the support column 20. The movable reflecting mirror box 24 has wheels 58 joined to the lower portion thereof so as to be placed on rails 23. As a result, arbitrary movement and position adjustment are permitted so as to connect the rear end of the light transmission pipe 25.

The movable reflecting mirror box 24 accommodates a 90°-reflecting mirror (not shown) having an automatic alignment function which is capable of automatically adjust the angle from a remote position. Thus, the laser beam emitted from the laser oscillator 70 to pass through the light transmission pipe 25 is bent at right angle so as to transmit downward the laser beam toward the core.

In order to protect the laser beam from water in the reactor pool 7 to realize transmission in the air, a four multi-step assembly type light-transmission masts 26 each having a length of about 4 m and a total length of the four masts is about 16 m, the mast having an end closed by a flat glass 55 (see FIG. 14) are suspended from the lower surface of the movable reflecting mirror box 24. The lower end of each of the light-transmission masts 26 is inserted into a light-transmission-pipe guide 34 of a turning mechanism 28 positioned on a turning vehicle 27 at the center of turning.

The turning vehicle 27 has a clamping mechanism 33 disposed on the lower surface of the center of turning. The clamping mechanism 33 is inserted into a lattice at the core center of an upper lattice plate 3 joined to the upper portion of a core shroud body 6 so as to be locked. Furthermore, wheels 32 are disposed at the other lower surface of the turning vehicle 27. The wheels 32 permits the turning vehicle 27 to arbitrarily be moved along the outer surface of the core shroud body 6 such that the turning vehicle 27 is placed on the upper outer ring 4 of the core shroud body 6.

A horizontal light transmission pipe 29 for introducing the laser beam from the light-transmission masts 26 in the direction of the normal line from the center of turning is disposed on the turning vehicle 27. The horizontal light transmission pipe 29 is connected to an annulus laser machining unit 73. Thus, transmission of the laser beam to the annulus laser machining unit 73 in the air is permitted.

A second reflecting mirror box (not shown), the upper surface of which is connected to the lower end of the light-transmission masts 26 and which has an automatic alignment mechanism composed of at least one mirror and arranged to modify the angle, is connected to the lower end of the light-transmission masts 26. The reflecting mirror box is connected to the horizontal light transmission pipe 29.

The annulus laser machining unit 73 is secured to the turning vehicle 27 by a clamping mechanism 31. The clamping mechanism 31 is able slide in the radial direction from the center of the core by a slide mechanism 30.

Figure 12:
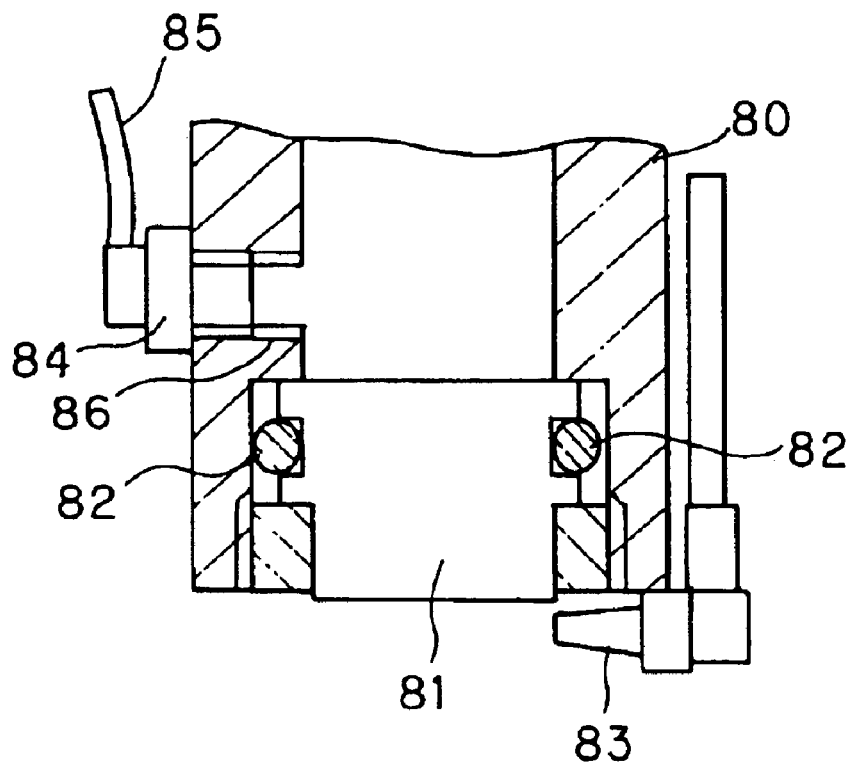
FIG. 12 is a cross sectional view showing an essential portion of the present invention shown in FIG. 11.

FIG. 12 is a cross sectional view showing the embodiment shown in FIG. 11 such that a portion of the embodiment is illustrated by a side view. Referring to FIG. 12, reference numeral 80 represents a light transmission pipe. The light transmission pipe 80 corresponds to the light transmission pipe 25, the light-transmission masts 26 and the horizontal light transmission pipe 29 shown in FIG. 1. A flat glass 81 having two surfaces polished sufficiently so as to provide excellent flatness and parallelism is fitted to each end of the light transmission pipe 80. Further, O-rings 82 are used so that an airtight structure is formed.

Three water nozzles 83 facing the central portion of the flat glass are joined to three points on the outside of the flat glass. A tapped hole 86 is formed in a portion of the light transmission pipe 80. An air-pressure connector 84 is screwed in the tapped hole 86 so as to be joined. An air pressure hose 85 is connected to the air-pressure connector 84. The air pressure hose 85 is extended to an air pressure unit (not shown) disposed on the operation floor 1 shown in FIG. 1. A nitrogen cylinder is a supply source for the air pressure unit so that supply of 100% dry nitrogen gas to the light transmission pipe 80 is permitted.

Figure 13:
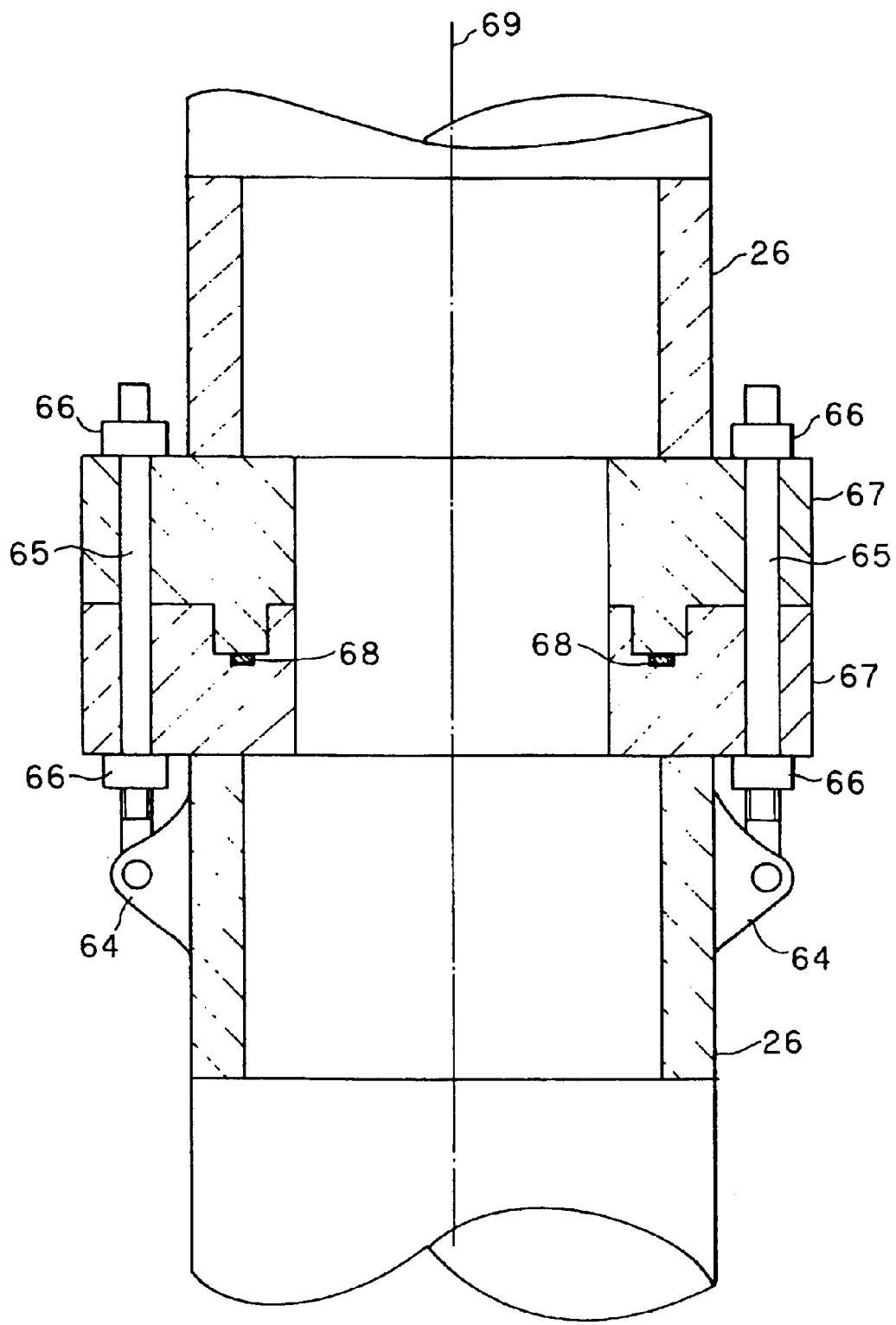
FIG. 13 is a vertical cross sectional view showing an embodiment of the present invention.

FIG. 13 shows the structure of an intermediate joint portion of the multi-step assembly type light-transmission masts 26. A flange 67 is joined to the end of each of the light-transmission pipe 26. Thus, the light-transmission pipes 26 are connected and secured to one another by bolts 65 and nuts 66. Each flange joint surface is made to be airtight by an O-ring 68. The bolt 65 is secured to the light-transmission pipe 26 by a hinge 64 so that unintentional separation during the connection operation is prevented. Reference numeral 69 represents a laser beam in a state of transmission through the light-transmission pipes 26.

Figure 14:
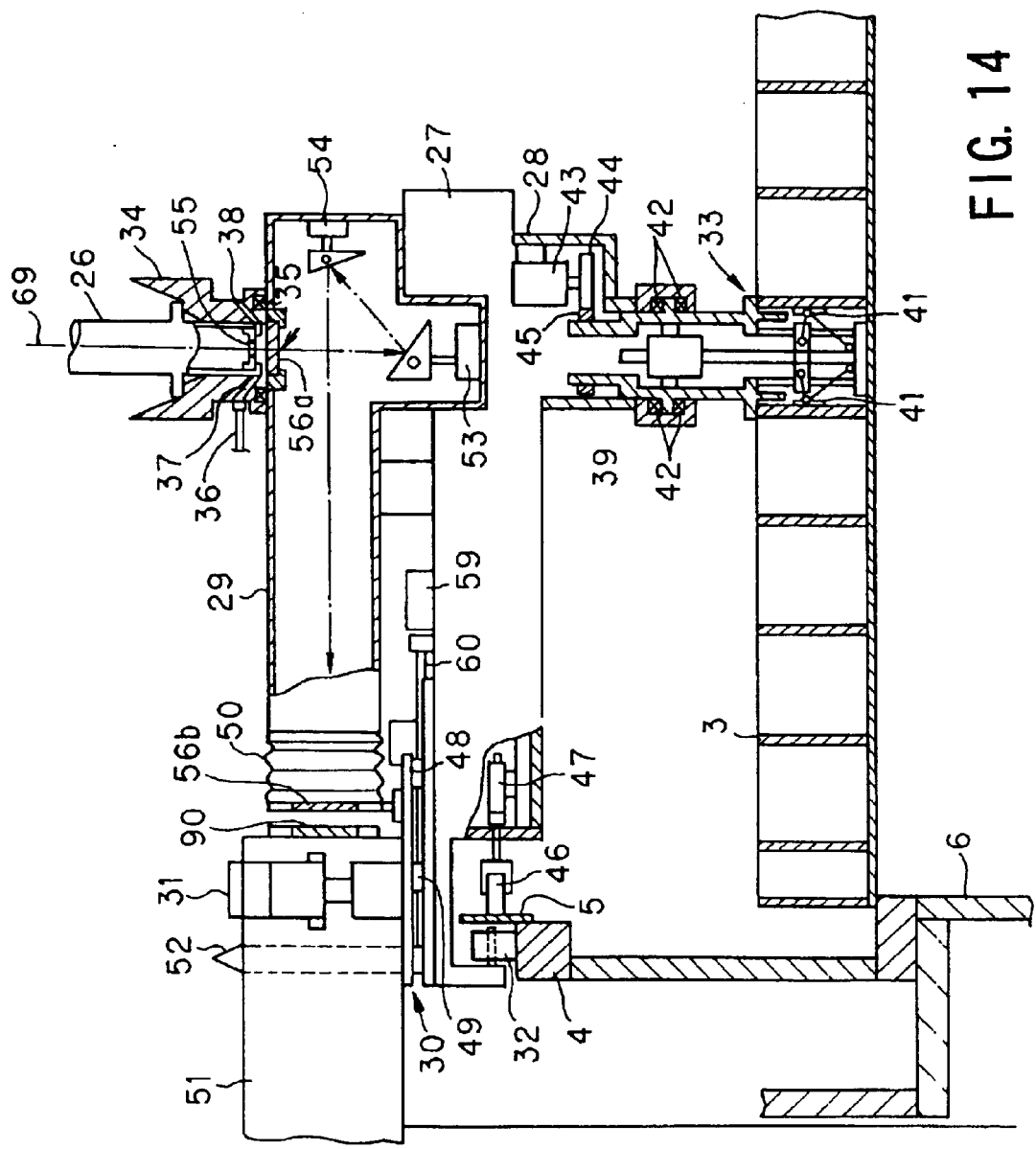
FIG. 14 is a vertical cross sectional view showing an embodiment of the present invention.

FIG. 14 shows an embodiment in which the structure of the turning vehicle 27 and a state of joining to the upper lattice plate 3 and the core shroud body 6. The turning-vehicle clamping mechanism 33 is composed of an air cylinder 39, a link 40 and a pad 41. The turning mechanism 28 is disposed on the turning-vehicle clamping mechanism 33. The turning mechanism 28 is composed of a bearing 42, an electric motor 43 and gears 44 and 45.

The axis of turning is made coincide with the center of the turning-vehicle clamping mechanism 33. The wheels 32 are wheels for turning and joined to run on the upper ring 4 disposed at the upper end of the upper shroud body 6a. Moreover, a guide roller 46 is joined such that an air cylinder 47 is able to press the guide roller 46 against the inner surface of a skirt 5 disposed on the inside of the upper ring 4.

A light-transmission-pipe guide 34 which is a receiving frame for the light-transmission pipes 26 is disposed such that the optical axis of the laser beam 69a in the multi-step assembly type light-transmission pipes 26 coincides with the turning axis. The light-transmission-pipe guide 34 is rotatively joined to a horizontal light-transmission pipe 29 through a bearing 35. The light-transmission-pipe guide 34 is partitioned by a flat glass 56a so that the airtightness of the light-transmission pipe 29 is maintained.

The upper end of the light-transmission-pipe guide 34 is formed into a mortar shape to guide the insertion of the multi-step assembly type light-transmission pipes 26. The light-transmission-pipe guide 34 has a water-supply inlet opening line 37 and a water discharge opening 38 to permit circulation of water accumulated in a gap between the flat glass 55 and the flat glass 56a of the light-transmission pipes 26.

The horizontal light-transmission pipe 29 accommodates reflecting mirrors 53 and 54 for reflecting the laser beam 69 to make an angle of about 45°. Thus, the laser beam 9 transmitted downward from the multi-step joint type light-transmission pipes 26 is bent at an anticipated angle of 45° by a reflecting mirror 53 so as to be made incident on a reflecting mirror 54, and then bent at an anticipated angle of 45°. Thus, the laser beam 9 is horizontally transmitted toward a flat glass 56b at another end surface of the horizontal light-transmission pipe 29.

The reflecting mirrors 53 and 54 are biaxial and electric mirrors, the angle of each of which can be modified from a remote position. An electric actuator for the reflecting mirror 53 is an electric motor to be capable of adjusting a wide angle range so as to be used in a low-speed automatic alignment for the coarse adjustment. An electric actuator for the other reflecting mirror 54 comprises a piezoelectric device with which high-speed, high resolution and accurate adjustment is permitted in spite of a narrow adjustable angle range so that it is used to a high speed automatic alignment for the precise adjustment.

Transmission of the laser beam between the horizontal light-transmission pipe 29 and the annulus laser machining unit 73 is performed such that the laser beam is temporarily transmitted in water. The flat glass 56b at the laser-beam outlet opening of the horizontal light-transmission pipe 29 and a flat glass 90 at the laser-beam inlet opening of the annulus laser machining unit 73 disposed opposite to each other are secured to the upper surface of a telescopic frame 48 on the turning vehicle 27 such that their optical axes coincide with each other.

The telescopic frame 48 is able to slide in the radial direction from the center of the core by the slide mechanism 30 from a remote position. In this embodiment, the slide mechanism 30 is realized by a linear guide 49, a motor 59 and an outer frame 60.

The telescopic frame 48 has a locating pin 52 for the annulus laser machining unit 73 and a clamping mechanism 31 for securing the disposed annulus laser machining unit 73. A portion in the vicinity of the laser-beam outlet opening of the horizontal light-transmission pipe 29 is formed by an extensible bellows pipe 50. An air cylinder 47 enables the laser-beam outlet opening to be slid. Thus, the laser-beam outlet port of the horizontal light-transmission pipe 29 can temporarily be retracted during the operation for disposing the annulus laser machining unit 73.

Figure 15:
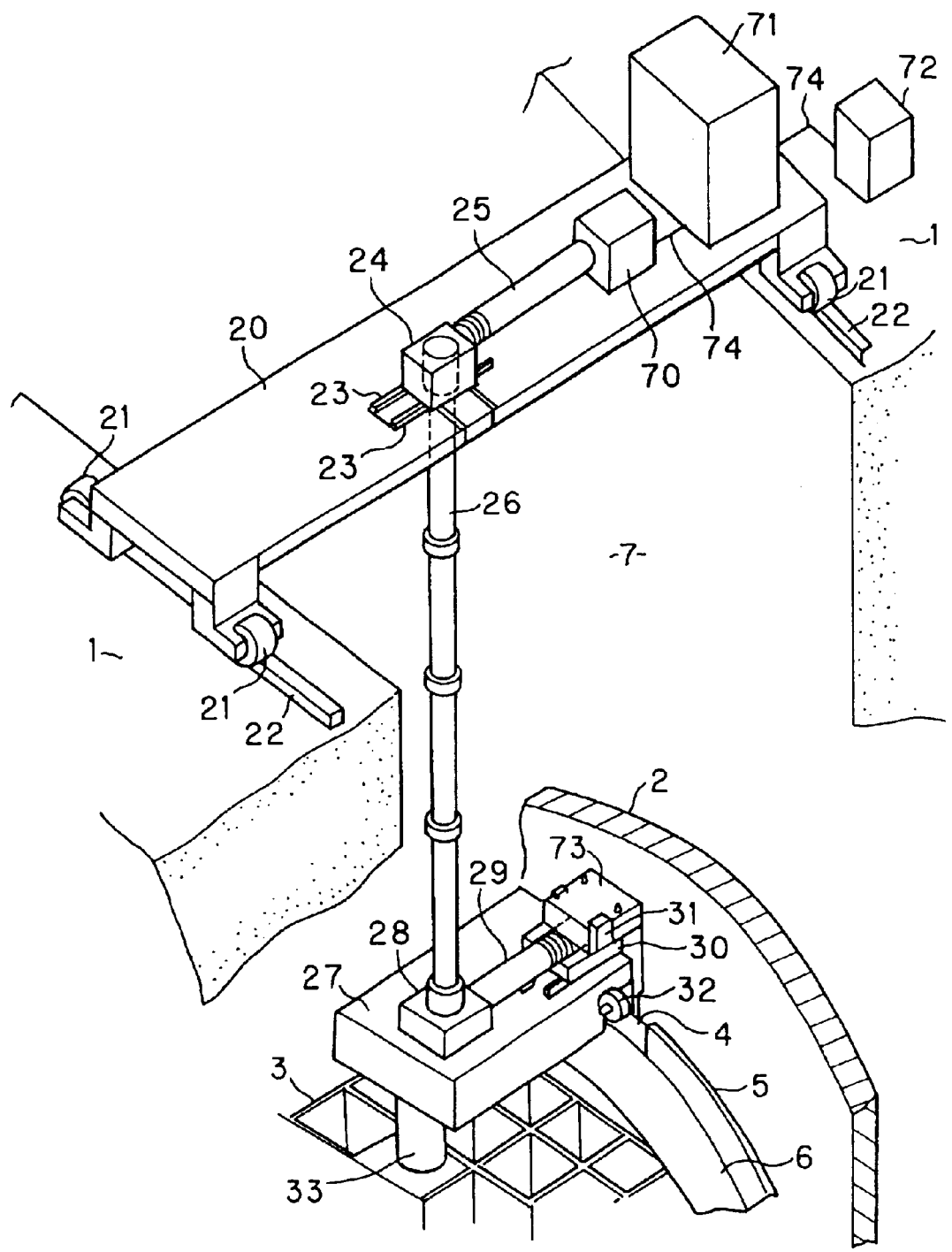
FIG. 15 is a perspective view showing an embodiment of the present invention.

FIG. 15 is a diagram showing a structure that the support column 20 is made to be a movable column. The flat-plate support column 20 has wheels 21 joined to the two sides thereof. The movable support column 20 is mounted on the rails 22 temporarily disposed on the operation floor 1. The laser oscillator 70 having an automatic alignment unit and a position sensor (PSD) (not shown), a power supply unit 71, the light transmission pipe 25 and the movable reflection mirror box 24 are mounted on the movable support column 20. Further, a control panel 72 is disposed on the operation floor 1.

The movable reflection mirror box 24 is mounted on the central portion of the support column 20. As shown in FIG. 11, the wheels 58 are joined to the movable reflection mirror box 24 and placed on the rails 23 so as to arbitrarily be moved so that the position adjustment is permitted. The light transmission pipe 25 is connected to the movable reflection mirror box 24. A portion of the light transmission pipe 25 is formed into a bellows pipe structure so that the position adjustment of the movable reflection mirror box 24 is permitted.

The movable reflection mirror box 24 accommodates a 90°-reflecting mirror having an automatic alignment function with which the angle can automatically be adjusted from a remote position. Thus, the Laser beam emitted from the laser oscillator 70 is bent at a right angle to downwards transmit the laser beam towards the reactor core.

Figure 16:
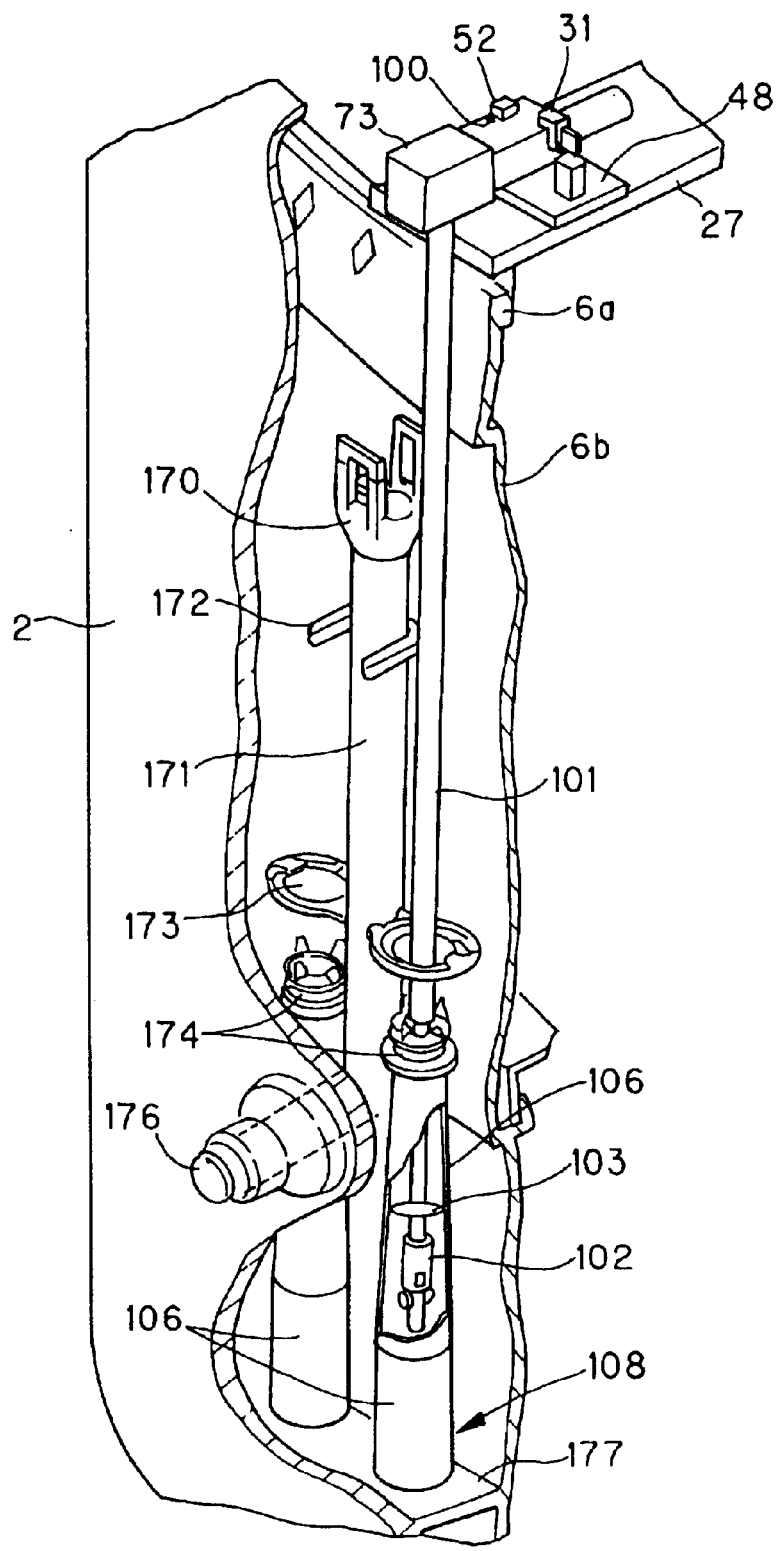
FIG. 16 is a perspective view showing an embodiment of the present invention.

FIG. 16 is a perspective view showing the annulus laser machining unit 73 such that a portion is illustrated in a cross sectional view. The annulus laser machining unit 73 has a locating pin hole 100 into which a locating pin 52 joined to the telescopic frame 48 of the turning vehicle 27 is inserted. Moreover, the clamping mechanism 31 of the turning vehicle 27 secures the disposed annulus laser machining unit 73.

A case disposed at the upper end of the annulus laser machining unit 73 accommodates an electric reflecting mirror, the angle of which can be adjusted from a remote position. Thus, the laser beam transmitted from the turning vehicle 27 is bent at about 90° towards a light transmission pipe 101 downwards formed perpendicularly.

Figure 17A:
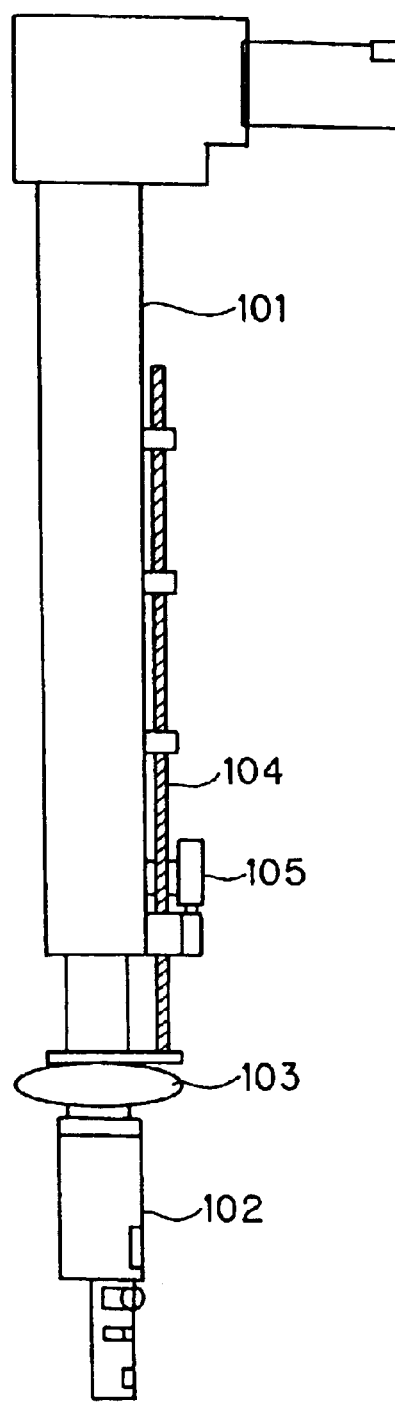
FIG. 17(A) is a side view showing an example of a fixed portion and FIG. 17(B) is a vertical cross sectional view showing the laser-beam emitting head shown in FIG. 17(A)

The light transmission pipe 101 is a pipe composed of two elongated hollow cylindrical pipes, the light transmission pipe 101 having a leading end provided with a laser emitting head 102 and a fixed portion 103. The outer shape of the light transmission pipe 101 is designed to be capable of passing through a diffuser 106 of a jet pump 108. As shown in FIG. 17(A), a ball screw 104 and a motor 105 are joined to the light transmission pipe 101 so as to be telescopic from a remote position.

Figure 17B:
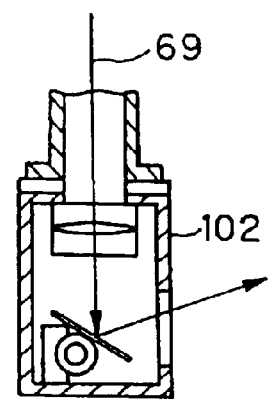

FIGS. 17(A) and 17(B) show a structure of the fixed portion 103 shown in FIG. 16. A hollow bag shape fixed portion 103 made of an elastic thin film made of rubber or the like is disposed between the light transmission pipe 101 and the laser emitting head 102. A pressure hose (not shown) is connected to the fixed portion 103. The pressure hose extends to the operation floor 1 shown in FIG. 11 so as to be connected to an air pressure circuit for the above-ground control panel.

Figure 18:
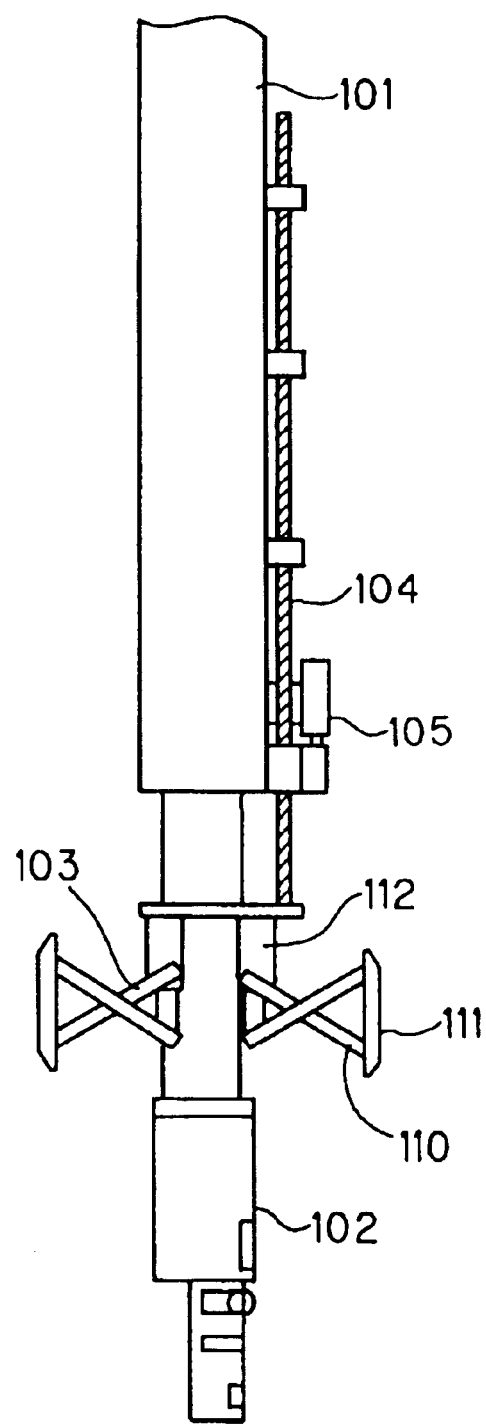
FIG. 18 is a side view showing another example of the fixed portion according to the present invention.

FIG. 18 is a diagram showing another structure of the fixed portion 103 shown in FIG. 16. In this example, the fixed portion 103 is composed of a link mechanism 110, a pad 111 and a hydraulic cylinder 112.

Figure 19:
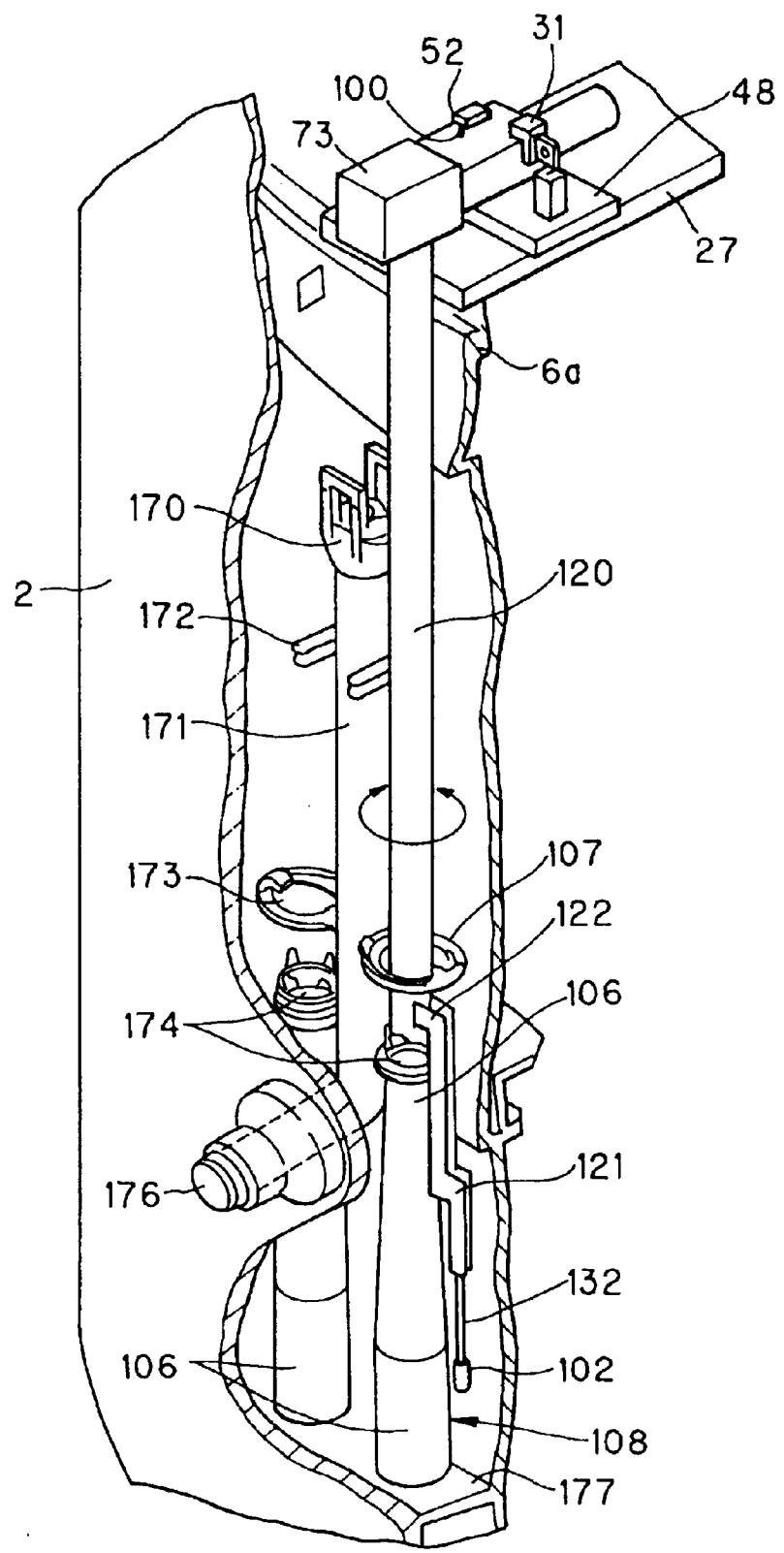
FIG. 19 is a perspective view showing an embodiment of the present invention.

FIG. 19 is a diagram showing an example of the annulus laser machining unit 73. The annulus laser machining unit 73 has a locating pin hole 100 into which the locating pin 52 joined to the telescopic frame 48 of the turning vehicle 27 is inserted. The clamping mechanism 31 of the turning vehicle 27 secures the disposed annulus laser machining unit 73.

A case at the upper end of the annulus laser machining unit 73 accommodates an electric reflecting mirror, the angle of which can be adjusted from a remote position. Thus, the laser beam transmitted from the turning vehicle 27 is bent at about 90° towards a rotary light-transmission pipe 120 extending perpendicularly downward. The lower end of the rotary light-transmission pipe 120 is seated within an upper-end opening of the diffuser 106.

A machining arm 121 is joined to the lower portion of the rotary light-transmission pipe 120 disposed lower than the diffuser bracket 107. The rotary light-transmission pipe 120 and the machining arm 121 are attached/detached by connection mechanisms 122a and 122b from a remote position. The laser emitting head 102 is joined to the lower end of the machining arm 121 through a short arm 132.

Figure 20:
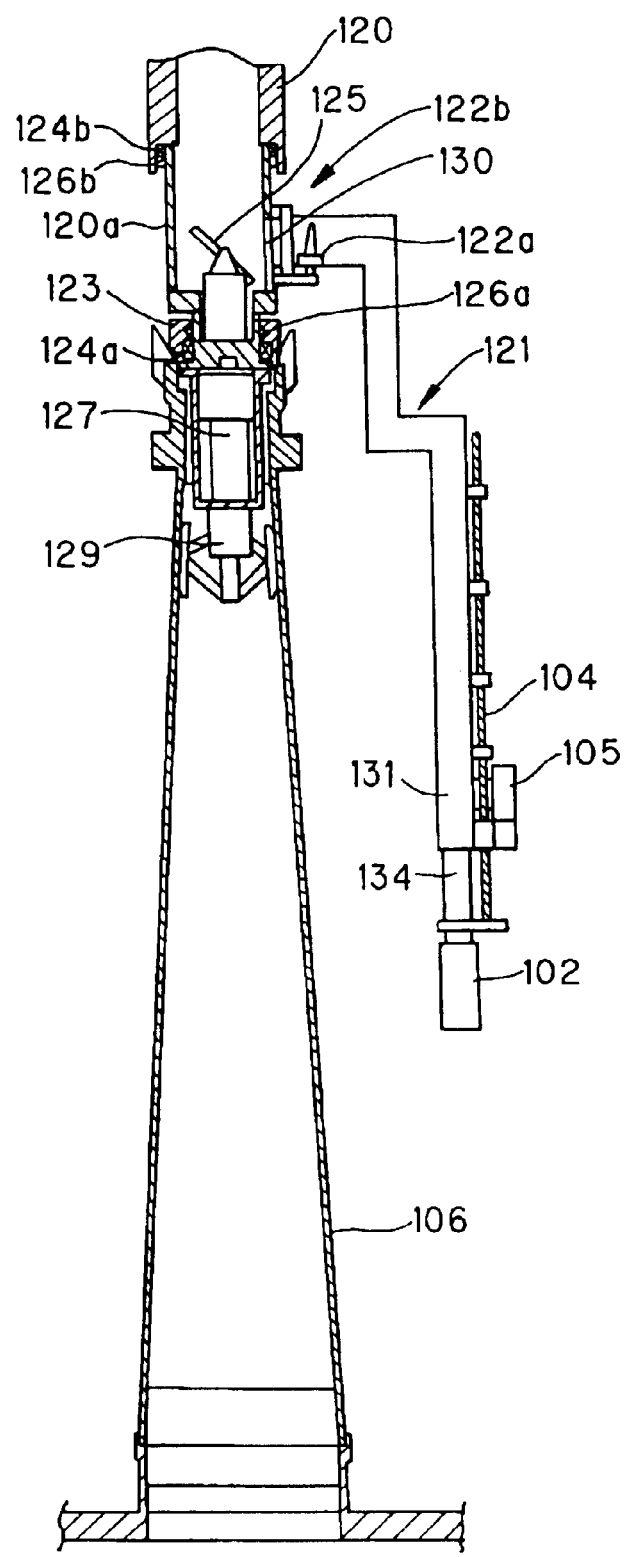
FIG. 20 is a vertical cross sectional view showing an embodiment of the present invention.

Referring to FIG. 20, the rotary light-transmission pipe 120 is disposed above the diffuser 106. A seating portion 123 is formed at the lower end of the rotary light-transmission pipe 120. The seating portion 123 is composed of a bearing 124a, a clamping mechanism 129, an O-ring 126a and a motor 127. When the motor 127 has been rotated, an intermediate light-transmission pipe 120a disposed above the seating portion 123 can be rotated.

The intermediate light-transmission pipe 120a is composed of an electric reflecting mirror 125, a flat glass 130, a bearing 124b and an "O" ring 126b. The lower portion of the rotary light-transmission pipe 120 is rotative. Further, an electric reflecting mirror 128 (not shown) is disposed above the rotary light-transmission pipe 120. Thus, the laser beam transmitted from the turning vehicle 27 is temporarily bent downward so as to be transmitted through the rotative light-transmission pipe 20. The lower reflecting mirror 125 bends the laser beam towards a flat glass 130 in the connection window of the connection mechanism 122a.

The machining arm 121 is composed of the connection mechanism 122a, a telescopic light-transmission pipe 131, an air-pressure cylinder 134 and the laser emitting head 102. An air-pressure piston 132, the ball screw 104 and the motor 105 are joined to the telescopic light-transmission pipe 131.

Figure 21:
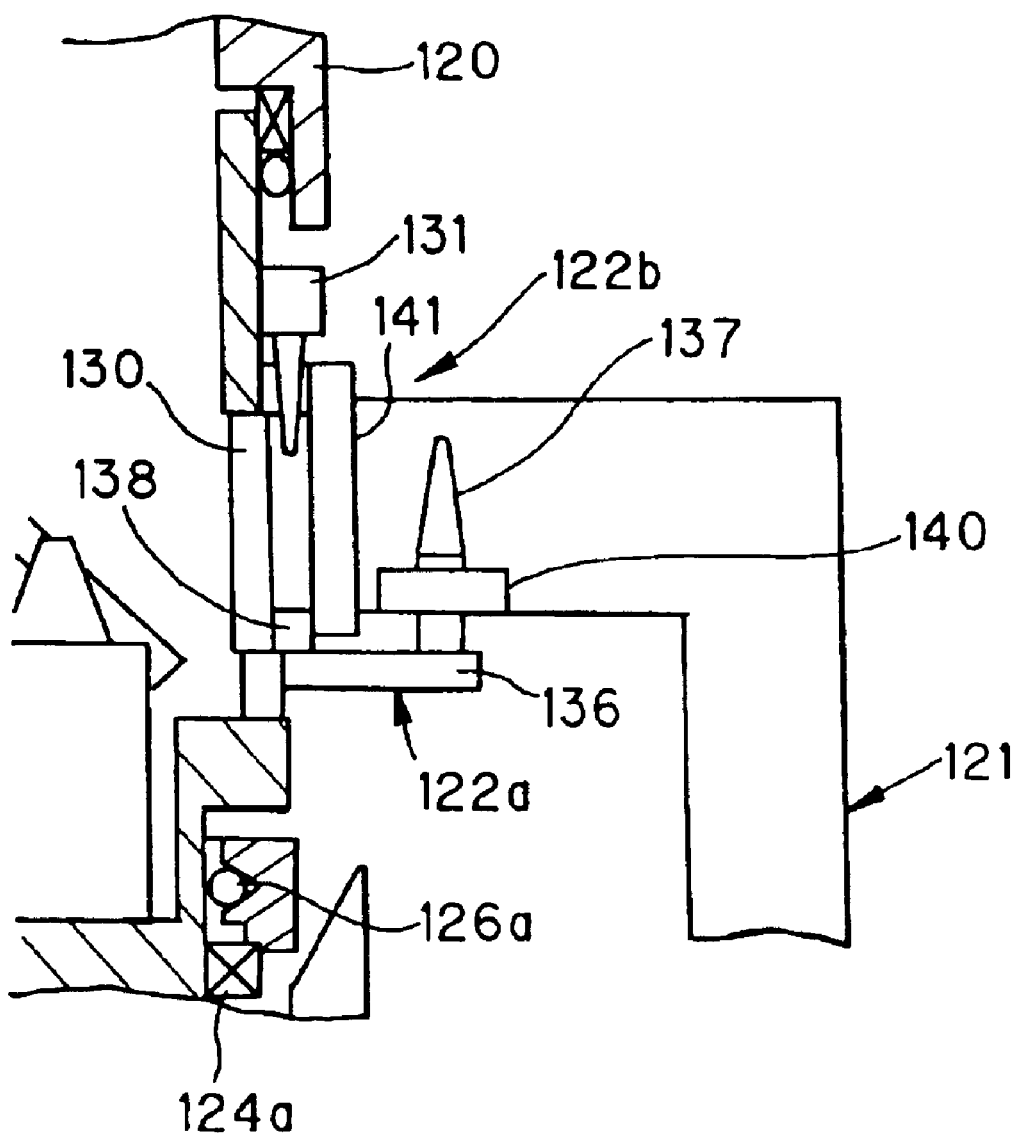
FIG. 21 is an enlarged vertical cross sectional view showing a portion including the connection mechanism shown in FIG. 20.

FIG. 21 is a structural view showing a portion including the connection mechanism 122a. The connection mechanism 122a for the rotary light-transmission pipe 120 is composed of a connection frame 136, a locating pin 137, an electromagnetic chuck 138, a flat glass 130 and a water jet nozzle 131. The connection mechanism 122b for the machining arm 121 is composed of a pin hole 140 arranged to be engaged to the locating pin 137, a flat glass 141 and a water jet nozzle 142 (not shown).

Figure 22:
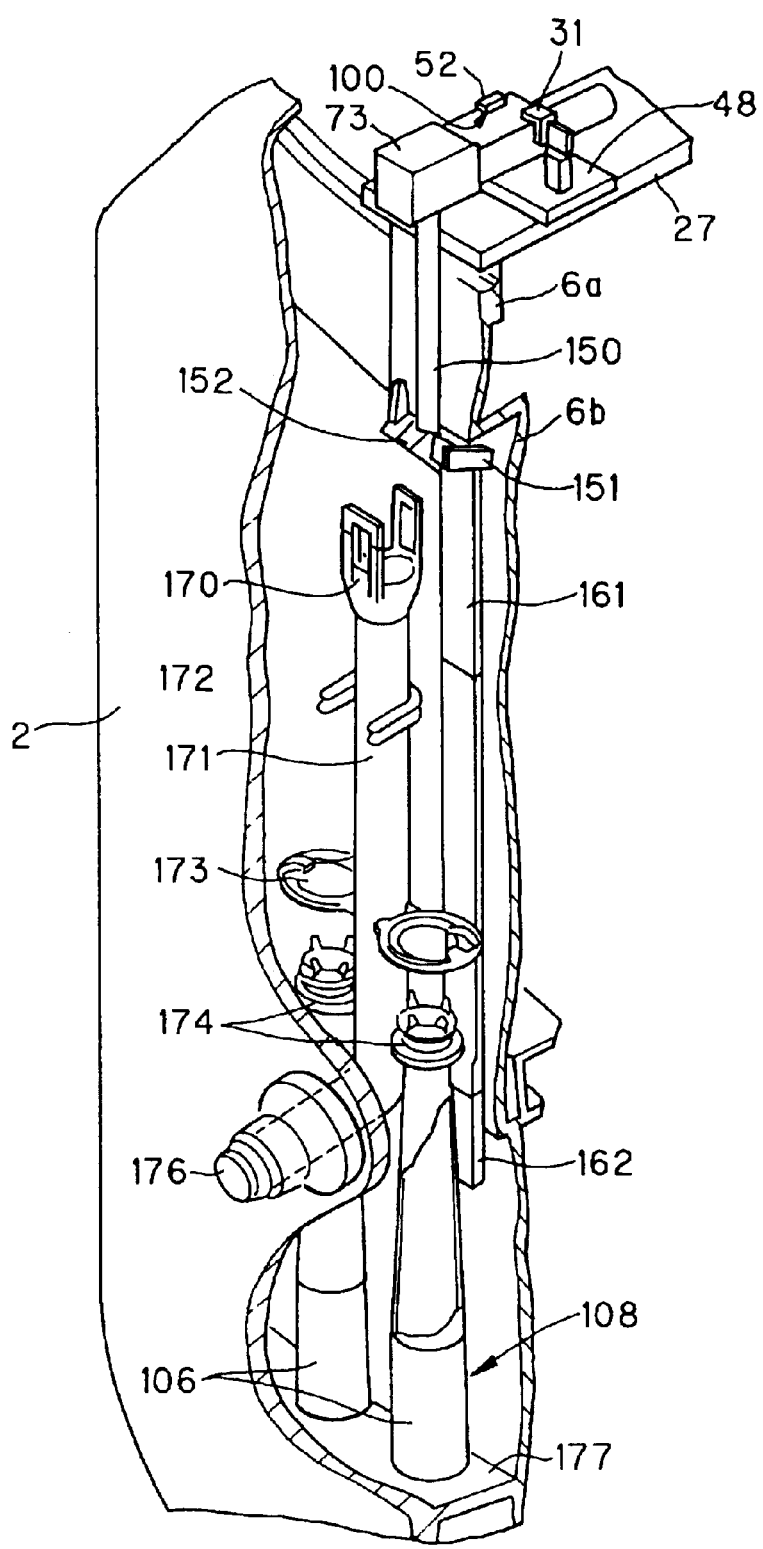
FIG. 22 is a perspective view showing an annulus laser machining unit according to an embodiment.

FIG. 22 is a diagram showing an example of the annulus laser machining unit 73. The annulus laser machining unit 73 has the locating pin hole 100 into which the locating pin 52 joined to the telescopic frame 48 of the turning vehicle 27 is inserted. Moreover, the clamping mechanism 31 of the turning vehicle 27 secures the disposed annulus laser machining unit 73.

A case disposed at the upper end of the annulus laser machining unit 73 accommodates an electric reflecting mirror (not shown) having an angle which can be adjusted from a remote position. Thus, the laser beam transmitted from the turning vehicle 27 is bent at an angle of about 90° towards a light transmission pipe 150 extending downward perpendicularly.

A joint-type light-transmission pipe portion 151 according to claim 15 is disposed at a position lower than the light transmission pipe 150 for a distance of about 1.5 m. In order to correspond to the movement of each of the air pressure piston 152 and the parallel link mechanism 153, the optical axis for an arbitrary distance can be offset. An insertion mast 161 and a laser-beam emitting head 162 are disposed below the joint-type light-transmission pipe portion 151.

Figure 23:
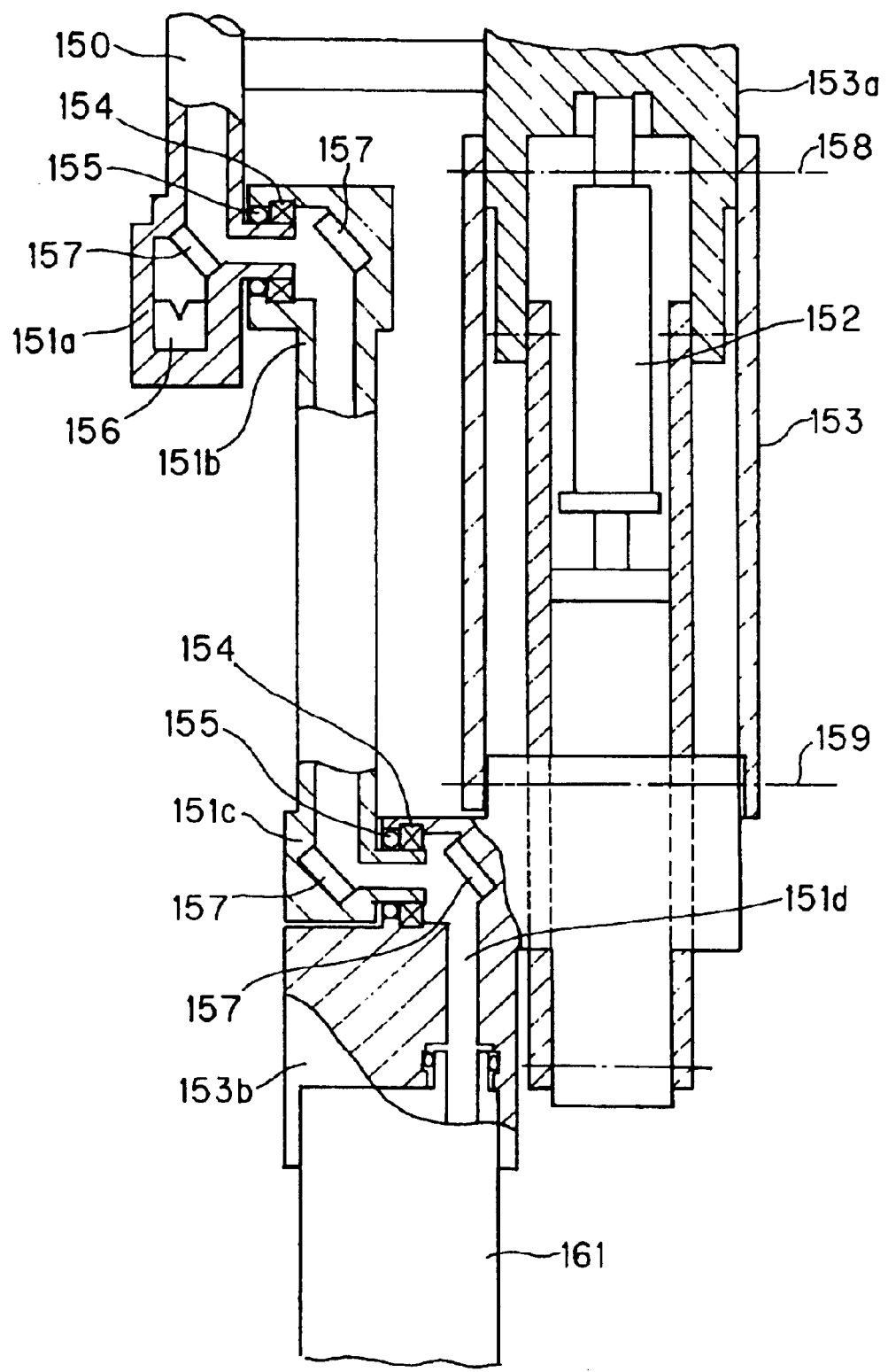
FIG. 23 is a side view including a partial cross sectional view showing the joint-type light guide pipe shown in FIG. 22.

A detailed structure of the joint-type light-transmission pipe 151 is shown in FIG. 23. The light transmission pipe 151 is composed of four 90°-reflecting mirrors 157. Two reflecting mirrors, that is, the second joint shaft 151b and the third joint shaft 151c are rotational shafts which are rotated by a bearing 154 and an O-ring 155.

In the embodiment, as a means for detecting the deviation of the optical axis for the automatic alignment unit for adjusting the optical axis of the laser beam, a retro-reflector 156 is inserted into a first joint 151a. Therefore, the reflecting mirror 157 in the foregoing joint is a half mirror.

The center of rotation of the first joint shaft 151a is made coincide with a link central line 158 of the base 153a of the parallel link mechanism 153. The center of rotation of the third joint shaft 151c is made coincide with a link center line 159 of a movable-side base 153b of the parallel link mechanism 153. In synchronization with the movement of the parallel link mechanism 153, the joint-type light-transmission pipe portion 151 can be bent.

The above-mentioned parallel link mechanism 153 and the joint-type light-transmission pipe portion 151 enables the light transmission pipe 151 to be diffracted below the boundary between the upper shroud body 6a and the shroud intermediate body 6b (see FIG. 22). Therefore, the portion is collectively called a shroud intermediate body diffraction mechanism 160.

An insertion mast 161 is connected to the movable-side base 153b, while the upper end is connected to the light transmission pipe 151d. A laser emitting head 162 is connected to the leading end of the insertion mast 161.

Each of the two portions is characterized by a horizontal cross sectional shape having a width of about 100 mm and a depth of about 50 mm. When downward movement from a position above the pool so as to be inserted into an annulus furnace, passing through the gaps among the following elements is permitted; that is, a water supply sparger (not shown), a transition piece 170, a riser pipe 171, a riser brace arm 172, a shroud head bolt bracket (not shown), a riser bracket 173 and a jet pump bracket 174. In FIG. 22, reference numeral 176 represents a riser elbow and 177 represents a baffle plate.

Figure 24A:
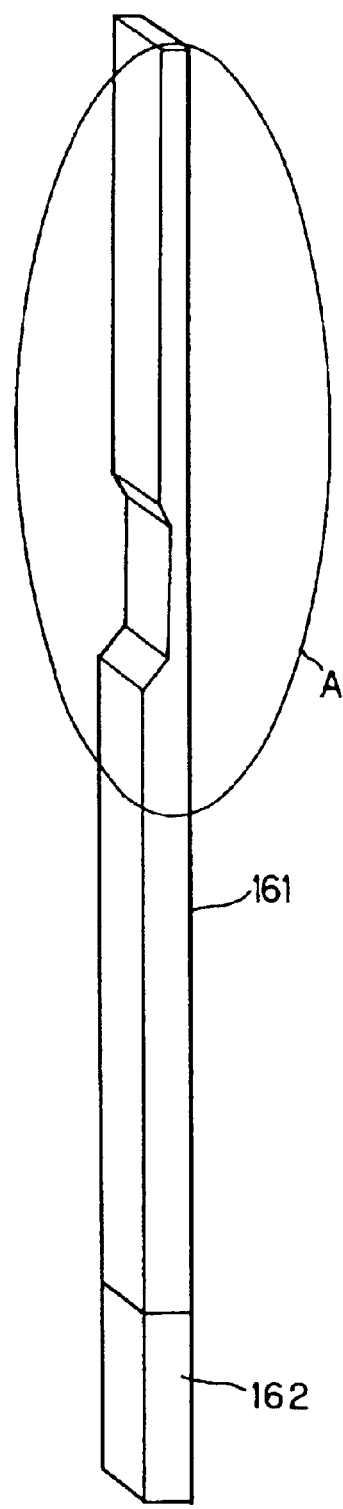
FIG. 24(A) is a perspective view showing an insertion mast according to the present invention and FIG. 24(B) is a vertical cross sectional view showing portion A shown in FIG. 24(A)
Figure 24B:
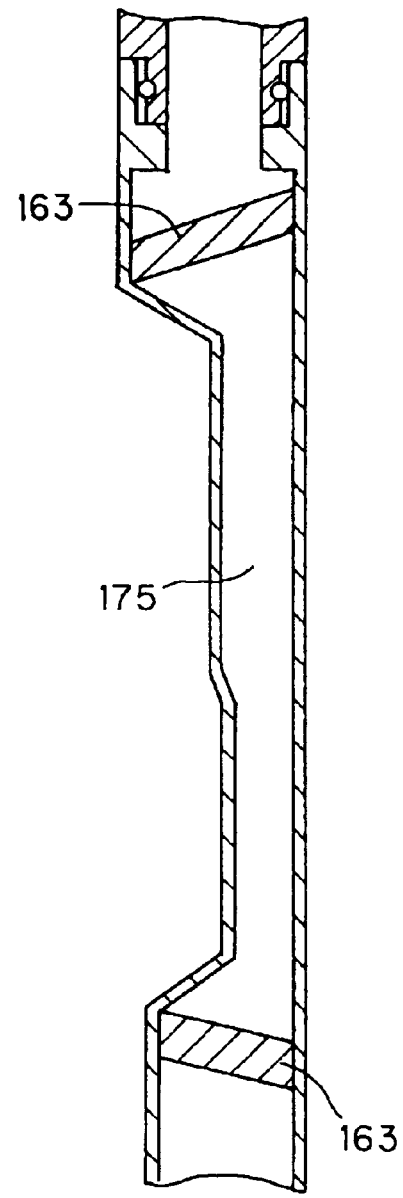

FIG. 24 shows a specific structure of the insertion mast 161. The insertion mast 161 has a shape which is permitted to be passed through a gap between the jet pump 173 and the shroud body 6 in the annulus portion. The thickness of the insertion mast 161 is partially changed so as to correspond to the gap from the riser brace arm 172 and the riser bracket 173.

Therefore, the optical axis of the internal light transmission pipe 175 is shifted towards the inside by the flat glass 163 somewhat inclined with respect to the optical axis. thus, the radius of the light transmission pipe 175 being maximized at each thickness. Furthermore, an electric cable for the laser beam emitting head 162 and the air pressure hose are accommodated in the insertion mast 161 along the light transmission pipe 175.

Figures 25A, 25B:
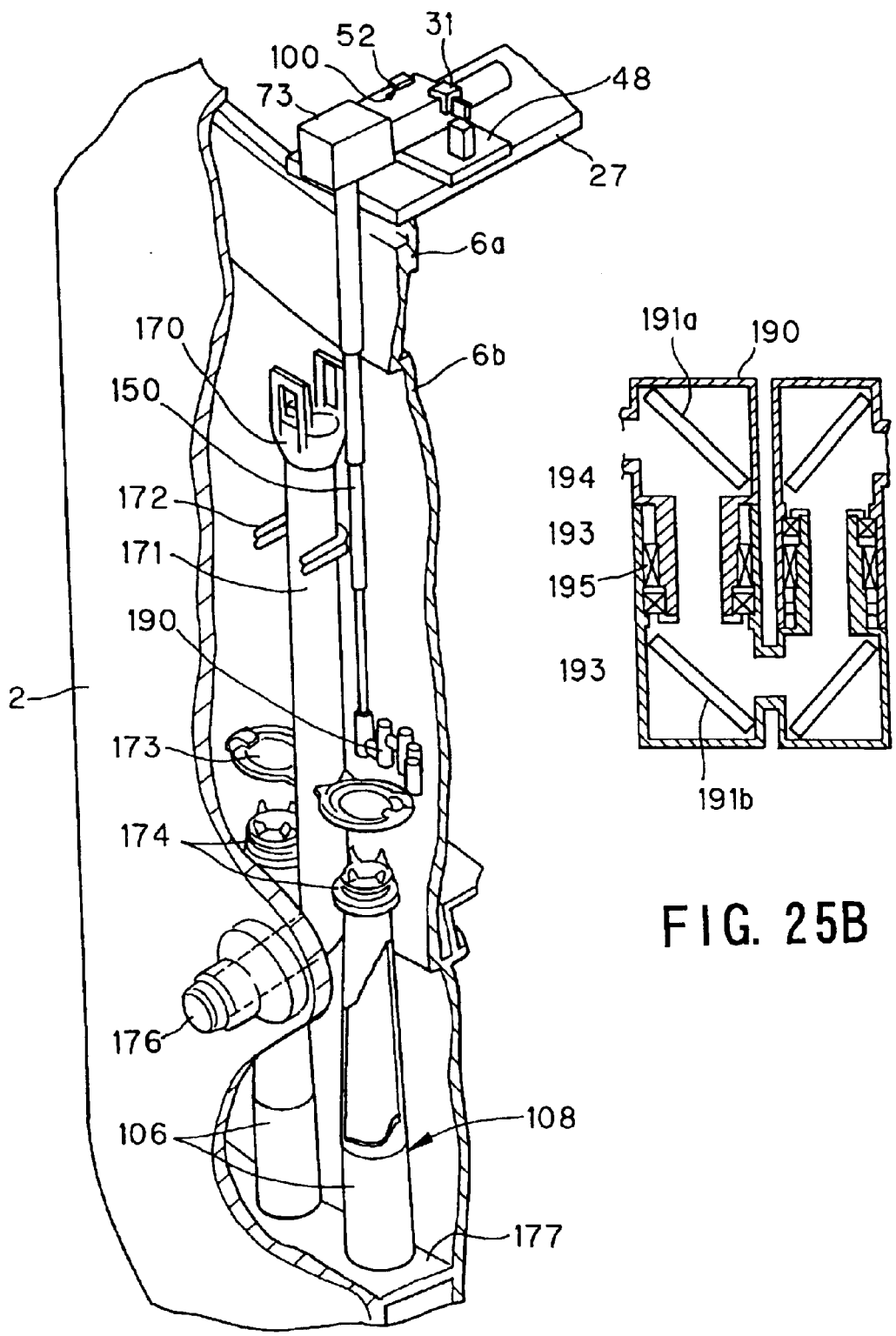
FIG. 25(A) is a perspective view showing an annulus laser machining unit according to an embodiment of the present invention and FIG. 25(B) is an enlarged vertical cross sectional view showing portion A shown in FIG. 25(A)

FIGS. 25(A) and 25(B) show the structure of the annulus laser machining unit. The annulus laser machining unit 73 has the locating pin hole 100 into which the locating pin 52 provided for the telescopic frame 48 of the turning vehicle 27 is inserted.

The clamp mechanism 31 of the turning vehicle 27 secures the disposed annulus laser machining unit 73.

A case at the upper end of the annulus laser machining unit 73 accommodates an electric reflecting mirror (not shown) having an angle which can be adjusted from a remote position. Thus, the laser beam transmitted from the turning vehicle 27 is bent at an angle of about 90° towards the light transmission pipe 150 extending perpendicularly downward. The leading end of the light transmission pipe 150 is formed into a horizontal multi-joint arm 190.

The horizontal multi-joint arm 190 has a hollow inner portion through which the laser beam is able to pass. One joint is composed of two 90°-reflecting mirrors 191a and 191b, a mechanism for twisting a light-transmission pipe 192 between the two reflecting mirrors, that is, a bearing 193, an O-ring 194 and a hollow motor 195. The horizontal multi-joint arm 190 has the joints which are composed of the same elements.

Figure 26:
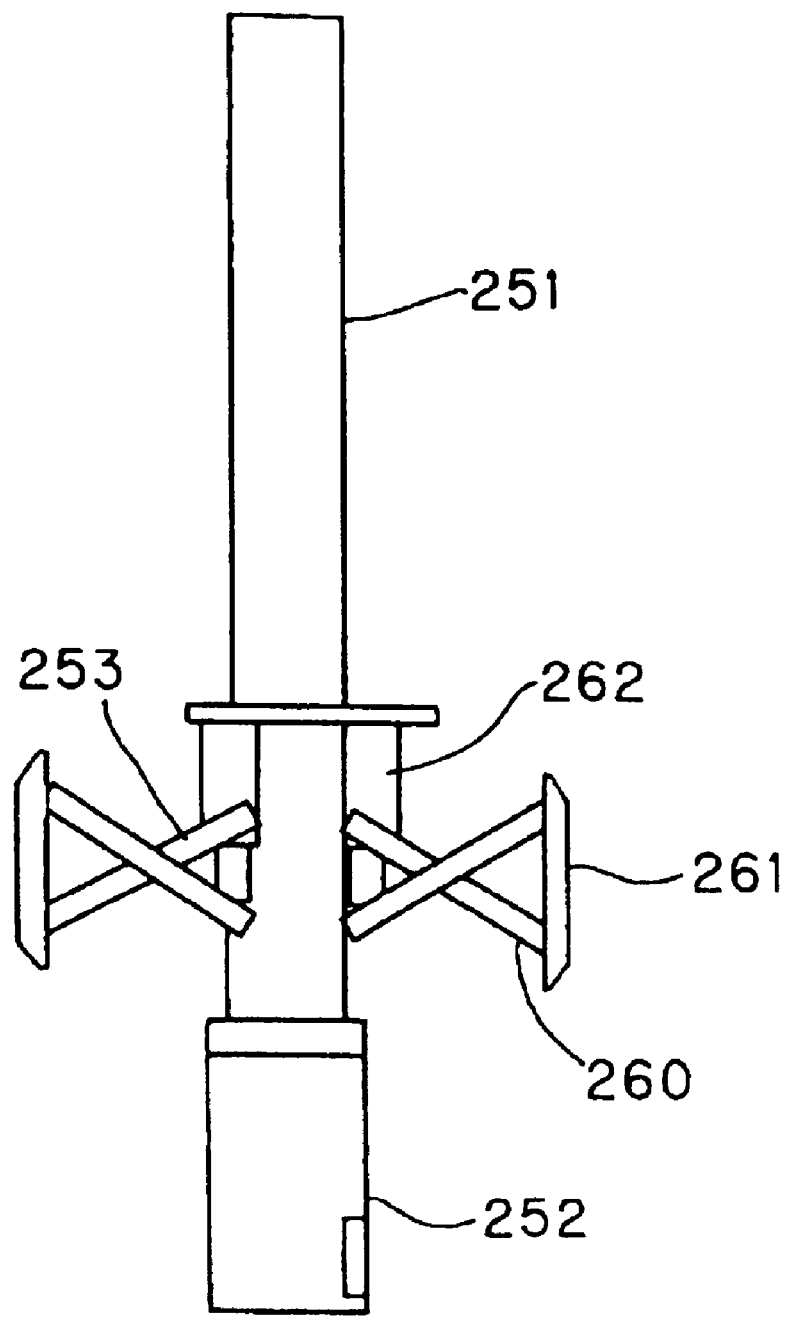
FIG. 26 is an elevational view showing the relationship of the connection between the laser-beam emitting head and the light guide pipe according to an embodiment of the present invention.

FIG. 26 shows a detailed structure of the riser fixing portion. A fixing portion 253 disposed below the light-transmission pipe 251 is composed of a link mechanism 260, a pad 261 and a hydraulic cylinder 262.

Figure 27:
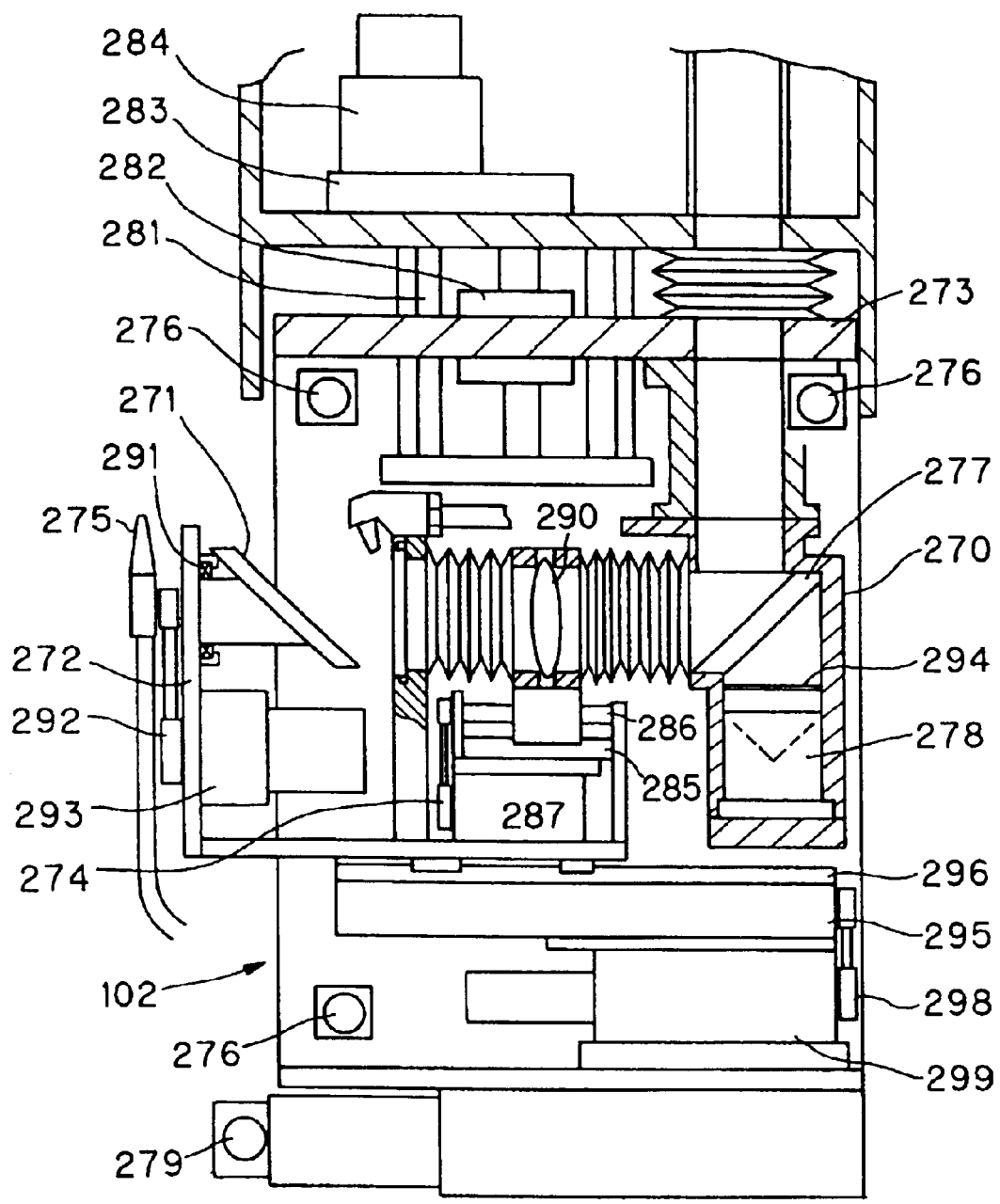
FIG. 27 is a schematic elevational view including a partial cross sectional view showing an embodiment of the present invention.

FIG. 27 is a diagram showing the mechanical structure of the laser emitting head 102.

The head comprises a converging lens unit 270, a scan reflecting mirror 271, a swinging scan mechanism 272, a step direct-acting (translation) mechanism 273, a horizontal scan mechanism 295, a focal-distance adjustment mechanism 274, a dust removing unit 275 for the surface to be machined, three small microphones 276, a half mirror 277, a retro-reflector 278 and a monitoring camera 279.

The step direct-acting mechanism 273 enables the overall optical system of the head to be step-moved vertically and comprises a linear guide 281, a ball screw 282, a gear 283 and an AC servo motor 284. The converging lens unit 270 comprises the focal-distance adjustment mechanism 274, which is composed of a linear guide 285, a ball screw 286 and a supersonic motor 287 and a converging lens 290.

The swinging scan mechanism 272 enables the reflecting mirror 271 to be swung around the optical axis of the incident laser beam and comprises a bearing 291, a gear 292 and a supersonic motor 293. The overall bodies of the focal-point adjustment mechanism 274 and the swinging scan mechanism 272 can be step-moved horizontally by a horizontal scan mechanism 294 which comprises a linear guide 296, a ball screw (not shown), a timing belt 298 and a motor 299.

Figure 28:
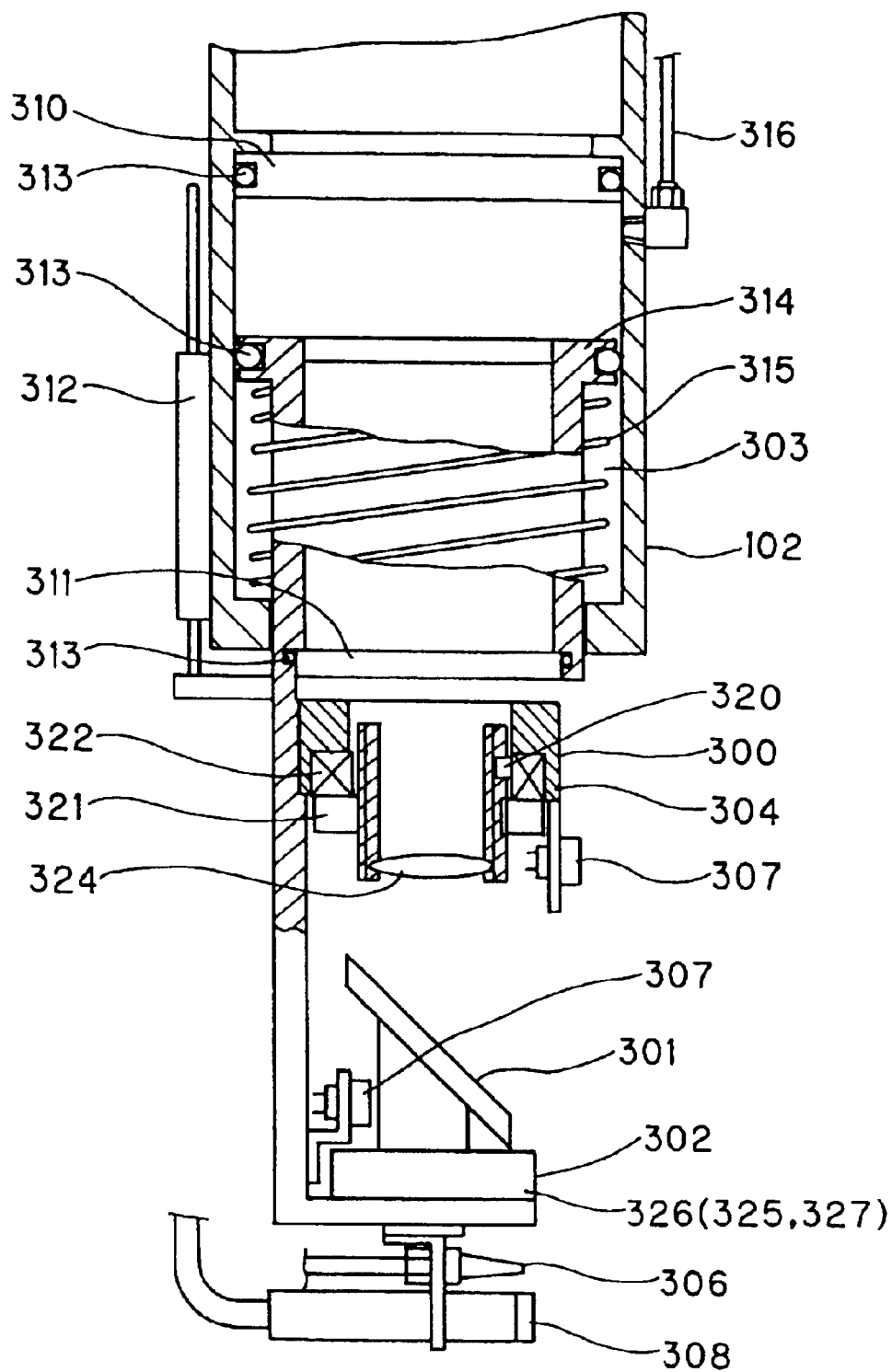
FIG. 28 is an elevational view including a partial cross sectional view showing an embodiment of the present invention.

FIG. 28 is a diagram showing another embodiment of the mechanical structure of the laser emitting head 102.

The head comprises a converging lens unit 300, a reflecting mirror 301 for scanning, a swinging scan mechanism 302, a telescopic light guide pipe 303, a focal-distance adjustment mechanism 304, a dust removing unit 306 for the surface to be machined, three small microphones 307 and a monitoring camera 308.

The telescopic light guide pipe 303 is composed of two flat glass plates 310 and 311, a linear position sensor 312, an O-ring 313, a piston-type light guide pipe 314, a restoring spring 315 and an air pressure tube 316.

The converging lens unit 300 is composed of a focal-distance adjustment mechanism 304, which comprises a parallel key 320, a ball screw 321 and a supersonic motor 322 and a converging lens 324. The swinging scan mechanism 302 comprises a bearing 325 to which the swing rotational shaft of the reflecting mirror 301 is secured perpendicular to the optical axis of the incident laser beam and in the axial direction including the surface of the mirror; a supersonic motor 326; and a resolver 327.

Figure 29:
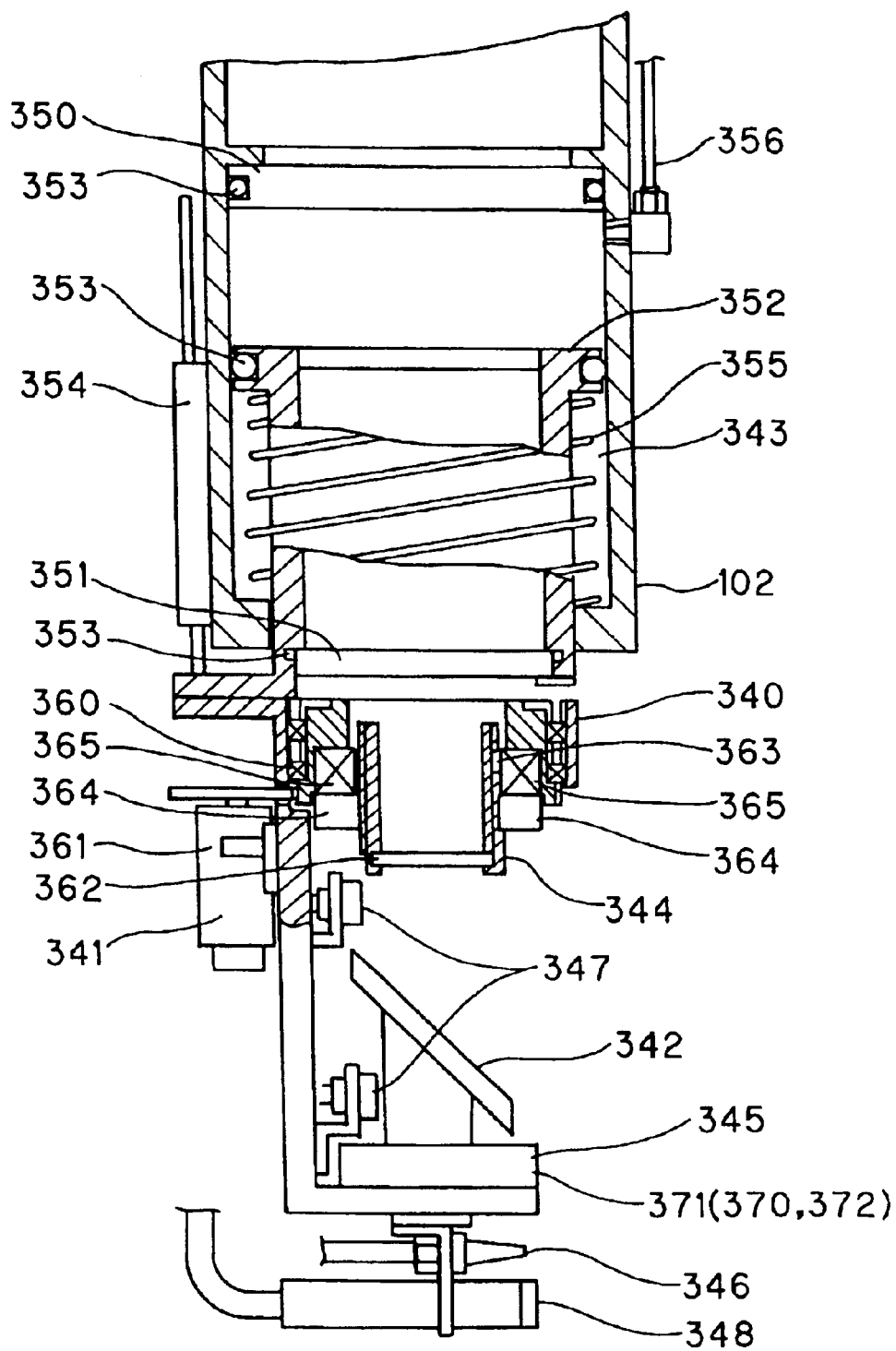
FIG. 29 is an elevational view including a partial cross sectional view showing an embodiment of the present invention.

FIG. 29 is a diagram showing an example of the laser emitting head 102.

The laser-beam emitting head 102 comprises a converging lens unit 340, a converging-lens rotational mechanism 341, a reflecting mirror 342 for scanning, a telescopic light guide pipe mechanism 343, a focal-distance adjustment mechanism 344, a horizontal scan mechanism 345, a dust removing unit 346 for the surface to be machined, three small microphones 347 and a monitoring camera 348.

The structure of the laser-beam emitting head 102 will now be described. The telescopic light-guide-pipe mechanism 343 is composed of two flat glass plates 350 and 351, a hollow piston type light-transmission pipe 352, an O-ring 353, a linear position sensor 354, a returning spring 355 and an air pressure tube 356.

The converging lens unit 340 is composed of a converging lens rotational mechanism 341 and a focal-distance adjustment mechanism 344. The converging-lens rotational mechanism 341 is composed of a bearing 360, a supersonic motor 361 and a converging lens 362. The center of the converging lens 362 is intentionally made to be eccentric with respect to the rotational shaft of the lens.

The focal-distance adjustment mechanism 344 is able to enlarge/reduce the focal distance from a remote position and provided with a parallel key 363, a ball screw 364 and a supersonic motor 365. The horizontal scan mechanism 345 enables the reflecting mirror 342 to be rotated coaxially with the rotational shaft of the converging-lens rotational mechanism 341 and comprises a rotational-shaft bearing 370, an AC servo motor 371 and a resolver 372.

Figure 30:
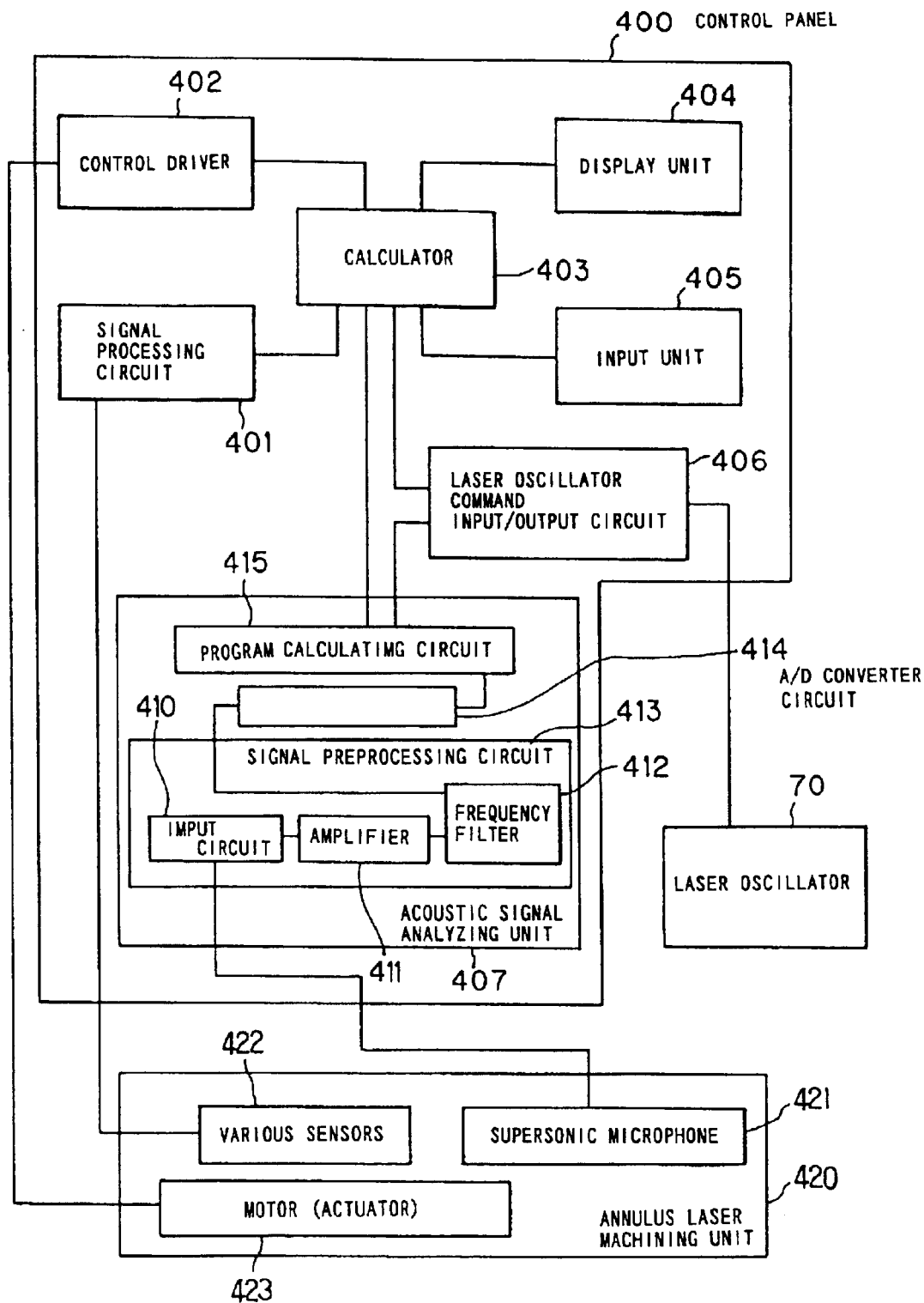
FIG. 30 is a block circuit diagram showing the overall body of a control system according to an embodiment of the present invention.

FIG. 30 is a block diagram showing a control system including a control panel connected to the laser oscillator 70 in order to control the laser beam. A control panel 400 comprises a signal processing circuit 401, a control driver 402, a calculator 403, a display unit 404, an input unit 405, a laser oscillator command input/output circuit 406 and an acoustic-signal analyzing unit 407. The acoustic-signal analyzing unit 407 is composed of a signal pre-processing circuit 413 including: an input circuit 410 for processing acoustic signals supplied from a plurality of supersonic microphones 421 provided for an annulus laser machining unit 420; an amplifier 411 and a frequency filter 412; an A/D conversion circuit 414; and a program calculating circuit 415 for measuring the position of the machining point in the machining operation, calculating a quantity of machining state and determining whether or not an abnormal condition is found. In the control panel 400, the signal processing circuit 401 receives outputs of various sensors 422 provided for the annulus laser machining unit 420. Moreover, the calculator 403 and the control driver 402 perform a predetermined process. Then, the control panel 400 outputs a control signal to a motor (an actuator) of the annulus laser machining unit 420. For example, the positional relationship between a portion which must be machined and the annulus laser machining unit 420 is measured by a distance sensor of the various sensors 422. A result of the measurement is outputted to the signal processing circuit 401. The calculator 403 compares the output with a reference value, and if the measured value does not satisfy the reference value, a control signal is output to the motor (the actuator) through the control driver 402. Thus, the annulus laser machining unit 420 is set to a normal position. The foregoing process is repeated so that a normal positional relationship between the portion to be machined and the annulus laser machining unit 420 is maintained.

The hardware structure of the acoustic-signal analyzing unit is shown in FIG. 30. A specific example of the operation principle will now be described with reference to FIG. 31. In general, a laser peening operation using laser beams to improve stress in a metal welded portion and laser irradiation for the purpose of modifying the surface encounter patterned sound production. In accordance with data about sound, information about the following state of machining can be obtained.

For example, laser peening is a technique with which a high-energy pulse-shape laser beam is momentarily applied to the surface of a metal portion in water. Thus, the energy of light causes the metal surface to be a plasma form, causing a pressure wave to be generated. Thus, the residual stress in the surface of the metal portion is converted from tensile stress to compressive stress. When the plasma is generated, a measurement time of sound generated from the light converged point is imaged as shown in FIG. 31.

When the similarity of the sound generation patterns is analyzed, time at which the same sound has been picked up can be detected. A time for which light propagates can be ignored as compared with a time for which sound propagates. Therefore, when laser beams are applied in predetermined patterns, a time at which the laser beam has raised to a peak to a time at which sound has been picked up by the microphone is considered to be a propagation time taken for the sound to propagate from the generation point to each microphone.

Figure 31:
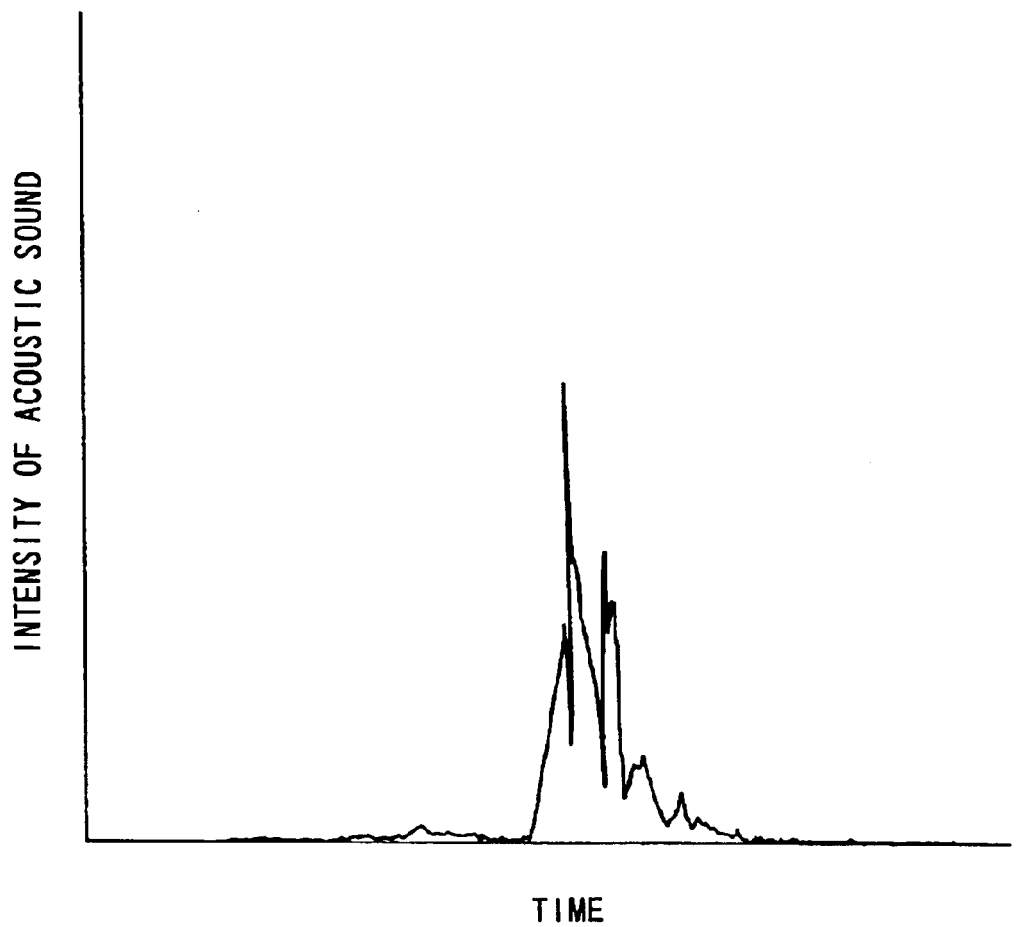
FIG. 31 is a graph showing sound generated from a converged point shown in FIG. 30 as time passes.
Figure 32A:
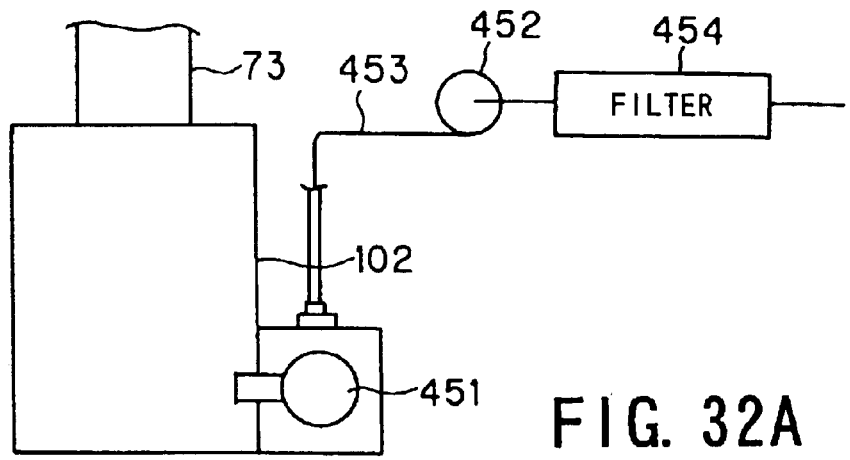
FIG. 32(A) is a side view including blocks showing a dust removing unit from a surface which must be machined according to an embodiment of the present invention.
Figure 32B:
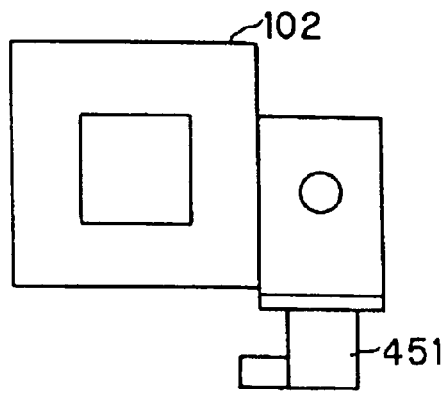
FIG. 32(B) is a top view of FIG. 32(A)
Figures 32C, 32D:
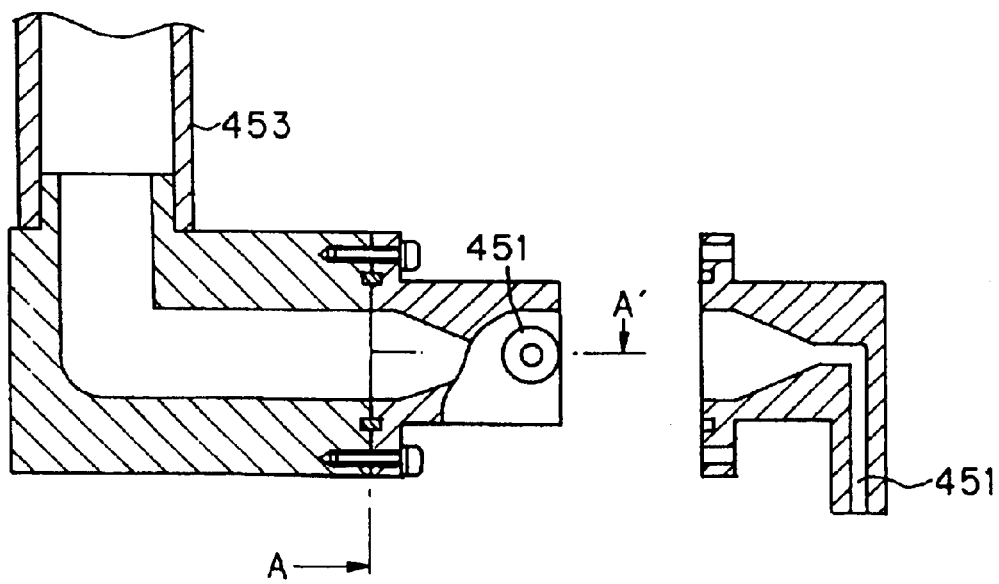
FIG. 32(C) is an enlarged vertical cross sectional view showing a portion including the water jet nozzle shown in FIG. 33(A)
FIG. 32(D) is a view A–A' shown in FIG. 32(C)
Figure 33A:
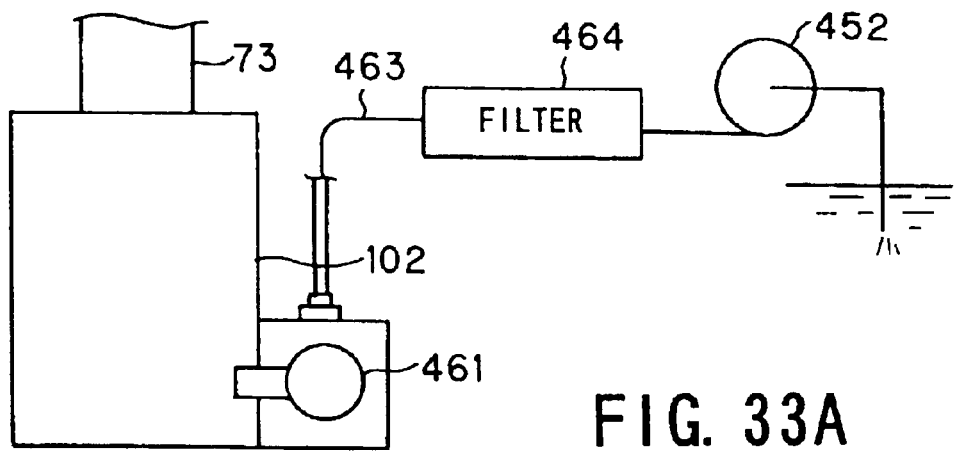
FIG. 33(B) is a top view of FIG. 33(A)
FIG. 33(D) is a view B–B' shown in FIG. 33(C)
Figure 33B:
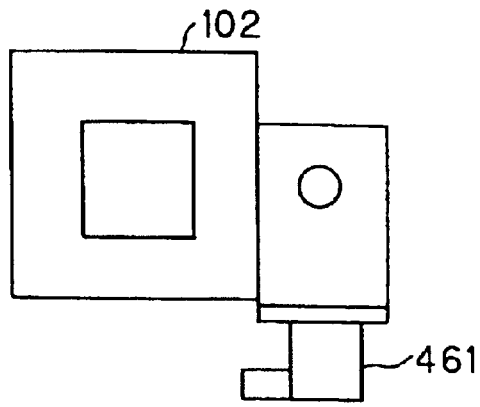
Figures 33C, 33D:
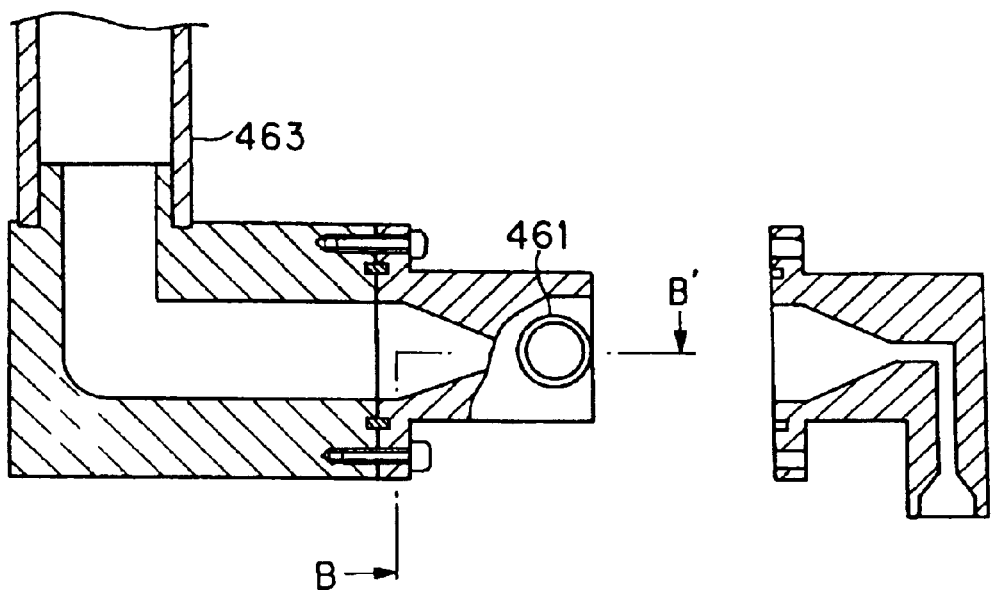

In an example case of a sound pattern as shown in FIG. 31, the sampled acoustic signal includes a sharp peak sound detected from the light converged point. A time of generation of the peak sound is measured at each microphone, and then the time is converted into an elapsed time from emission of the laser beam.

Since the time for which light propagates can be ignored as compared with the time for which sound propagates, the elapsed time can be considered to be the propagation time taken for sound to propagate from the light converged point to each microphone. The time is divided by the sound propagation time so as to calculate the distance from each microphone to the light converged point. Furthermore, a three dimensional position at which sound h as been generated can be calculated in accordance with data about distances of three or more points by using the principle of the three-point-measurement.

The measurement of the quantity of state is performed such that, for example, the peak level of the impact noise and the frequency of the peak sound are analyzed. Thus, t he energy level of the laser beam and a state in which the laser beam is mad e incident on the irradiation point are quantitatively analyzed and measured. In a case of laser peening, the peak level is raised if the laser energy is large. In accordance with the foregoing correlation, the energy of the incident light for use in the machining operation can be detected. Further, the measurement and analysis can be performed from only one microphone.

The diagnosis of an abnormal condition in the machining operation is performed by using a phenomenon that noise is produced in front of the peak sound if the laser beam is converged in front of the point (the surface of the metal portion) which must be machined and, therefore, the energy is not satisfactorily absorbed or energy is attenuated in front of the light conversion point. The measurement and analysis can be performed from only one microphone.

In accordance with data about the analysis of the sound generated during the machining operation, interlock control is performed which includes the adjustment of the position of the focal point of the laser beam, feedback control of the laser beam to the control of the oscillator and countermeasure against an abnormal condition.

FIGS. 32(A) to 32(D) are diagrams showing an embodiment of a dust removing unit 450 for the surface to be machined. That is, the unit is composed of a water jet nozzle 451 joined to a position adjacent to the laser emitting head 102, a connection hose 453 for establishing the connection from the nozzle 451 to a pressure water-supply unit 452 and a filter 454.

FIGS. 33(A) to 33(D) are diagrams showing another dust removing unit 460 for the surface to be machined. That is, the unit is composed of a suction nozzle 461 joined to a position adjacent to the laser emitting head 102, a connection hose 463 for establishing the connection from the nozzle 461 to a suction pump unit 462, the suction pump unit 462 and a filter 464.

Figure 34A:
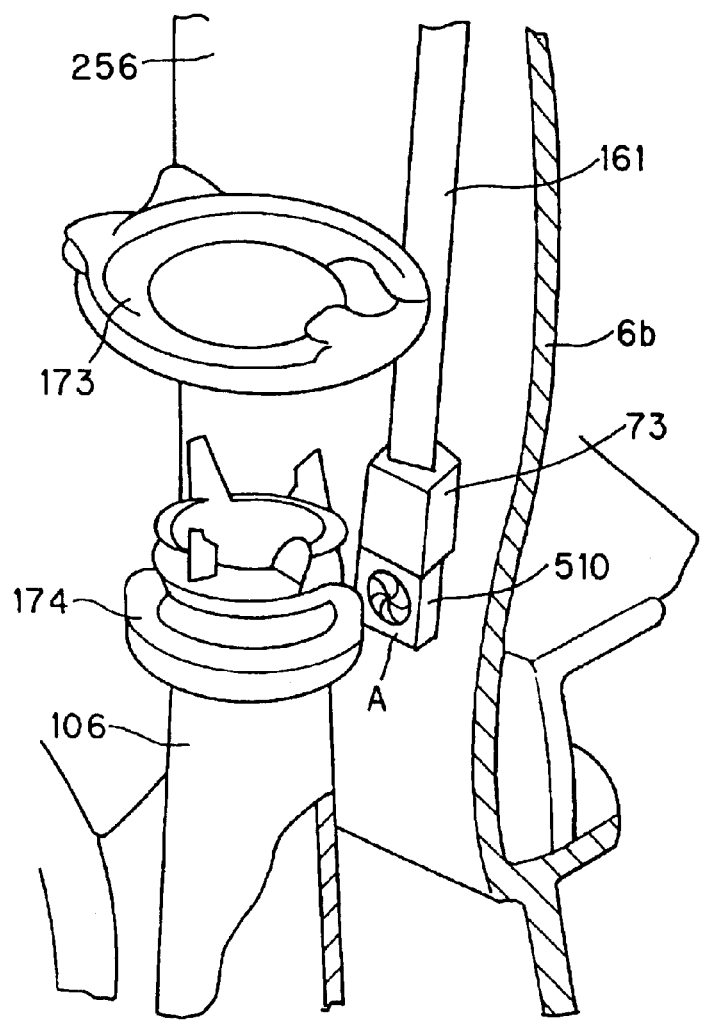
FIG. 34(A) is a perspective view showing an essential portion of an embodiment of the present invention and FIG. 34(B) is an enlarged view showing portion A shown in FIG. 34(A)
Figure 34B:
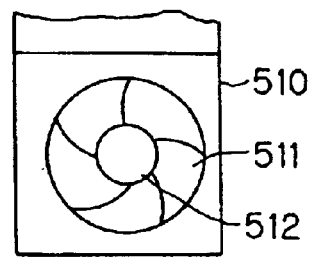

FIGS. 34(A) and 34(B) are diagrams showing the specific structure of an underwater propeller 510. The underwater propeller 510 comprising a screw 511 and a motor 512 arranged to be accommodated in the screw is joined to a position adjacent to the leading end of the annulus laser machining unit 73.

Figure 35:
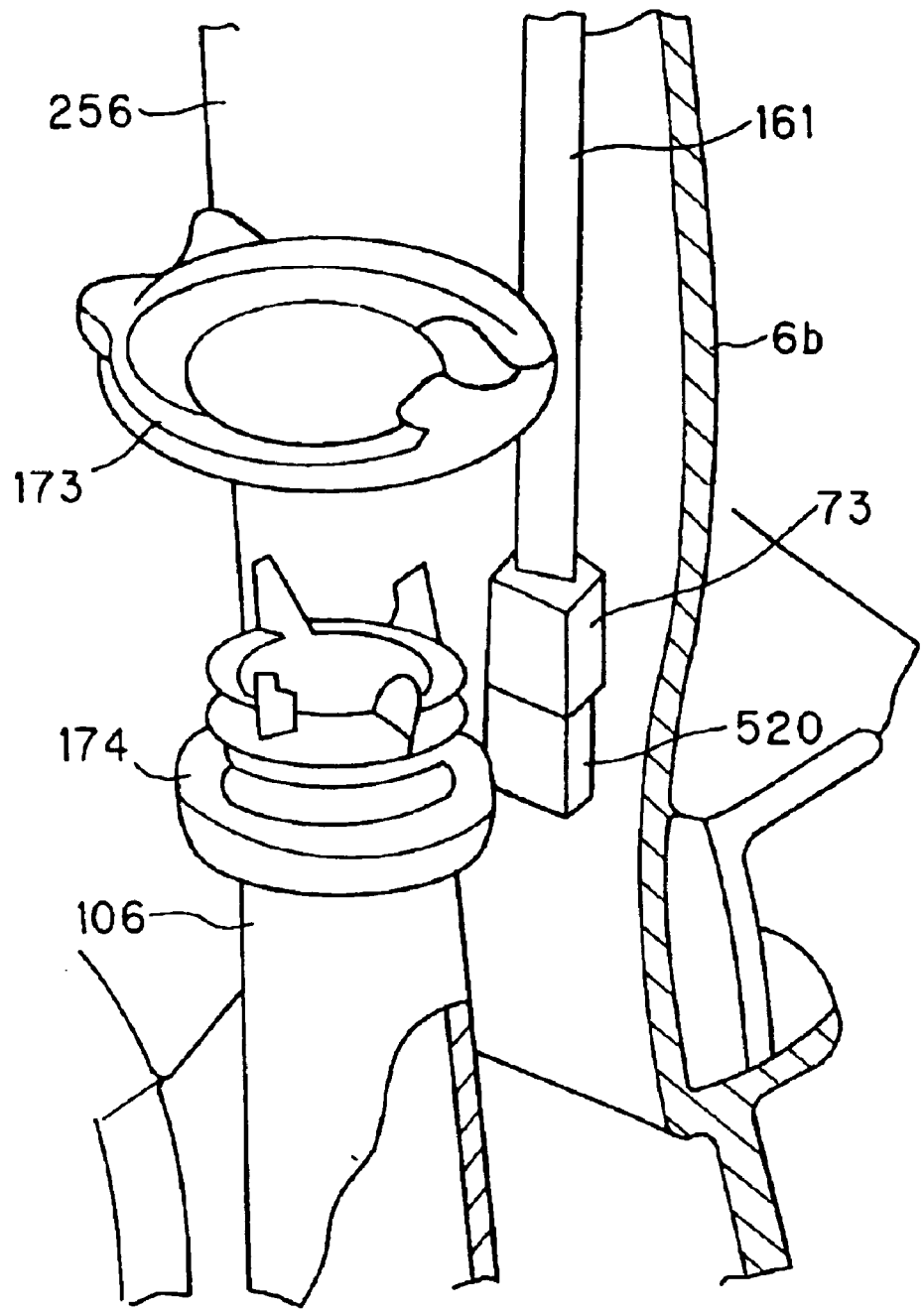
FIG. 35 is a perspective view showing an essential portion of an embodiment of the present invention.

FIG. 35 is a diagram showing an example in which a gyromotor 520 is mounted on the laser emitting head 102.

Figure 36A:
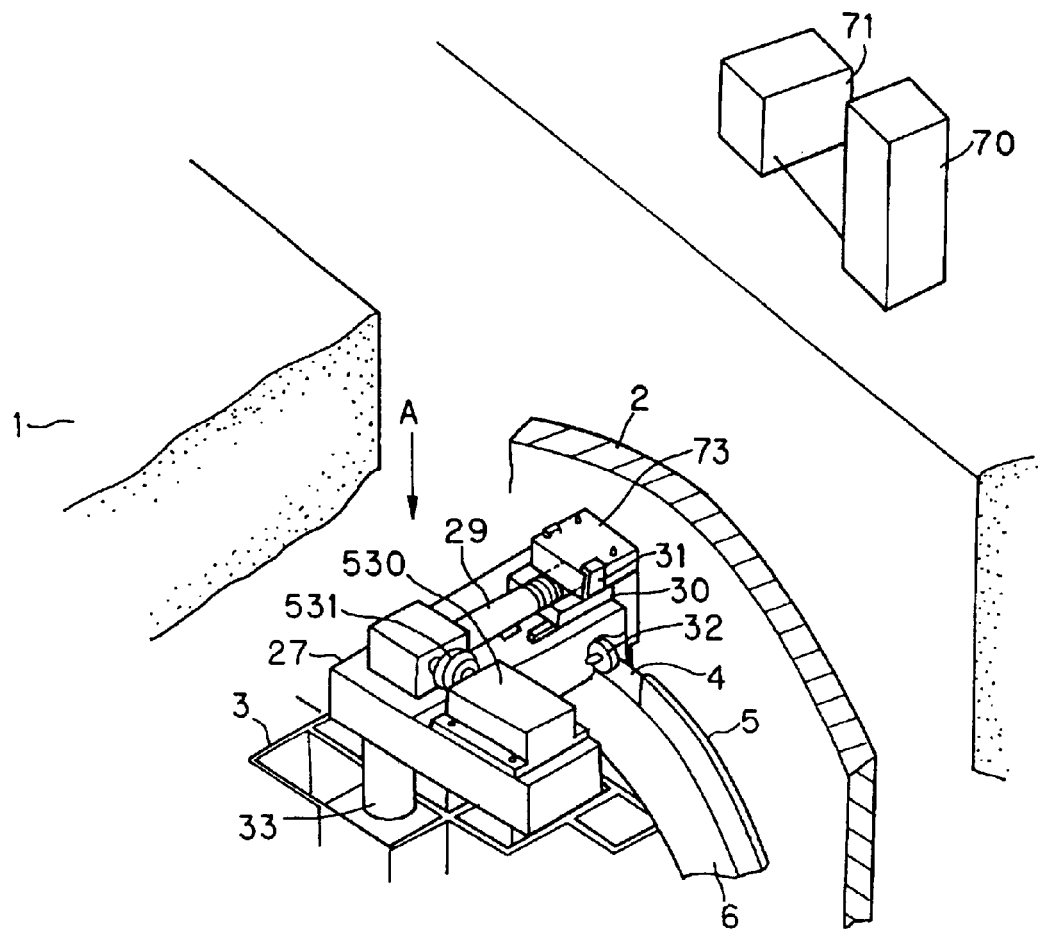
FIG. 36(A) is a perspective view showing an essential portion of an embodiment of the present invention and FIG. 36(B) is a top view including a partial cross sectional view showing portion A shown in FIG. 36(A) from a direction of an arrow.
Figure 36B:
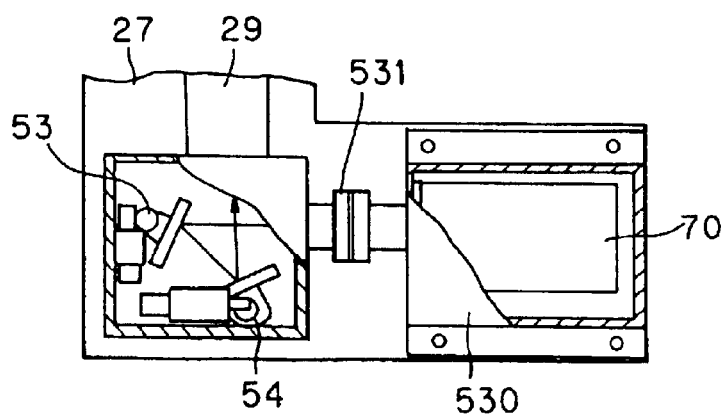

FIGS. 36(A) and 36(B) are diagrams showing specific structures of the laser oscillator 70 and the turning vehicle 27. As shown in FIG. 36(B), the laser oscillator 70 is accommodated in a pressure-proof container 530 so as to be mounted on the basis of the turning vehicle 27. The electric reflecting mirrors 53 and 54 for adjusting the optical axis by the automatic alignment change the layout to horizontally bend the optical axis.

Therefore, the laser oscillator 70 is disposed such that the optical axis of the laser oscillator 70 and the optical axis of the horizontal light-transmission pipe 29 on the turning vehicle 27 intersect at an angle of 90°. An emission opening 540 of the laser oscillator 70 and a laser-beam receiving opening 542 of a case 533 accommodating the mirrors 53 and 54 connected to the horizontal light-transmission pipe 29 are joined to each other by a flange 531. The joint portion is sealed by a rubber packing 532.

Figure 37A:
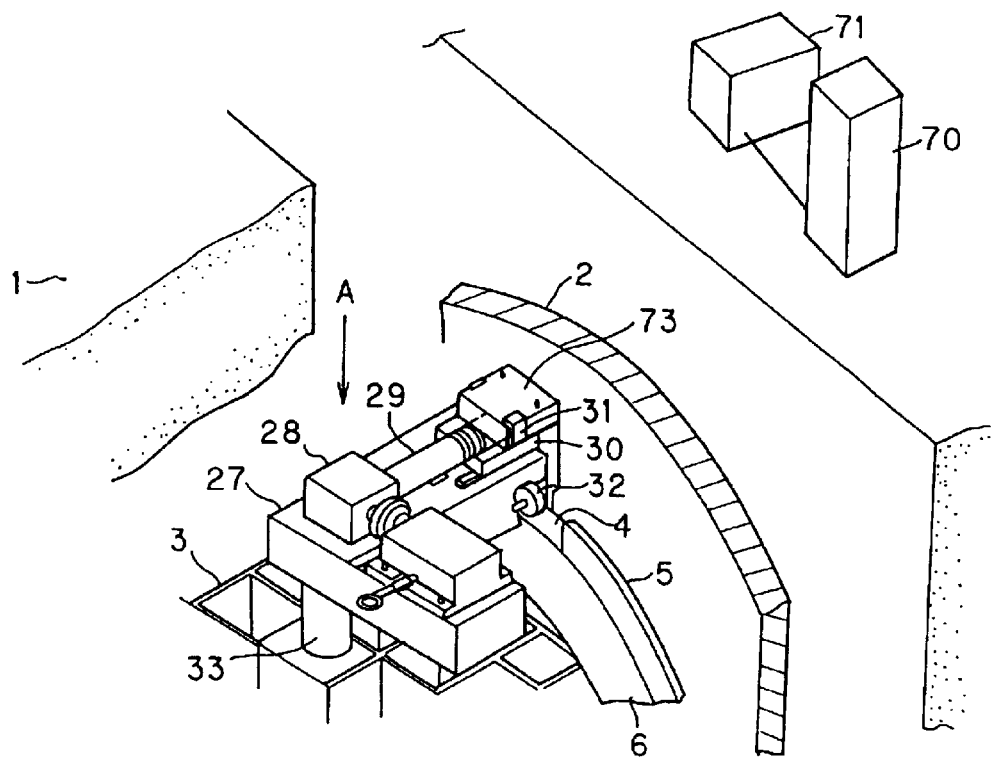
FIG. 37(A) is a perspective view showing an essential portion of an embodiment of the present invention and FIG. 37(B) is a top view including a partial cross sectional view showing portion A shown in FIG. 37(A) from a direction of an arrow.
Figure 37B:
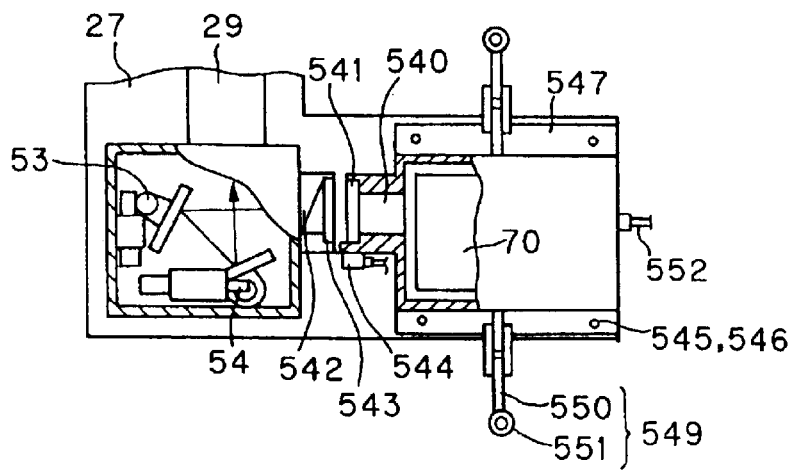

FIGS. 37(A) and 37(B) are diagrams showing the specific structure of a remote attaching/detaching system for enabling the laser oscillator 70 to be separated from the turning vehicle 27 from a remote position.

The emitting opening 540 of the laser oscillator 70 is partitioned by a flat glass plate 541, while the laser-beam receiving opening of the horizontal light-transmission pipe 29 of the turning vehicle 27 is partitioned by a flat glass plate 543. Water jet nozzles 544a and 544b are disposed at the end surfaces of the partitioning flat glass plates 541 and 543.

Four locating pin holes 545 are formed in the base 547 of the laser oscillator 70, while the same number of locating pins 546 are provided for the turning vehicle 27 so as to be engaged to one another. A rubber vibration insulator 548 is applied to a position below the base 547.

A toggle clamp 550 serving as a locking mechanism 549 for the laser oscillator 70 is provided for the turning vehicle 27 so as to secure the base 547 of the laser oscillator 70. The toggle clamp 550 is provided with a handle 551 which is hooked by an operation pole or the like so as to be operated from a remote position above the reactor pool.

Figure 38:
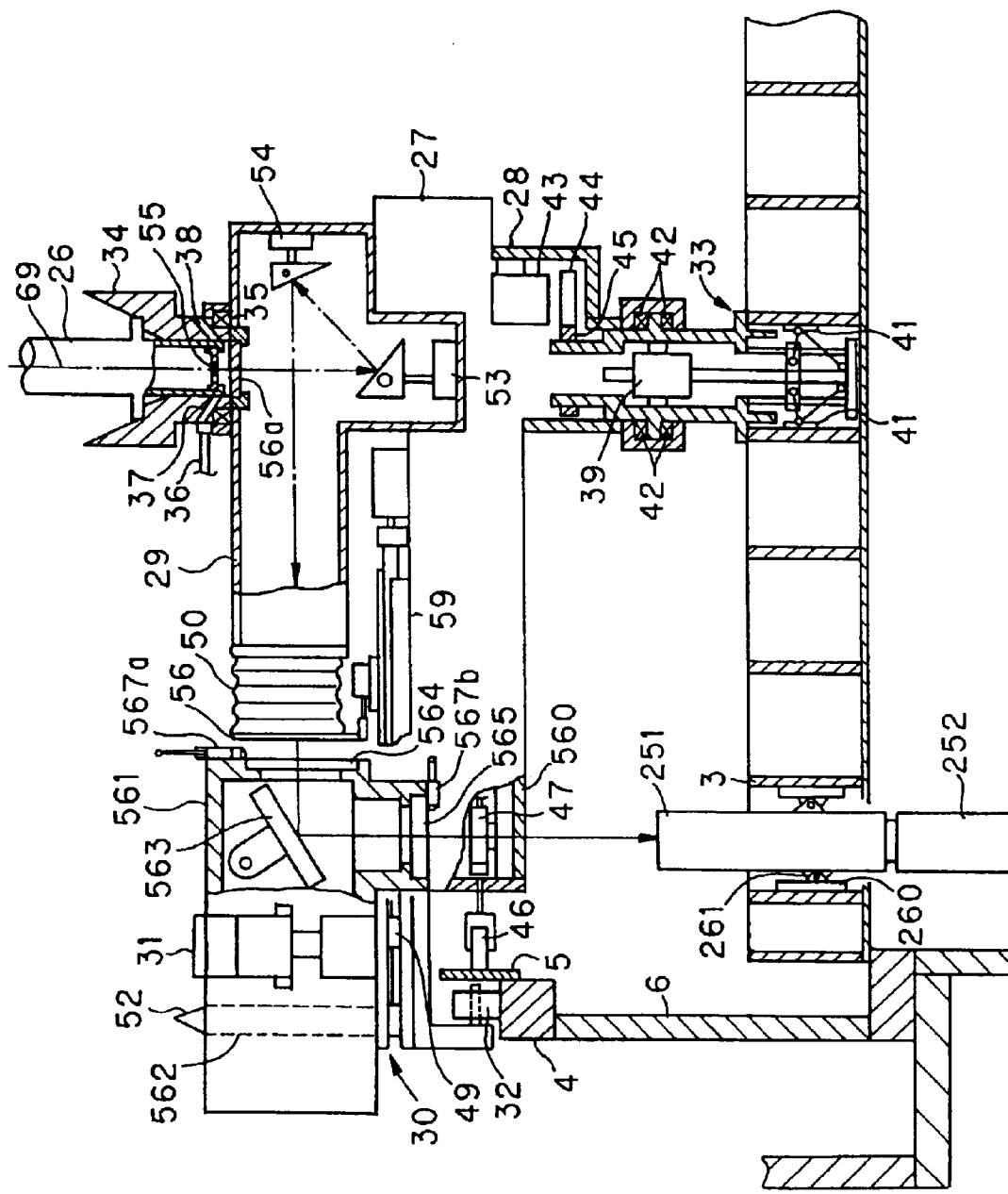
FIG. 38 is a vertical cross sectional view including a partial side view showing an embodiment of the present invention.
Figure 39:
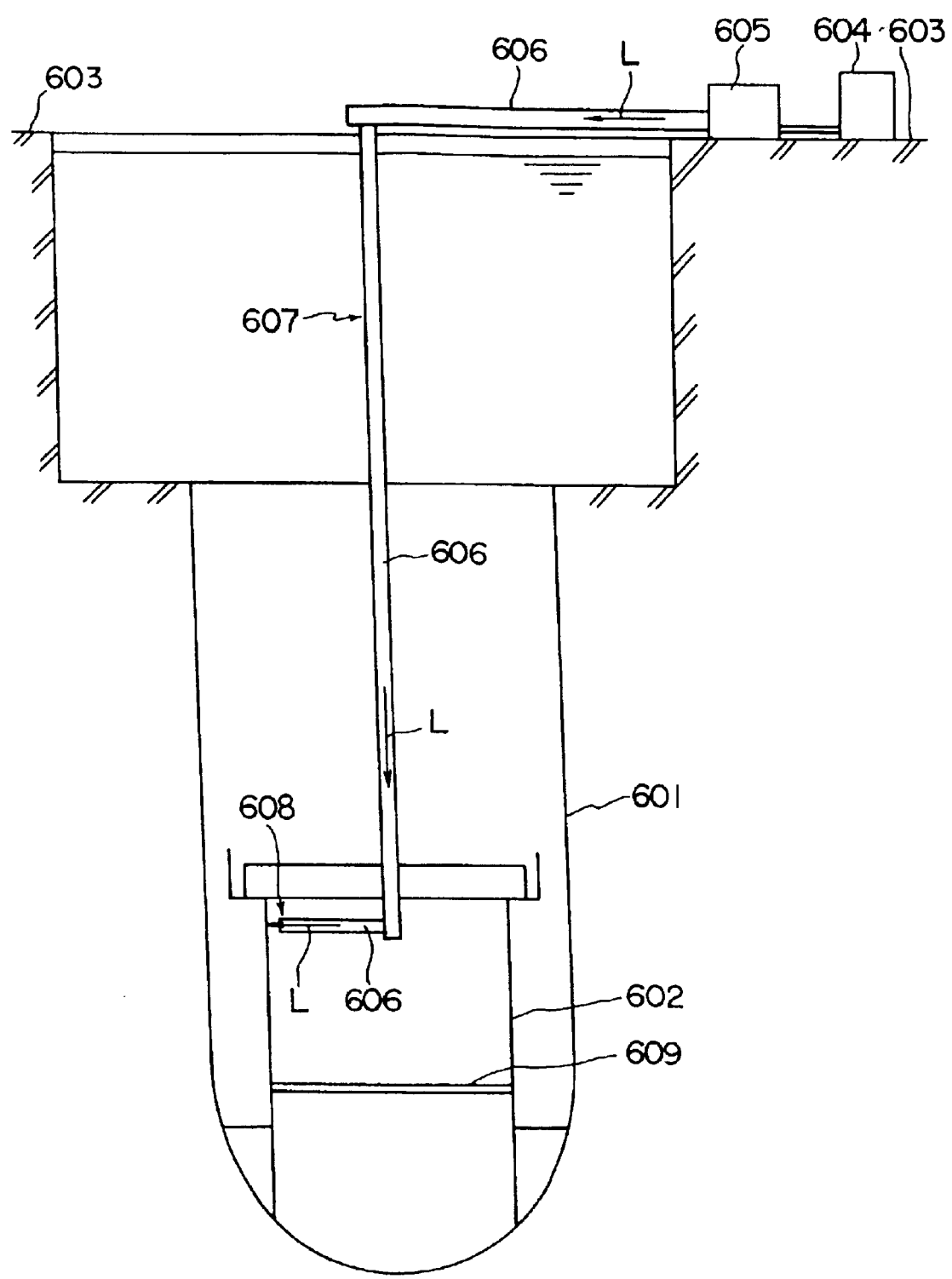
FIG. 39 is a schematic view showing a conventional preventive-maintenance/repair apparatus for an incore structure.

FIG. 38 is a diagram showing a method of applying the laser-beam transmission system according to the present invention to the preventive-maintenance/repair apparatus using the laser beam in the shroud. A base 560 of the turning vehicle 27 has a horseshoe-like shape, and thus, the laser beam transmitted from the horizontal light-transmission pipe 29 can transmitted vertically downward into the core shroud body 6 through the hollow portion of the horseshoe structure. As an alternative to the annulus laser machining unit 73, a relay box 561 for performing a machining operation in the shroud is mounted on the control panel 72 and secured by the clamping mechanism 31 disposed at a predetermined position.

The relay box 561 is disposed by using the locating pin 52 employed to dispose the annulus laser machining unit. A locating pin hole 562 is provided for the relay box 561. The relay box 561 is composed of an electric reflecting mirror 563, the angle of which can electrically be adjusted from a remote position; flat glass plates 564 and 565; a pressure tube 566 for purging drying gas; and water jet nozzles 567a and 567b disposed on the outside of the flat glass plates.

The operation of this embodiment will be described hereunder.

A procedure and a method of disposing the system according to this embodiment into the reactor will be first described.

Initially, the turning vehicle 27 is moved downward into the reactor pressure vessel, and then the turning-vehicle clamping mechanism 33 is inserted into the central lattice of the upper lattice plate 3. At the same time, the wheels 32 of the slide mechanism 30 are mounted on the upper outer ring 4 of the shroud body 6. Then, the turning-vehicle clamping mechanism 33 is operated so as to be locked to the lattice of the upper lattice plate 3. Simultaneously, the guide roller 46 is pressed against the inner surface of the skirt 5 on the upper outer ring 4 so that the turning vehicle 27 is placed on the shroud body 6.

Then, the support column 20 is disposed on the reactor pool such that the support column 20 is positioned across the core. The disposition is performed by a method in which the support column 20 is suspended by a crane provided for the ceiling, as shown in FIG. 11. Thus, the support column 20 is directly moved and positioned on the floor 1. Another method may be employed in which the rails 22 disposed on the operation floor 1 is used to temporarily assemble the support column 20, and then the support column 20 is moved side to the position above the core.

The multi-step joint type light-transmission pipes 26 are sequentially assembled from the support column 20 so that an elongated mast having a length of about 16 m is formed. The assembly is performed by a flange joint structure using an O-ring for sealing the mast. Furthermore, the 65 and the nut 66 are used to join the mast. The end surface of the lower mast is partitioned by the flat glass 55, while the reflecting mirror 60 is joined to the end of the uppermost mast.

After the assembly has been completed, the masts are suspended by the mast provided for the ceiling so that movement of the turning vehicle 27 to the center of rotation of the turning mechanism 28 and insertion and positioning of the light transmission-pipe guide 34 into the joining portion are performed. At this time, the upper end of the light-transmission pipe mast 26 is seated on the movable reflecting mirror box 24 of the support column 20.

That is, the load of the light transmission pipe 25 is supported by the movable reflecting mirror box 24. Movement of the movable reflecting mirror box 24 is permitted by rollers or linear guides so that the vertical deviation of the light-transmission mast 26 is absorbed.

An error made in joining the support column 20 to the core can be modified because the laser beam can be modified by automatically and precisely adjusting the angle of the mirror by the angle-modifying motor for the reflecting mirror in the light guide pipe for each element. Therefore, only a rough joining accuracy is required to transmit the laser beam. Therefore, the workability can be improved.

After the installation has been completed, the function of the turning mechanism 27 of the turning vehicle enables the annulus laser machining unit 73 to be rotated for 360° around the shroud body. The position of the annulus laser machining unit 73 can precisely be adjusted in the radial direction of the core by the slide mechanism 30 of the turning vehicle 27. The combination of the turning mechanism 30 and the slide mechanism 30 enables the annulus laser machining unit 73 to be located at an arbitrary position around the shroud body 6.

A portion of the reflecting mirrors of each of the light guide pipes are electric mirrors, the optical paths of which can easily be modified and controlled. Thus, transmission for a long distance is permitted. The remote connection portion of each of the light-transmission pipe is partitioned by the flat glass to facilitate separation and assembly. In order to realize the operation underwater, each flat glass is provided with the water jet nozzle to prevent air bubbles from being formed. The mechanism for supplying dry air into the light-transmission pipe is provided to prevent the dew condensation.

The modification of the optical path is automatically performed by the position deviation is recognized in accordance with reference light reflected by the retro-reflector disposed at an intermediate position of the light-transmission pipe in the annulus laser machining unit 73 and the laser emitting head 102. To realize spectrum of reference light from each retro-reflector, each retro-reflector includes a polarizing filter so that reference light is distinguished.

The acoustic analysis of sound picked up by the supersonic microphone is performed so that the state during the machining operation is monitored. In particular, information which is important to administrate the machining operation, including control of the focusing operation, determination of the intensity of the converged energy and measurement of the position of the converged light can be measured in a real time manner. In order to remove the air bubbles and dust produced during the operation from the optical path for the laser beam at the machining point, the dust removing unit for removing the dust from the surface to be machined using the water jet nozzle is disposed on the optical path for the laser beam.

An underwater fan or a gyromotor may be provided as means for securing the position of the leading end of the head during the machining operation.

As shown in FIG. 36, the laser oscillator 70 is placed in the pressure-proof container 530 and then mounted on the turning vehicle, and thus, a long light-transmission pipe from the position above the reactor pool to the turning vehicle is not required.

Since the structure as shown in FIG. 37 is employed, the locking mechanism for securing the pressure-proof container 530 including the laser oscillator 70 to the turning vehicle can be removed or locked by using the operation pole from a remote position. Thus, only the laser oscillator can be removed from the reactor so as to be adjusted or modified during the machining operation. Further, the laser oscillator 70 can be disposed after the turning vehicle or the like has been moved into the reactor.

When the structure as shown in FIG. 38 is employed, the laser beam can be transmitted downward into the shroud. Therefore, the laser beam can efficiently be transmitted to each of the operation units for machining the inside portion of the shroud body 6.

As described above, the laser-beam emitting head according to the present invention incorporates the light guide member provided for the emitting head body, light converging lens for converging the laser beam transmitted through the light guide member and the reflecting mirror for irradiating a portion which must be machined with the converged laser beam such that the foregoing elements can be inserted/removed to and from a narrow gap. Therefore, the converging lens and the reflecting mirror can freely be inserted/discharge to and from a narrow portion in the incore structure, for example, a cylindrical narrow portion between the shroud and the core support plate. Therefore, the preventive-maintenance/repair operation can efficiently and smoothly be performed by using the laser beam even in a narrow portion in which the machining operation cannot easily be performed.

The laser-beam emitting head is provided with a flat and elongated elevation support mechanism which can be elevated by a frame elevating unit. Therefore, the laser-beam emitting head can be moved up and down along the optical axis of the laser beam such that the relative distance between the converging lens and the reflecting mirror joined to the elevation support mechanism. As a result, the preventive-maintenance/repair operation by applying laser beams can efficiently and smoothly be performed.

The laser-beam emitting head is provided with the mirror rotating means for rotating the reflecting mirror and the distance-adjustment means for moving and adjusting the relative distance between the reflecting mirror and the converging lens. Therefore, the distance between the converging lens and the reflecting mirror can be adjusted to easily adjust such that the portion which must be machined is in focus of the laser beams. Since the reflecting mirror is rotated by the mirror rotating means, the laser irradiation point in the portion to be machined can be easily be moved. Thus, the preventive-maintenance/repair operation by applying laser beams can efficiently and smoothly be performed.

The laser-beam emitting head has the cylindrical light guide member therein. The light guide member is joined to the body of the laser-beam emitting head such that the laser beams are transmitted in the air so as to be guided to the converging lens. Therefore, the light guide member in the head can be joined independently from the converging lens and the reflecting mirror. Therefore, the joining structure can be simplified. Furthermore, elements of the light guide member in the head, the converging lens and the reflecting mirror can easily be changed and maintenance of the same can easily be performed. As a result, the reliability of the laser-beam emitting head can be improved.

Since the light guide member of the laser-beam emitting head is made of glass, the received laser beam can be reflected by the side surfaces of the glass to guide the laser beam even if the joint position in the laser-beam emitting head is shifted undesirably. Therefore, laser beams can be guided to the converging lens without exception. As a result, the reliability of the laser-beam emitting head can be improved, and thus, the quality of the machining operation can be improved.

The laser-beam emitting head is provided with a gimbal mechanism which is able to rotate around two axes perpendicular to the body of the emitting head. The light guide member in the head is joined to the inner frame of the gimbal mechanism. Therefore, irregularity of the surface on which the incore structure can be absorbed. Thus, the laser-beam emitting head can stably be installed and the light guide member in the head can stably be supported.

The laser-beam emitting head is structured such that the optical path from the light guide member in the head to the converging lens and that from the converging lens to the reflecting mirror are exposed to the environment. Since the spatial transmission passage is formed as described above, the light guide member in the head, the converging lens and the reflecting mirror can be disposed independently from the laser-beam emitting head. Since a fixed light guide pipe is not required to be provided for each optical path, the cross sectional area for guiding the laser beams can be enlarged. Thus, light can reliably be guided and, therefore, the quality of the machining operation can be improved.

The preventive-maintenance/repair apparatus for an incore structure according to the present invention includes: a body locating unit disposed in the reactor; a head moving mechanism which is capable of moving forward and rearward the laser-beam emitting head accommodated in the body locating unit with respect to the portion to be machined; and laser-beam transmission means guiding the laser beams guided into the nuclear reactor so as to guide the laser beam to the laser-beam emitting head. Therefore, the preventive-maintenance/repair apparatus for an incore structure enables the preventive-maintenance/repair operation to be performed from a remote position. Thus, the working efficiency can be improved and the labor saving can be realized.

Since the preventive-maintenance/repair apparatus for an incore structure has the laser-beam emitting head claimed in claims 1 to 5, various operations can be performed by applying laser beams in a narrow portion in the incore structure, for example, a cylindrical narrow gap held between an inner wall of a shroud and a core support plate. Therefore, the working efficiency can be improved and the labor saving can be realized.

The preventive-maintenance/repair apparatus for an incore structure incorporates an elongated cylindrical body case in which the laser-beam emitting head and the laser beam transmission means are accommodated such that introduction/discharge is permitted. Furthermore, the body locating unit is suspended through a lattice of an upper lattice plate so as to be disposed on a control-rod guide pipe in an accommodated state. Therefore, the body locating unit can be suspended through the upper lattice plate so as to stably and smoothly be mounted on the control-rod guide pipe.

The preventive-maintenance/repair apparatus for an incore structure has the body locating unit which includes: a clamping unit having an upper portion secured to an upper lattice plate, a turning unit for determining a direction in which the laser-beam emitting head accommodated in the body case is extended; a head moving mechanism for extending the laser-beam emitting head and the laser beam transmission means to the portion which must be machined; and a base elevating unit for moving up and down a body base for supporting the head moving mechanism in the body case. Therefore, a simple structure is required for the body locating unit to move and locate laser-beam emitting head. Thus, the working efficiency can be improved and the labor saving can be realized.

The light transmission apparatus according to the present invention includes: an electronic optical image pickup means disposed coaxially with an optical axis of the light which is transmitted in the light transmission passage; an image processing unit for calculating image information supplied from the electronic optical image pickup means to measure an amount of deviation of the angle of the mirror from a normal position; and a control unit for receiving the amount of deviation of the angle of the mirror so as to operate the mirror adjustment unit. Therefore, it is not necessary to dispose an electronic optical image pickup means, such as a CCD camera, at an intermediate position of the light transmission passage. Accordingly, the light transmission passage can be adjusted by the electronic optical image pickup means from a remote position. Since the image processing unit is provided, an amount of deviation of the mirror can be measured in accordance with an image photographed by the electronic optical image pickup means. Thus, the mirror can automatically be adjusted.

The light transmission apparatus according to the present invention includes the light transmission means which has a light transmission passage is covered with a light guide tube or a light guide pipe shield tube, such as the light guide pipe tube. Since one or more mirrors are disposed at an intermediate position of the light guide pipe shield tube, a complicated light transmission passage can be formed by combining the mirrors to permit transmission of the laser beam in the air in the shielded tube. Thus, light transmission can efficiently be performed without an influence of the environment, for example, an influence of fluctuation of air.

The light transmission apparatus according to the present invention has the light transmission means which incorporates targets for an image process disposed adjacent to the mirrors, and the targets have light transmission openings. Accordingly, when the mirrors in the light transmission passage are adjusted from a remote position, the light transmission position to be adjusted can clearly be detected. The contents of the image process can be simplified.

The light transmission apparatus according to the present invention has the targets for the image process which are disposed to traverse the light transmission passage. Furthermore, the targets have different shapes. Therefore, the positions of the mirrors on the optical axis to be adjusted at present and the targets can clearly be detected. As a result, determination of the position which must be adjusted can be facilitated, and hence, an amount of the deviation in the mirror can accurately be measured.

The light transmission apparatus according to the present invention has the light transmission means provided with an illuminating unit which is capable of illuminating a portion adjacent to a target for the image process to be adjusted at present. Therefore, the position of the target to be adjusted at present can further clearly be distinguished from the other mirrors and images of the other targets, and thus, the adjustment position can easily be detected to accurately measure an amount of deviation in the mirror.

The light transmission apparatus according to the present invention incorporates a mirror adjustment unit which is an automatic mirror unit which is operated by a stepping motor or a servo motor. Therefore, when the mirror is moved in accordance with information about an image process, the automatic adjustment mirror can accurately be moved in accordance with a required amount of movement. Thus, it is not necessary to repeatedly adjust the same mirror, and the adjustment of the mirror can be performed at a time. Therefore, the optical axis can further quickly be adjusted.

The light transmission apparatus according to the present invention includes the image processing unit which is provided with a pattern matching unit for comparing a previously registered image pattern and an image photographed when the mirror has been adjusted with each other to detect an amount of deviation in the position of the photographed image. Therefore, the pattern matching unit can evaluate the shape and position deviation of the target adjusted so as to be performed in accordance with the pattern previously registered at a previous adjustment. Accordingly, the adjustment of the optical axis can quickly be performed accurately. Thus, the frequency of malfunction of the apparatus caused from incorrect result of recognition performed by the image processing unit can be reduced.

A light transmission apparatus according to the present invention includes a light transmission passage constituted by the light transmission means and including half mirrors or wavelength separation mirrors which are a portion of the mirrors on the light transmission passage; a light-position detecting unit disposed on a sampling optical path to which light separated by the half mirrors or the wavelength separation mirrors is transmitted; and a control unit for calculating information about the deviation in the light position outputted from the light-position detecting unit to operate a mirror adjustment unit in a direction in which an amount of the deviation in the light position is canceled. Therefore, the accuracy can be improved as compared with measurement of the position deviation of the mirror by using a CCD camera. Furthermore, the position measurement can considerably quickly be completed as compared with a process using the CCD camera. Therefore, if the optical axis is shaken owing to the vibration of an element, the mirror is moved in a direction in which the shaking of the optical axis is canceled. Thus, an influence of the vibrations can be eliminated.

The light transmission apparatus according to the present invention includes one or more types of guide laser beam units for making incident guide laser beams on the light transmission passage. Therefore, if the transmitted light has a repeated change factor like the pulse laser, the optical path (the optical axis) can be adjusted with respect to the beams emitted from the guide laser beam units for adjusting the optical axis. Thus, stable transmission of light can be performed.

The light transmission apparatus according to the present invention includes light transmission means for constituting a light transmission passage by combining mirrors and a mirror adjustment unit for controlling an angle of inclination of at least one mirror constituting the light transmission means, the light transmission apparatus comprising: a main laser unit for outputting laser beams for machining, inspecting or preventive-maintenance/repair of a portion to be machined; a guide laser unit for outputting a guide laser beam which is different from the main laser beam; half mirror guide means for guiding the guide laser beam emitted from the guide laser beam unit to the light transmission passage; sampling separation mirror means disposed at an intermediate position of the light transmission passage; parallel reflecting optical means disposed on an optical path separated by the separation mirror means; a light position detecting unit on which light reflected by the parallel reflecting optical is made incident through the half mirror guide means; and a control unit for receiving information about position deviation of light detected by the light position detecting unit to process information so as to operate the mirror adjustment unit. Therefore, an electronic element, such as the light position detecting unit is not required to be disposed in the light transmission passage when an amount of light position deviation is measured. Therefore, complicated wiring is not required and application to an environment in which strong radioactive rays exist can be permitted.

The light transmission apparatus according to the present invention includes light transmission means for constituting a light transmission passage by combining mirrors; and a mirror adjustment unit for controlling an angle of inclination of at least one mirror constituting the light transmission passage, the light transmission apparatus comprising: a main laser unit for outputting laser beams for machining, inspecting or preventive-maintenance/repair of a portion which must be machined; a guide laser unit for outputting a non-polarized or circularly polarized guide laser beam which is different from the main laser beam; half mirror guide means for guiding the guide laser beam outputted from the guide laser beam unit to the light transmission passage; sampling separation mirror means disposed in two portions different in a direction of an optical axis on the light transmission passage; parallel reflecting optical means provided for optical paths separated by the sampling separation mirror means; polarizing optical means provided for either of the separated optical paths of the two parallel reflecting optical means; separation polarizing optical means to which light reflected by each of the parallel reflecting optical means through the half mirror guide means; first and second light position detecting units to which each reflected light separated by the separation parallel optical means is supplied; and a control unit for receiving information about the deviation in the light position detected by the two light position detecting units to process information so as to operate the mirror adjustment unit. Therefore, the polarizing characteristic of the guide laser beam can be used. Thus, only one guide laser beam unit is able to control two portions in which the position deviation of the beam is measured and controlled.

Furthermore, the light transmission apparatus includes the light transmission means for constituting a light transmission passage by combining mirrors and a mirror adjustment unit for controlling an angle of inclination of at least one mirror constituting the light transmission passage, the light transmission apparatus comprising: a main laser unit for outputting laser beams for machining, inspecting or preventive-maintenance/repair of a portion which must be machined; a plurality of guide laser units for outputting guide laser beams having the wavelengths which are different from that of the main laser beam and oscillation wavelengths which are different from one another; a plurality wavelength separation mirror means disposed on the light transmission passage to correspond to the guide laser units: parallel reflecting optical means disposed on optical paths for the guide laser beams separated by the wavelength separation mirror means; wavelength separation mirror means for reflected light to separate the guide laser beams reflected by each of the parallel reflecting optical means for each wavelength to guide the guide laser beams; a plurality of light position detecting units for individually receiving reflected guide laser beams separated by the wavelength separation mirror means; and a control unit for receiving information about deviation in the light position detected by each of the light position detecting unit to process information so as to operate the mirror adjustment unit. Therefore, if a portion of the mirrors constitutes a joint portion of the rotation, it becomes not necessary to consider the disorder of the polarization which arises a problem when amounts of the position deviation of the beams are measured at two places in the light transmission passage by using the polarization. When the position deviation of the beams is measured at a plurality of positions, the measurement can be performed with a satisfactory separation performance. If the amount of the position deviation of the beams must be measured at three or more points, the measurement can be performed only by the increase in the types of the guide laser beams.

The light transmission apparatus according to the present invention includes the mirror adjustment unit which is an automatic mirror unit which is operated by an electrostriction device or a galvanometer exhibiting quick response. The light position detecting unit comprises a PSD (Position Sensitive Detector) unit or a separation-type photodiode device. Therefore, even if an influence of vibrations having a higher frequency components is exerted on the light transmission apparatus, an influence of deviation in the optical axis caused from the vibrations can be eliminated.

The light transmission apparatus according to the present invention incorporates the laser-beam emitting head provided with a laser emitting head disposed at the emission portion of the light transmission passage in which the laser beam is guided in the air. The laser-beam emitting head irradiates a portion in the incore structure to be machined with the laser beams. Therefore, even if the main laser unit is disposed apart from the portion in which the material is machined or inspection is performed, stable matching and inspection can stably be performed by using the laser beams.

The light transmission apparatus according to the present invention includes the main laser unit for outputting laser beams for performing machining, inspecting or preventive-maintenance/repair operation of a portion to be machined; a laser emitting unit for irradiating the portion to be machined with the main laser beams outputted from the main laser unit; and the light transmission apparatus for transmitting laser beams outputted from the main laser unit to the laser emitting unit. Therefore, when an incore structure is repaired, large energy laser beams can stably be transmitted, and hence, the reliable operation can be performed. Furthermore, the same light transmission passage can be used to photograph the transmission position by an electronic optical image pickup means, such as a CCD camera from a remote position.

The method of adjusting the light transmission passage according to the present invention is performed such that the optical axis of the light transmission passage of the light transmission means formed by combining mirrors with one another is adjusted by the steps of causing the electronic optical image pickup means disposed to face the optical axis of the light transmission passage to observe the portion to be adjusted at a position downstream of the automatic adjustment mirror; adjusting the angle of the automatic adjustment mirror such that the observed mirror image is positioned in the central portion; sequentially adjusting the automatic adjustment mirrors disposed in the light transmission passage from this side to adjust all of the mirrors. Therefore, it is not necessary to dispose an electronic unit, such as a CCD camera, in the light transmission passage. Thus, the optical axis can be adjusted from a remote position even in an environment in which strong radioactive rays exist. The CCD camera is not required to be disposed at each of the positions corresponding to the mirrors in the light transmission passage. Only one electronic optical image pickup means, such as the CCD camera, is required to adjust the optical axis from a remote position. Since the image processing unit is provided, an amount of the deviation of the mirror can automatically be measured in accordance with an image photographed by the electronic optical image pickup means. Thus, the automatic adjustment mirror can automatically be adjusted.

The method of adjusting the light transmission apparatus according to the present invention has the steps of guiding the guide laser beam outputted from the guide laser beam unit for adjusting the optical axis of the light transmission passage having the automatic adjustment mirrors; causing the guide laser beam transmitted in the light transmission passage to be reflected in parallel by the parallel reflecting optical means to make incident the guide laser beam on the light position detecting unit; causing the light position detecting unit to detect an amount of the position of the laser beam; causing the control unit to control the operation of the mirror adjustment unit such that the amount of deviation in the position of light is canceled or minimized; and the automatic adjustment mirror is feedback-controlled so that the angle of the mirror is adjusted. Accordingly, the measurement of the position deviation of the mirror can accurately be performed as compared with a process using the CCD camera. Furthermore, the position measurement can considerably quickly be completed as compared with the process using the CCD camera. Even if the optical axis is shaken owning to the vibrations of the apparatus, the mirror can quickly be moved in a direction in which the shaking of the optical axis is canceled. Thus, the influence of the vibrations can be eliminated.

The method of adjusting the light transmission apparatus according to the present invention such that the optical axis of the light transmission passage having the automatic adjustment mirrors is adjusted by the steps of causing the electronic optical image pickup means to sequentially adjusting the angles of automatic adjustment mirrors at a position downstream of the automatic adjustment mirror to be adjusted by the electronic optical image pickup means so that coarse adjustment of the light transmission passage is performed; feedback-controlling the automatic adjustment mirrors such that an amount of the deviation in the position of light detected by the light position detecting unit is canceled or minimized, so that the precise adjustment of the light transmission passage is performed and an influence of external vibrations is corrected. Therefore, a large energy laser beams can stably be transmitted when an incore structure is repaired. Furthermore, the same light transmission passage can be used to cause the electronic optical image pickup means, such as the CCD camera, to photograph the transmission position from a remote position.

According to the present invention, the transmission passage for the laser beams is divided into three sections consisting of a multi-step and elongated mast light guide pipes, the turning vehicle disposed on the upper lattice plate provided for the upper portion of the shroud and various annulus laser machining units. Therefore, adaptation to various operations is permitted. Since the mast portion and the turning vehicle can commonly be used, the portion in which the operation is performed can easily be changed or shifted.

Since the system can be shared, the cost can significantly be reduced. The preventive-maintenance/repair operation, such as peening or welding using the laser beams, can easily be performed in a narrow space of a structure having a complicated shape.

According to the present invention, the optical path is modified by using automatic alignment, the electric reflecting mirror is employed and position deviation can automatically be determined in accordance with the reference light transmitted from the retro-reflector. Therefore, the light guide pipe method, which has been considered to be difficult to transmit laser beams for a long distance, can be realized.

The system for transmitting laser beams includes the option relay box of the reflecting mirrors provided for the turning vehicle, so that the present invention is applicable to an apparatus for performing machining in the shroud.

Industrial Applicability

As described above, the laser-beam emitting head according to the present invention can be introduced/withdrawn to and from a narrow portion to which the machining working is to be performed. Therefore, the preventive-maintenance/repair operation using laser beams can efficiently be performed. In particular, a preventive-maintenance/repair operation of an arrow portion between the inner wall of a shroud and a core support plate which are the incore structures can automatically, stably and efficiently be performed by using laser beams in an underwater environment. As compared with the conventional method, satisfactory advantages and effects can be obtained from viewpoints of the structure, operation and the safety of the operator. Therefore, a significant industrial advantage can be realized.

What is claimed is:

1. A laser-beam emitting head for irradiating a portion to be machined with laser beams outputted from a laser unit, said laser-beam emitting head comprising:

an emitting head body having a light guide member for guiding the laser beams;

a converging lens for converging the laser beams guided from the light guide member in the head;

a reflecting mirror for irradiating the portion to be machined with the converged laser beams, wherein the reflecting mirror is located behind the converging lens on a downstream side of a light advancing direction;

mirror rotating means for rotatively holding the reflecting mirror around the optical axis of the laser beam;

distance-adjustment means for adjusting the relative distance between the reflecting mirror and the converging lens; and moving means for moving said reflecting mirror and said converging lens with the relative distance being maintained, wherein said light guide member in the head, said converging lens and said reflecting mirror are inserted to and withdrawn from the portion to be machined in a narrow gap.

2. A laser-beam emitting head according to claim 1, wherein said emitting head body of the laser-beam emitting head is provided with a flat and elongated elevation support mechanism which is slidable by a frame elevating unit, said elevation support mechanism is provided with an irradiation scan optical system constituted by a converging lens and a reflecting mirror, and said frame elevating unit constitutes moving means for moving said converging lens and said reflecting mirror with the relative distance being maintained.

3. A laser-beam emitting head according to claim 1, wherein said light guide member in the head includes a cylindrical member and an optical member for causing the inside portion of said cylindrical member to be an air state, and said light guide member in the head is joined to the emitting head body of the emitting head such that the laser beams are guided to said converging lens.

4. A laser-beam emitting head according to claim 1, wherein said light guide member in the head is made of glass so as to guide the laser beams to said converging lens.

5. A laser-beam emitting head according to claim 1, wherein an optical path from said light guide member in the head to said converging lens and an optical path from said converging lens to said reflecting mirror are exposed to an environment and said both optical paths are formed into spatial transmission passages realized by the environment.

* * * * *